(12) United States Patent
Horimoto

(10) Patent No.: US 9,879,809 B2
(45) Date of Patent: Jan. 30, 2018

(54) COUPLING WITH SAFETY VALVE FUNCTION

(71) Applicant: Sakura Rubber Co., Ltd., Tokyo (JP)

(72) Inventor: Akira Horimoto, Tokyo (JP)

(73) Assignee: SAKURA RUBBER CO., LTD., Tokyo (JP)

( * ) Notice: Subject to any disclaimer, the term of this patent is extended or adjusted under 35 U.S.C. 154(b) by 0 days.

(21) Appl. No.: 15/418,136

(22) Filed: Jan. 27, 2017

(65) Prior Publication Data

US 2017/0138520 A1 May 18, 2017

Related U.S. Application Data

(63) Continuation of application No. PCT/JP2014/069959, filed on Jul. 29, 2014.

(51) Int. Cl.
*F16L 37/24* (2006.01)
*F16K 17/04* (2006.01)
*A62C 33/00* (2006.01)
*F16K 17/02* (2006.01)
*F16L 55/07* (2006.01)

(52) U.S. Cl.
CPC .............. *F16L 37/24* (2013.01); *A62C 33/00* (2013.01); *F16K 17/02* (2013.01); *F16K 17/04* (2013.01); *F16L 55/07* (2013.01)

(58) Field of Classification Search
CPC . F16L 37/24; F16L 55/07; F16L 17/02; F16L 17/04
See application file for complete search history.

(56) References Cited

U.S. PATENT DOCUMENTS

| | | | |
|---|---|---|---|
| 380,363 A | 4/1888 | Sturgeon | |
| 813,235 A | 2/1906 | Pine et al. | |
| 894,900 A | 8/1908 | Pohlman | |
| 1,217,041 A | 2/1917 | Martz | |
| 5,857,713 A | 1/1999 | Horimoto | |
| 6,382,680 B1* | 5/2002 | Horimoto | F16L 37/252 285/114 |

(Continued)

FOREIGN PATENT DOCUMENTS

| | | |
|---|---|---|
| JP | 1988-106990 | 7/1988 |
| JP | 10-038153 A | 2/1998 |

(Continued)

OTHER PUBLICATIONS

International Search Report in connection with related PCT International Application No. PCT/JP2015/071403, including English language translation, Nov. 2015.

(Continued)

*Primary Examiner* — Kevin Lee
(74) *Attorney, Agent, or Firm* — John P. White; Cooper & Dunham LLP

(57) ABSTRACT

A coupling which can enhance safety will be provided, when the coupling, a hose, and the like are exposed to high pressure for some reasons or other while in use, by leaking the high pressure fluid to the outside to open a sealing portion of the coupling at a stage where the coupling condition between the couplings is maintained, and decreases the pressure. Further, the coupling can warn the operator or the like of the abnormality by ejecting a fluid from a leak path or a fluid ejection port.

21 Claims, 32 Drawing Sheets

(56) References Cited

U.S. PATENT DOCUMENTS

| | | | |
|---|---|---|---|
| 7,481,467 | B2 | 1/2009 | Horimoto et al. |
| 7,798,537 | B2 | 9/2010 | Nakamura et al. |
| 9,568,135 | B2 * | 2/2017 | Lehmann et al. ...... F16L 37/22 |
| 2017/0138521 | A1 | 5/2017 | Horimoto |

FOREIGN PATENT DOCUMENTS

| | | | |
|---|---|---|---|
| JP | 3107507 | B2 | 11/2000 |
| JP | 2002-039475 | A | 2/2002 |
| JP | 2002-039477 | A | 2/2002 |
| JP | 2003-090479 | A | 3/2003 |
| JP | 3971421 | B2 | 9/2007 |
| JP | 4834423 | B2 | 12/2011 |

OTHER PUBLICATIONS

Fire and Disaster Management Agency, Extraordinary Disaster Management Office, "Notice No. 204", Oct. 28, 2013.
International Search Report and Written Opinion of the International Searching Authority in connection with PCT/JP2014/069959, including English language copy of the International Search Report, Nov. 2014.
Jul. 12, 2017 non-final Office Action in connection with related U.S. Appl. No. 15/418,294.

* cited by examiner

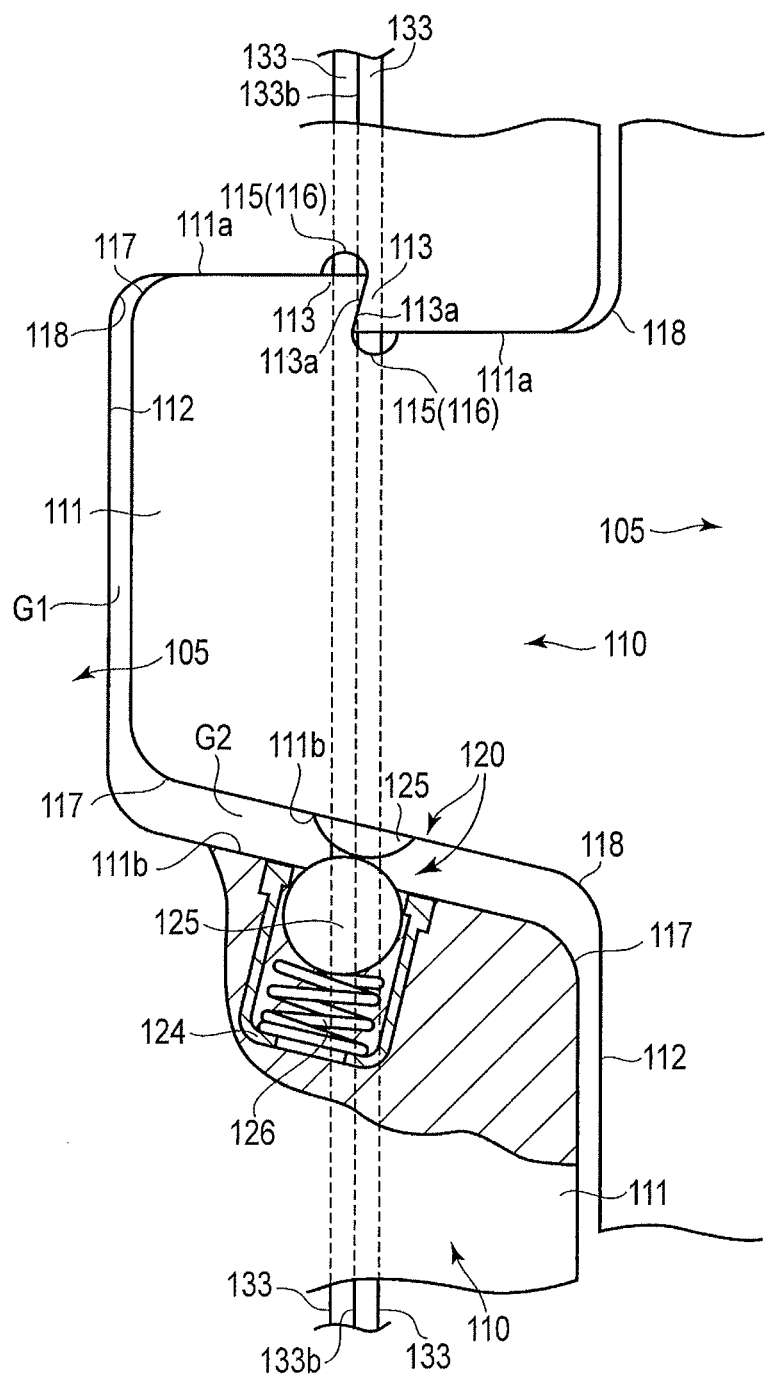
F I G. 2

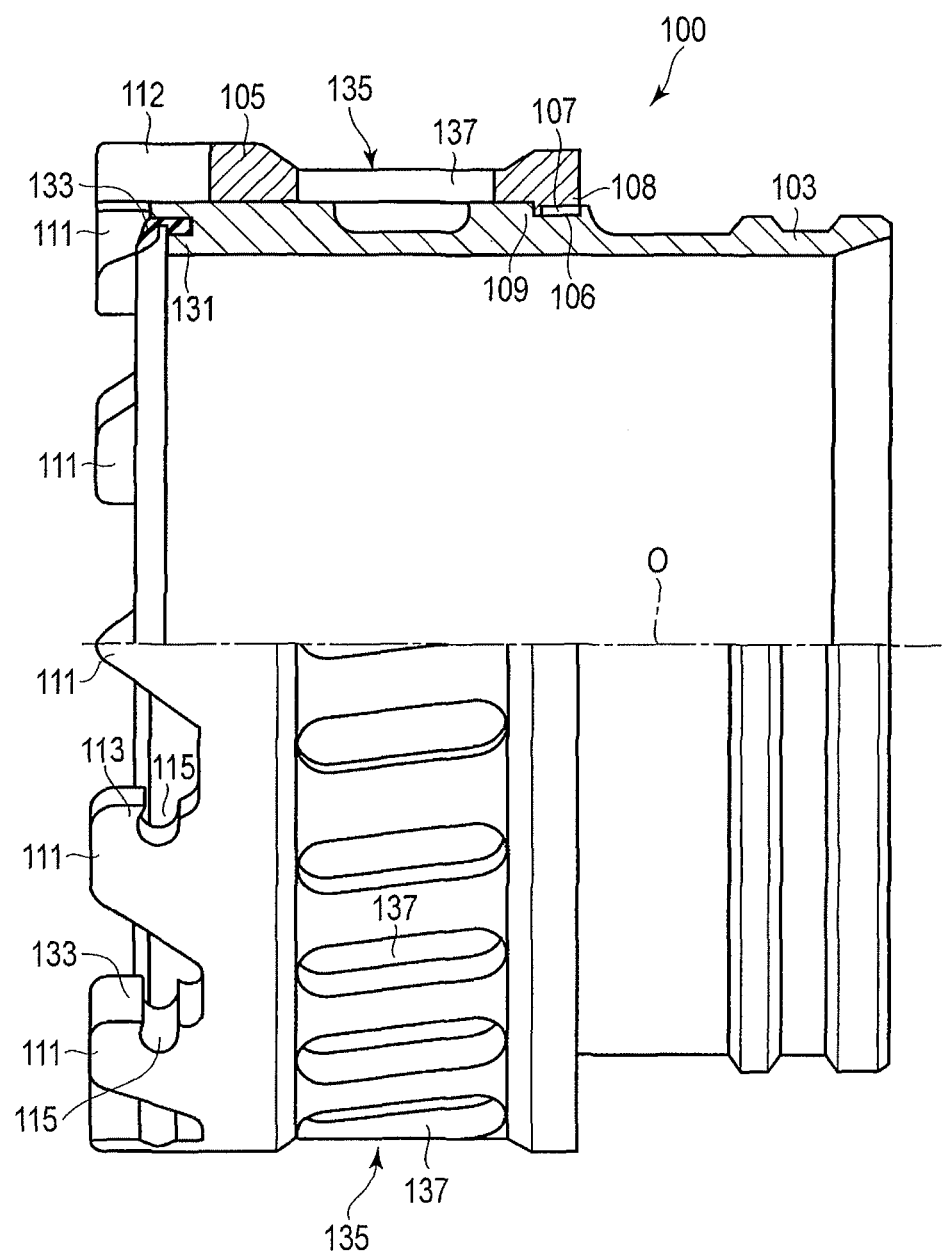
F I G. 4

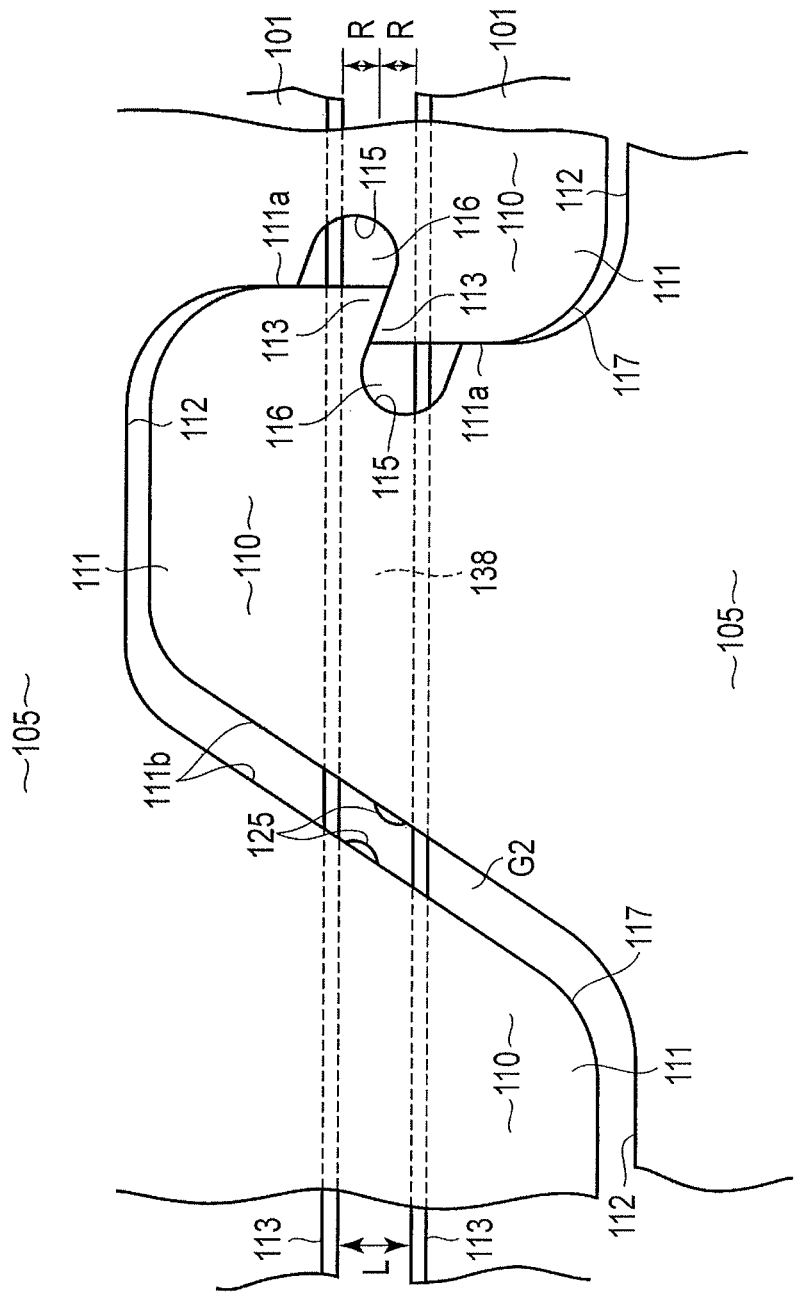
F I G. 5

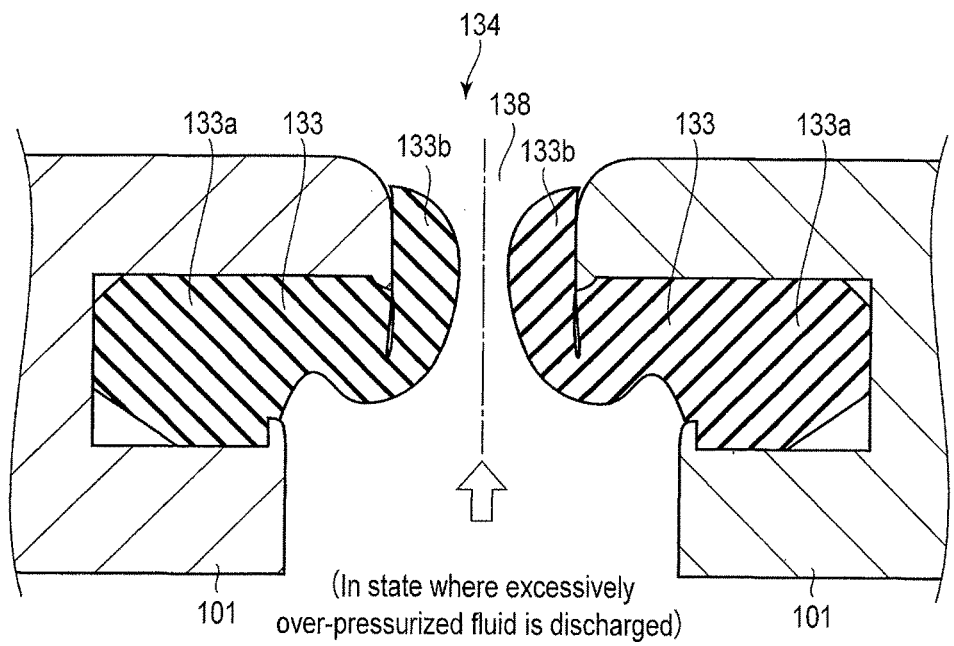
FIG. 6C (In state where excessively over-pressurized fluid is discharged)
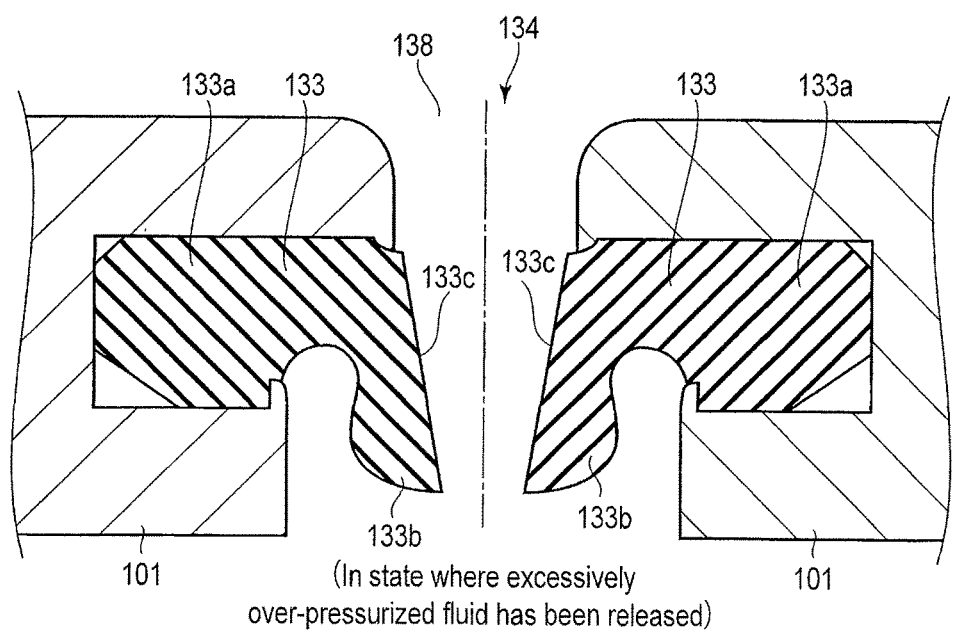
FIG. 6D (In state where excessively over-pressurized fluid has been released)

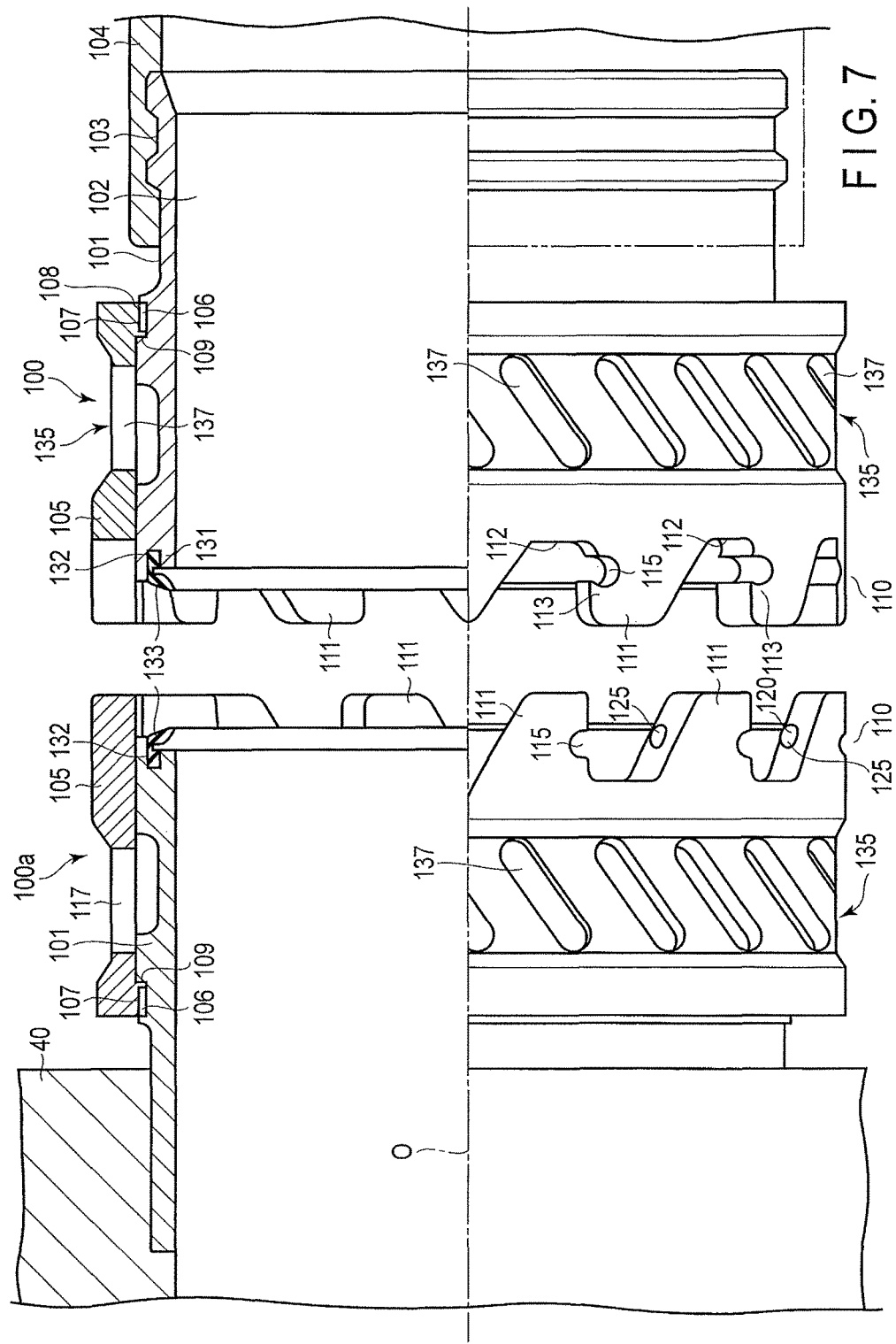

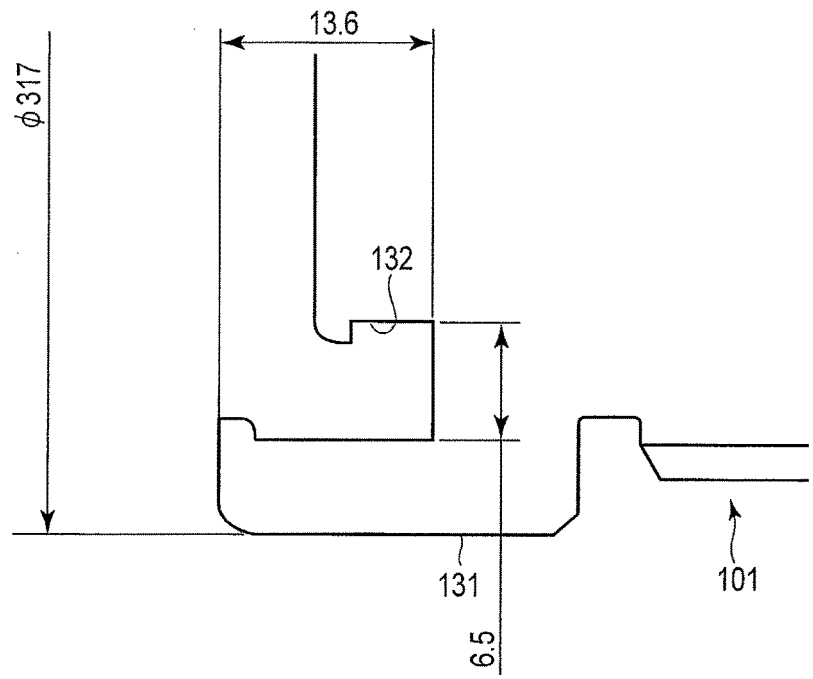
F I G. 15
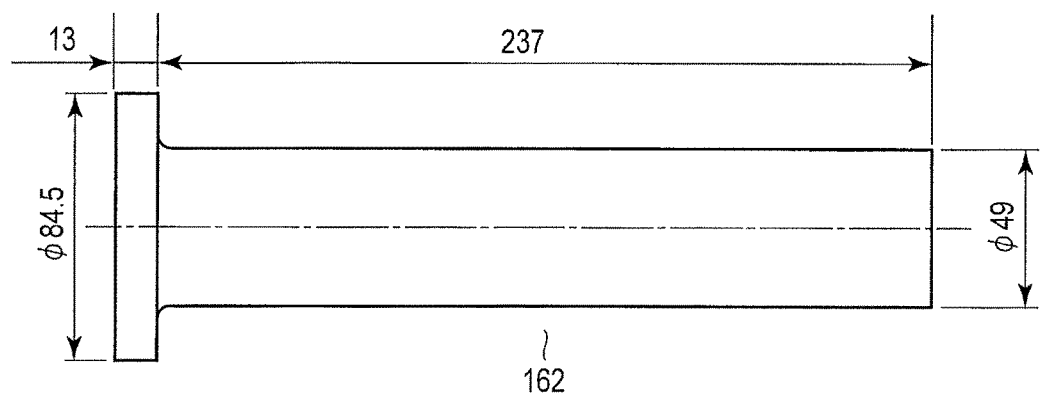
F I G. 16

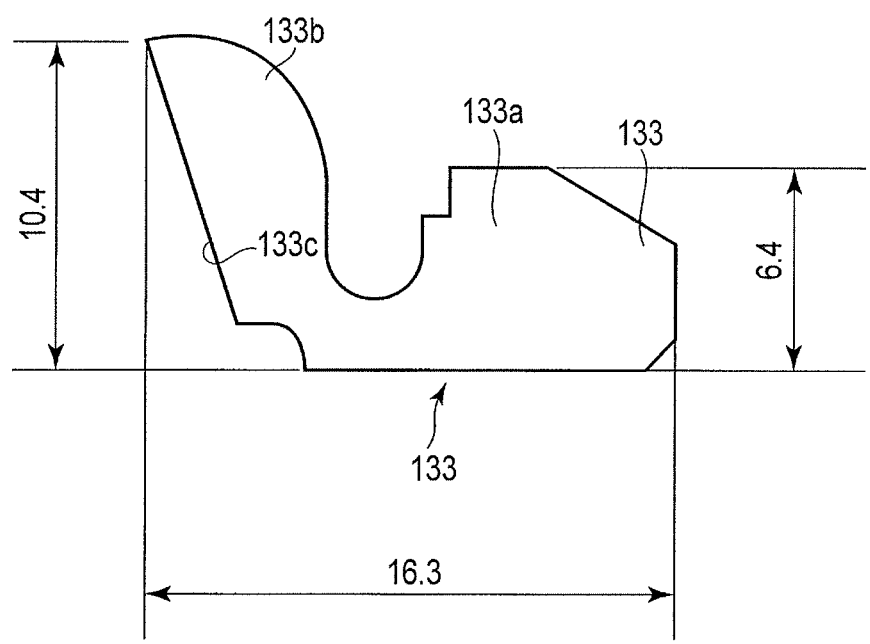
F I G. 18

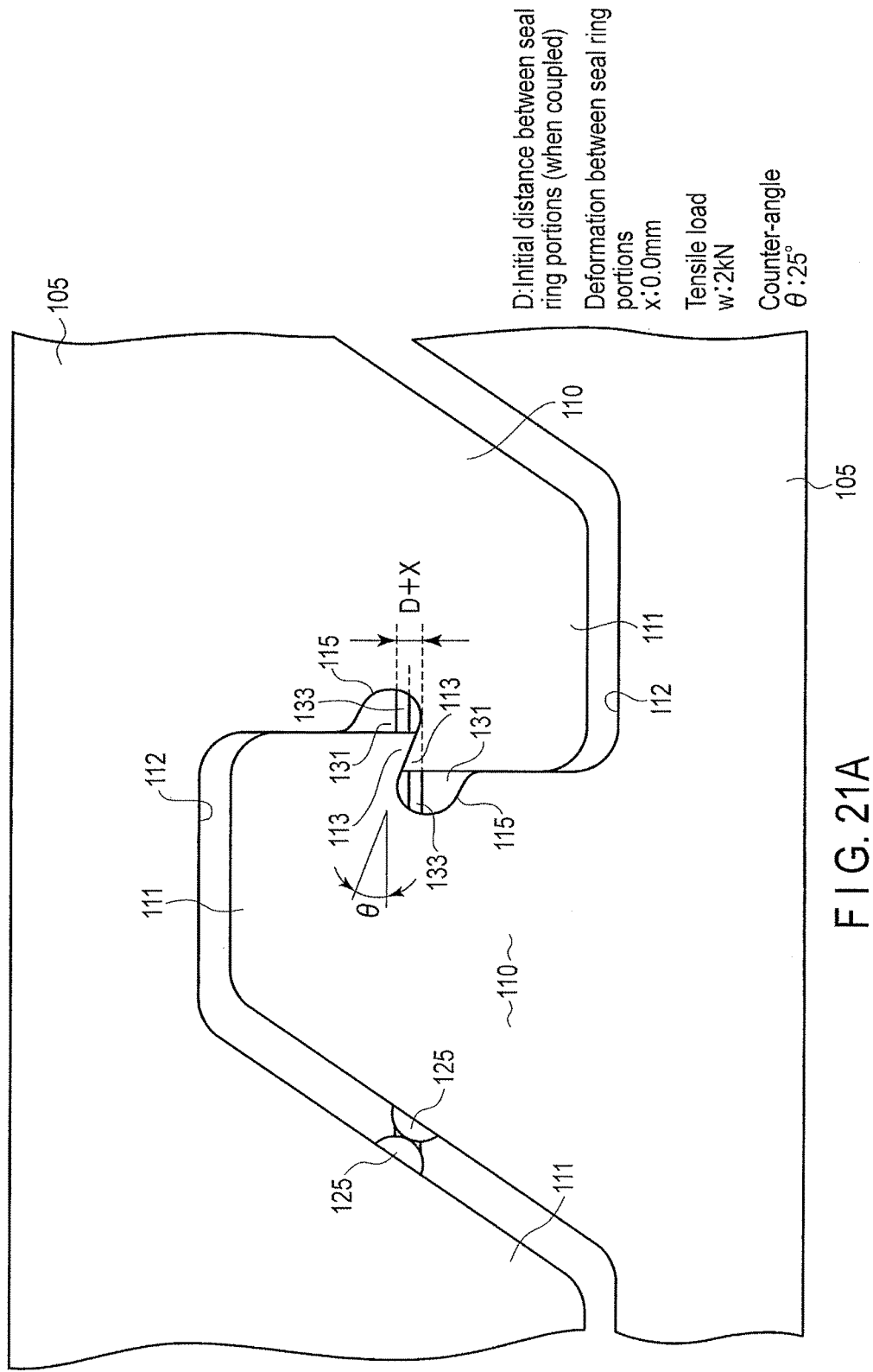
F I G. 21A

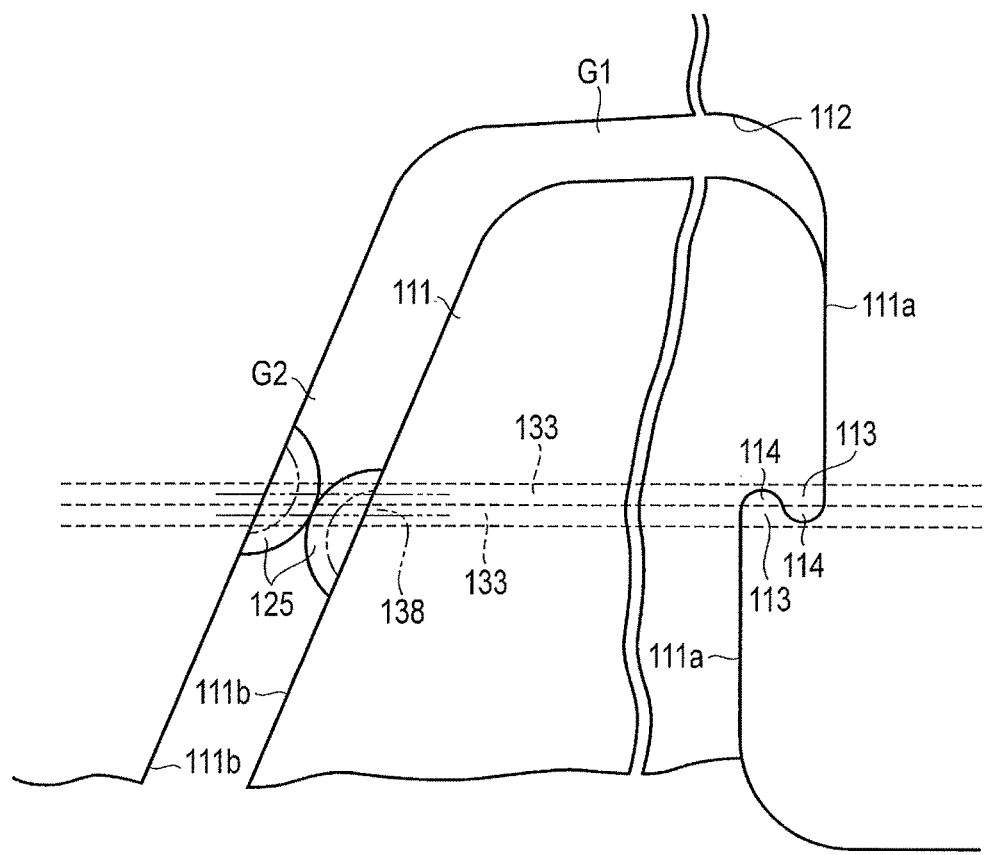
F I G. 22

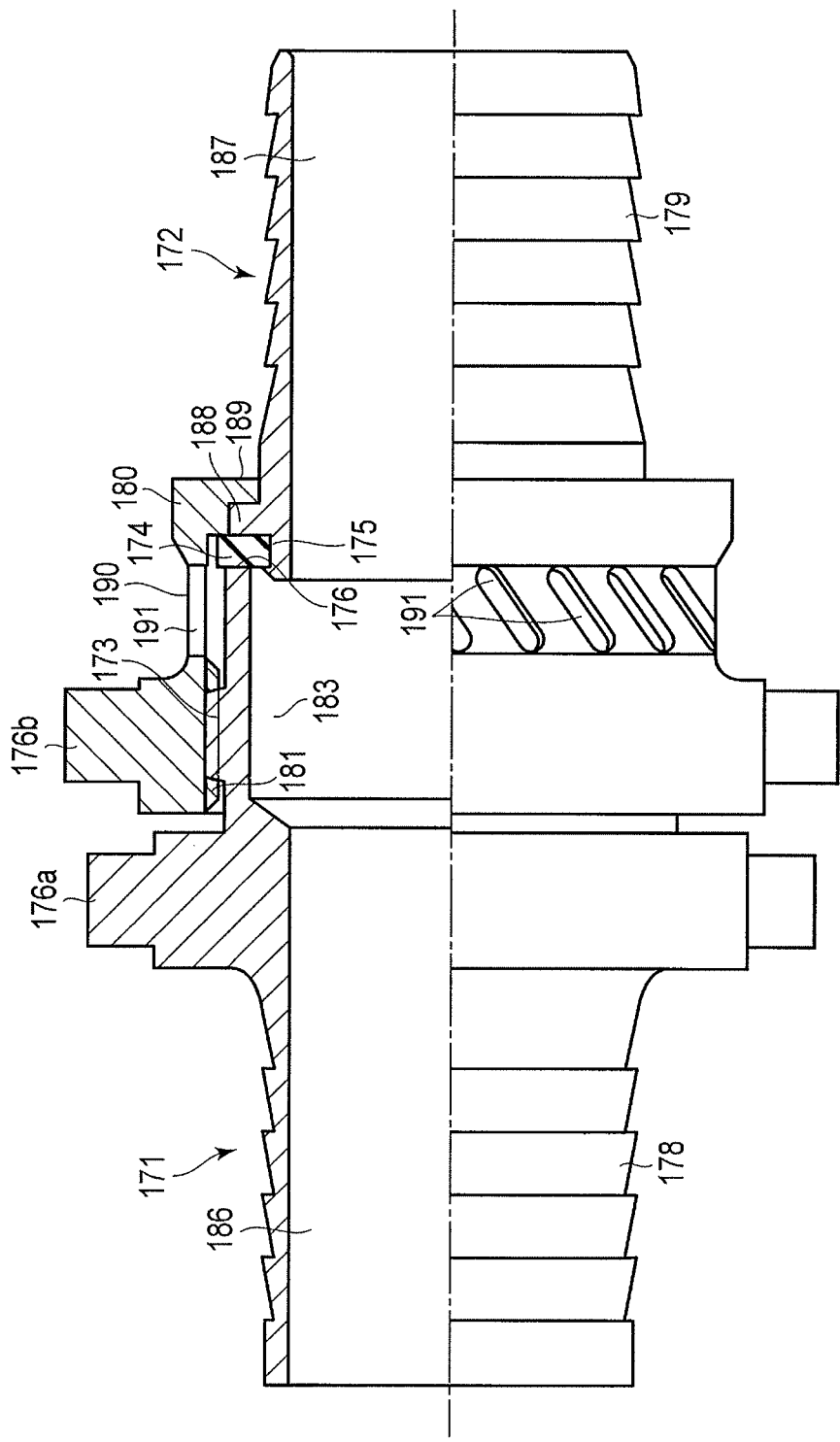
F I G. 23

COUPLING WITH SAFETY VALVE FUNCTION

CROSS REFERENCE TO RELATED APPLICATIONS

This application is a Continuation Application of PCT Application No. PCT/JP2014/069959, filed Jul. 29, 2014, the entire contents of which are incorporated herein by reference.

BACKGROUND OF THE INVENTION

1. Field of the Invention

Embodiments described herein relate generally to a coupling with a safety valve function which connects one hose to another or a hose to a device such as a pump.

2. Description of the Related Art

Conventionally, as typified by "Direct spring leaded safety valve for steam and gas service" defined in B 8210-2009 of the Japanese Industrial Standards (hereinafter referred to as the JTS), safety valves have been used for protecting equipment, couplings, hoses and the like from breakage caused by an abnormal pressure surge of a transfer fluid on steam and gas supply lines. However, a safety valve for steam and gas service has not been assumed to be used for a large-capacity foam-water discharge system using a foam fire-extinguishing solution used for such an occasion that an oil storage tank at a petroleum complex catches fire.

In a major petroleum complex, dozens of large-size oil storage tanks are installed. For example, such an oil storage tank has a diameter of 83 meters, a height of 24 meters, and a capacity of 120 thousand kiloliters. If a large-size oil storage tank catches fire, it is impossible to handle the situation with conventional firefighting equipment including fire pumps and fire hoses. The conventional firefighting equipment can discharge water at a maximum of about 2,000 [L/min] and thus cannot possibly handle a fire set to a large-size oil stage tank. Further, it has been said that a large-capacity foam-water discharge system which can discharge water at a rate of 10,000 to 30,000 [L/min] is required for a fire at a large-scale petroleum complex.

When a fire breaks out at a large-scale petroleum complex, a large-capacity foam-water discharge means is obviously required, but if a water source is located at a long distance of a several kilometers away from an oil storage tank, a means of supplying a large volume of water over such a long distance using a water supply hose is also required.

However, when a large volume of water is transported over a long distance, as might be expected, a water supply hose will have a significantly large loss of pressure. Therefore, to minimize the pressure loss during the transport operation, a large-diameter water supply hose and a large-diameter coupling (type 300 and type 200) are required. Further, a water supply pump and a pressure pump are installed in the middle of the water supply pathway of the water supply hose, and the water supply hose is pressurized such that the inner pressure is maintained to be at a predetermined pressure level and water is reliably supplied to a water cannon installed at the end of the water supply hose.

FIG. 24 shows an example of a large-capacity foam discharge system. In the drawing, reference number 11 indicates a water source such as the sea or a lake, and reference number 12 indicates the land. Reference number 13 indicates a fire site, namely, an oil storage tank at a petroleum complex located at a distance of a several kilometers away from the water source 11. A submersible pump 14 is dipped in the water source 11 and is driven by an engine generator 15 settled on the land 12. A water supply pump 16 is settled on the land 12. A discharge port 17 of the submersible pump 14 and an intake port 18 of the water supply pump 16 are connected to each other by a plurality of water supply hoses 19. To use the plurality of water supply hoses 19, the submersible pump 14 has, for example, four discharge ports 17, and the water supply pump 16 has, for example, four intake ports 18. The water supply hoses 19 which connect the discharge ports 17 and the intake ports 18, respectively, include, for example, four hoses, each having a diameter of 6 inches and a length of 10 meters, and three adjustment hoses, each having a diameter of 6 inches and a length of 3 meters. The water supply pump 16 is connected to a pressure pump 20 via a water supply pathway 21, and the pressure pump 20 is installed in a part of the land 12 which is close to the oil storage tank 13 at the fire site and is far from the water supply pump 16.

Next, the water supply pathway 21 which connects the water supply pump 16 and the pressure pump 20 will be described. The water supply pump 16 has a plurality of discharge ports, for example, four discharge ports 22, and similarly, the pressure pump 20 has a plurality of intake ports, for example, four intake ports 23. The discharge ports 22 of the water supply pump 16 are connected to one ends of four water supply hoses 24, for example, each having a diameter of 6 inches and a length of 50 meters, and the other ends of the water supply hoses 24 are connected to the intake side of a first manifold 25. The first manifold 25 has discharge ports, each having a diameter of 8 inches and connected to one ends of two water supply hoses 26, each having a length of 1000 meters. The other ends of the water supply hoses 26 are connected to a second manifold 27. The second manifold 27 has intake ports, each having a diameter of 6 inches and has discharge ports, respectively connected to one ends of four water supply hoses 28, each having a length of 10 meters. The other ends of these water supply hoses 28 are connected to the intake ports 23 of the pressure pump 20.

Further, in FIG. 24, reference number 29 indicates an undiluted solution transport vehicle loaded with a tank 30 containing foam-fire-extinguishing chemical agent (undiluted solution) to be used for extinguishing a fire set to the oil storage tank 13. The tank 30 of the undiluted solution transport vehicle 29 is connected to one ends of two rubber intake pipes 31, each having a diameter of 3 inches and a length of 10 meters, and the other ends of the rubber intake pipes 31 are connected to intake ports 33 of an undiluted solution pump 32. Discharge ports 34 of the undiluted solution pump 32 are connected to one ends of two canvas hoses 35, each having a diameter of 2.5 inches and a length of 10 meters. The other ends of the canvas hoses 35 are connected to undiluted solution intake ports 37 of the pressure pump 20 via a mixer 36, and in the mixer 36, the foam-fire-extinguishing chemical agent (undiluted solution) is diluted with water supplied from the water source 11 at a dilution rate of, for example, 1%, and a foam-fire-extinguishing solution is produced.

Further, the pressure pump 20 has a plurality of discharge ports, for example, four discharge ports 38. Similarly, a manifold 40 of a foam-water cannon 39 has a plurality of connection joints, for example, four connection joints (couplings) 41. The discharge ports 38 of the pressure pump 20 and the connection joints (couplings) 41 of the intake side of the manifold 40 of the foam-water cannon 39 are connected to each other, for example, by four water supply hoses 42, each having a length of 20 meters. Further, the foam-water cannon 39 discharges a large volume of foam to the fire site (oil storage tank) 13 to extinguish the fire.

Each of the water supply hoses 24, 28, 42 or the like comprises connection joints (couplings) 43 at both ends and is detachably connected to pumps or the like via the connection joints (couplings) 43. According to the fire extinguishing situation, it is possible to increase or decrease the number of the water supply hoses 24, 28 and 42. In the discharge ports 22 of the water supply pump 16 and the discharge ports 38 of the pressure pump 20, the connection joints (couplings) 43 are provided via valves 44.

In the meantime, during the firefighting operation using the above-described large-capacity foam-water discharge system, the operation of the system is monitored. In the operation, there is a possible of accidents, that is, water leakage may occur from between the connection joint 43 and the water supply hose 24 or 42 for some reason or other, or water leakage may occur when the connection joint 43 is broken. For example, if water leakage occurs in one of the four connection joints 43 connected to the connection joints 41 of the nearest manifold 40 to the foam cannon 39, an operator of the foam-water cannon 39 reports the situation to a supervisor, and the supervisor contacts an operator who is monitoring the pressure pump 20 by radio or the like and instructs the operator to decrease the rotation speed of the pump and then stop the operation of the pump, and also instruct the operator to stop the water supply pump 16 and the submersible pump 14 and then close the four valves 44 connected to the four hoses including the water supply hose 42 where the water leakage has occurred.

Then, the operator immediately instructs an operator who is monitoring the water supply pump 16 to decrease the rotation speed of the pump and then stop the operation of the pump, and instructs an operator who is monitoring the submersible pump 14 to decrease the rotation speed of the pump and then stop the operation of the pump after the supply pump 16 has stopped. In this case, there will be no trouble if the operator who is monitoring the pressure pump 20 closes the four valves 44 connected to the four hoses including the water supply hose 42 where the water leakage has occurred after the operations of the water supply pump 16 and the submersible pump 14 are completely stopped. However, if the operator makes haste to close the four valves 44 while the water supply pump 16 and the submersible pump 14 are still rotating, a fluid pressure surge, namely, a water hammer is created by dynamic pressure which is different from rated pressure (static pressure) of the water supply pump 16 and the like and is applied to the water supply hoses 28, 26, 24, and the like. Therefore, it may burst the water supply hoses 28, 26, 24, and the like or break the couplings 43 attached to these hoses.

Further, based on the assumption that the operators perform inappropriate operations and the water supply hoses 24, 26, 28, 42 and the like may be subjected to such high pressure, the pressure resistance level of the water supply hoses 24, 26, 28, 42 and the like is designed to some extent. However, such water supply hoses 24, 26, 28 and 42 having high pressure resistance level will be expensive and will be difficult to maneuver as the water supply hoses themselves become heavier and harder.

Still further, in a large-capacity foam-discharge system of this kind, a water supply line is composed of a several tens of hoses. Then, a safety valve is attached to a nearest manifold to a high-pressure fluid pump or the like. However, if a valve of a discharge port, an intake port, or the like is abruptly closed, a water hammer is created, and the pressure of the valve on the water source side increases to such a pressure level about 2 to 3 times of the normal pressure level of the water transport operation. Further, in a case where the water supply line equips with a plurality of pumps for preventing a pressure loss on the middle of the water supply line, a water hammer tends to be created on the water supply line by lack of cooperation between these pumps. In addition, a large number of valves are provided in various locations on the water supply line. Therefore, a water hammer may be created everywhere on the water supply line.

Therefore, to prevent breakage of water-discharge equipment, a coupling, a hose and the like or to avoid fatal accidents by such an abnormal pressure surge on a water supply line, a coupling with a safety mechanism has been proposed (JP 4834423 B). The coupling with the safety mechanism (connection joint) 50 is shown in FIG. 25. In this structure, a safety valve (pressure valve) is attached to the body of coupling 50. A branch pipe 52 is provided in the middle of a cylindrical coupling body 51 of the coupling 50, and a safety valve 80, which will be described later, is attached to the branch pipe 52. Therefore, the branch pipe 52 and the safety valve 80 are arranged perpendicularly with respect to the axis of the coupling body 51, and the coupling 50 has a T shape as a whole.

Further, as shown in FIG. 25, coupling portions 57a and 57b, which have the same structure as each other, are assembled into the ends of the coupling body 51, respectively. Each of the coupling portions 57a and 57b comprises a cylinder body 58. The cylinder body 58 has a cylindrical shape, and at the outer edge of the cylinder body 58, a sealing member 59 such as a rubber packing is attached. Further, the coupling portions 57a and 57b are axially coupled with those of the other coupling 50, which have the same structure as the one coupling 50, and at this time, the sealing members 59 at the outer edges of the cylinder bodies 58 are attached to those of the other couplings 50, and fluid passages 78 in the cylinder bodies 58 are, as maintained to be sealed from the outside, communicated with those of the other couplings 50.

Still further, in each of the coupling portions 57a and 57b, a coupling ring 61 is attached to the cylinder body 58, and at the outer edge of the coupling ring 61, a plurality of engagement projections, for example, nine engagement projections 70 are provided. These engagement projections 70 are circumferentially arranged at regular intervals and axially project outward with respect to the sealing member 59. The regions between the engagement projections 70 are engagement recesses 71. Further, when the coupling portions 57a and 57b are axially coupled with those of the other couplings 50, the engagement projections 70 of the coupling portion 57a of the one coupling 50 are fitted into the engagement recesses 71 of the coupling portion 57b of the other coupling 50, and the engagement projections 70 of the coupling portion 57b of the other coupling 50 are fitted in the engagement recesses 71 of the coupling portion 57a of the one coupling 50. That is, the coupling is a unisex coupling and is complementarily engaged with the other coupling.

Still further, a step-like hook, namely, an engagement hook 72 is formed in one side surface 70a of each engagement projection 70, and the engagement hooks 72 of the one engagement projections 70 are circumferentially engaged with the engagement hooks 72 of the engagement projections 70 of the other coupling 50.

Still further, a biasing mechanism 73 is provided in the other side surface of the engagement projection 70, which is opposite to the side surface of the engagement projection 70 provided with the engagement hook 72. The biasing mechanism 73 comprises a steel ball 74 and a spring (not shown) which pushes the steel ball 74 in the projecting direction. Therefore, when the engagement projections 70 are engaged with the engagement recesses 71, the steel balls 74 of the one engagement projections 70 are pressed against the steel balls 74 of the other engagement projections 70, and the other side surfaces of the engagement projections 70, that is, the side surfaces of the engagement projections 70 provided with the steel balls 74 are separated from each other. As a result, the side surfaces of the engagement projections 70, that is, the side surfaces provided with the engagement hooks 72 are brought closer to each other, and thus the engagement hooks 72 are engaged with each other.

Still further, the safety valve (pressure valve) 80 is provided at the end of the branch pipe 52 as a safety valve mechanism which discharges an internal fluid to the outside when the inner pressure of the branch pipe 52 exceeds a set pressure level. A valve body 81 of the safety valve 80 is detachably attached to the end of the branch pipe 52. In the valve body 81, an inward-projecting valve seat element 84 and a valve body 86 are provided. When the pressure of the fluid passage 78 in the coupling 50 is abnormally high, the valve body 86 opens such that the fluid passage 78 becomes open to the outside.

An upward-projecting valve rod 87 is provided in the valve element 86. The valve rod 87 penetrates through a through-hole 90 of an adjustment screw member 89 screwed into a female screw portion 88 formed at the top of the valve body 81. The valve rod 87 is supported in an axially movable manner with respect to the adjustment screw member 89. A coil spring 91 is wound around the valve rod 87 and is interposed between the lower surface of the adjustment screw member 89 and the upper surface of the valve element 86 in a compressed manner. It is possible to adjust the pressing force of the coil spring 91 by rotating the adjustment screw member 89 and determining the vertical movement position of the adjustment screw member 89. In this way, it is possible to adjust a setting pressure at which the valve element 86 opens. A relief hole 92 which leads to the outside is provided in the circumferential wall of the valve body 81, and the fluid passage 78 is communicated with the outside through the relief hole 92.

Further, when the pressure of the foam fire-extinguishing solution or the like in the fluid passage 78 exceeds the setting pressure, the valve body 86 is pushed up against the pressing force of the coil spring 91, and as the valve body 86 is separated from the valve seat 84, a part of the foam fire-extinguishing solution or the like in a fluid passage 85 is discharged to the outside through the relief hole 92, and the pressure of the solution in the fluid passage 78 is reduced. Therefore, it is possible to prevent such a situation where fluid pressure higher than the setting pressure is applied to other fire hoses, couplings, and the like.

BRIEF SUMMARY OF THE INVENTION

Technical Problem

In the above-described coupling with the safety mechanism, the coupling body and the safety valve arranged in a substantially T shape, and the safety valve is attached to the coupling body as a separate voluminous mechanism. Therefore, as a whole, the coupling increases in size and volume. Further, since the coupling has a T-shaped outer shape, a direction for the installation of the top and the bottom of the coupling is specified. Therefore, the coupling with the safety mechanism cannot be easily installed in various locations on the water supply line. Further, since the safety valve is attached to the coupling body as a separate mechanism, the structure of the coupling becomes complicated, and consequently the manufacturing cost increases.

Still further, if the coupling or the like is broken and the pair of the couplings is uncoupled, the heavy couplings and the like will fly off at terrible speed. It is extremely dangerous, and more serious accidents than just hose breakage or fluid leakage will be occurred. In light of the above, there has been demand for a simple, compact, and easy-to-use coupling with a safety function.

In consideration of the above-described object, the inventor has considered a coupling 50 shown in FIG. 26. The coupling 50 is formed in a compact design, and a safety valve (mechanism) 80 is incorporated in a coupling body 51. In this example, elements the same as those described above with reference to FIG. 25 will be denoted by the same reference numbers, and detailed description thereof will be omitted.

In the coupling 50, a valve rod 93 is arranged inside the coupling body 51 on the center axis of the coupling body 51. The valve rod 93 penetrates through an adjustment screw member 95 which is screwed into a screw portion 94 formed in the inner wall of the coupling body 51. Further, the valve rod 93 is supported to the adjustment screw member 95 in an axially movable manner. On the inner side of the valve rod 93, an axially-penetrating fluid passage 78 is formed. At one end of the valve rod 93, a valve body 86 whose diameter is greater than the diameter of the other portion of the valve rod 93 is integrally formed or firmly secured as a separate member. The valve body 86 is in contact with a sealing surface 54 formed on the inner surface of the coupling body 51 and is fitted inside in an axially movable manner with respect to the coupling body 51. A sealing O-ring 55 which is in sliding contact with the sealing member 54 is attached to the outer periphery of the valve body 86. Therefore, the valve body 86 can, while maintaining the sealed state, axially move with respect to the coupling body 51.

The valve rod 93 is wound with a coil spring 91, and the coil spring 91 is interposed between the valve body 86 and the adjustment screw member 95. Further, the coil spring 91 axially pushes the valve body 86 outward. Still further, the pressing force of the coil spring 91 can be adjusted by the adjustment screw member 95. A key groove 97 is formed in the outer periphery of the valve body 86, and a key 98 provided in a coupling ring 61 is fitted in the key groove 97. Since the width of the key groove 97 in the axial direction is greater than the width (thickness) of the key 98 in the axial direction, the valve body 86 can axially move together with the valve rod 93 by this width difference.

Further, a sealing member 59 which is similar to the above-described sealing member is provided in the circumference of the end face at the outer axial end of the valve body 86, and the sealing member 59 axially moves together with the valve body 86. Still further, when one coupling 50 is coupled with the other coupling 50, the sealing member 59 of the one coupling 50 contacts the sealing member 59 of the other coupling 50, and the seals between the couplings 50.

At this time, one sealing member 59 functions as the valve body of the safety valve 80, while the other sealing member 59 functions as the valve seat of the safety valve 80. Therefore, the sealing member 59 of one coupling 50 functions as the valve seat when the sealing member 59, of the other coupling 50 is assumed to be the valve body, while the sealing member 59 of one coupling 50 functions as the valve body when the sealing member 59 of the other coupling 50 is assumed to be the valve seat. Consequently, the sealing members 59 of the pair of the coupling 50 complementarily function as the valve body and the valve seat of the safety valve 80.

Note that, although the sealing member 59 is assumed to be a lip seal packing in the present example, the sealing member 59 may be a packing other than a lip seal packing, for example, a ring packing having a circular, rectangular or trapezoidal section or a flat packing. Further, as the valve body of the other coupling 50, instead of using the sealing member 59 of a lip seal packing or a packing having a circular, rectangular or trapezoidal section, the flat end face of the valve body can be directly used as the valve seat.

In that case, when the pair of the couplings 50 is coupled together, one sealing member 59 contacts the other sealing member 59, and the gap between these couplings 50 is sealed. As the sealing member 59 is subjected to the pressing force of the coil spring 91, the sealing force of the sealing member 59 is enhanced. Then, when the fluid pressure is in a normal level, the fluid flows thorough the fluid passage 78 formed in the center of the safety valve 80.

According to the coupling of this structure, the coupling 50 with the pressure valve is not T-shape and is more compactly-designed since the coupling 50 and the pressure valve are linearly arranged. Further, in the installation of the coupling 50 with the pressure valve, there will be fewer restrictions on the installation direction.

However, even with this coupling, the following problem still remains. That is, since the fluid passage 78 is formed in the valve rod 93 arranged in the coupling 50, the fluid passage 78 becomes narrow, and consequently the coupling 50 has a rather low fluid transport performance and has a rather great pressure loss in the fluid transport operation with respect to the outer diameter of the coupling 50. Further, the diameter of the coupling 50 should preferably correspond to the diameter of a hose or a pipe to be connected to the coupling 50, but if the coupling body has a diameter corresponding to the diameter of the hose or the pipe, the diameter of the fluid passage 78 formed in the valve rod 93 is significantly restricted. To avoid such a restriction on the diameter of the fluid passage 78, it is necessary to increase the outer diameter of the coupling 50. However, in that case, the size of the coupling 50 is increased, accordingly. There has been demand for a coupling which can secure a sufficient fluid passage and reduce a pressure loss at the same time, and therefore, the coupling body should preferably have such a structure where the diameter of the fluid passage 78 is substantially the same as the inner diameter of the hose or the pipe.

Therefore, in consideration of the above-described conditions as well as the strength and the like, the inventor has proposed a coupling 50 with a built-in safety valve shown in FIG. 27. In the coupling 50, a coil spring 91 is not arranged inside a coupling body 51 but is arranged in such a manner as to be wound around the outer periphery of the coupling body 51, and a wide fluid passage 78 is secured in the coupling body 51. Further, the coil spring 91 is arranged in the room between the outer periphery of the coupling body 51 and the inner periphery of a coupling ring 61. The rear end of the coil spring 91 pushes a spring receiving member 99a which is screwed into the rear end of the coupling ring 61, and the front end of the coil spring 91 pushes a stopper wall 99b which stands in the outer periphery of the axial front end of the coupling body 51.

Further, engagement projections 70 and engagement recesses 71 which are similar to those shown in FIGS. 25 and 26 are formed at the axial front end of the coupling ring 61. An axial front end portion 61a of the coupling ring 61 projects inward, and this end portion 61a abuts against the front wall surface of the stopper wall 99b from the front side. Further, the coupling body 51 is axially pushed forward by the coil spring 91, and thus the coupling body 51 is generally is in contact with the axial front end portion 61a of the coupling ring 61 and remains advanced.

In the coupling body 51, the coupling ring 61 is only provided at one axial end of the coupling body 51, and the other axial end of the coupling body 51 serves as a mounting portion 51a to which a hose or the like is mounted.

Further, a sealing member 59 is arranged in a ring region at the end of the coupling body 51. Still further, since the ring region of the coupling body 51 which functions as a valve body and a portion of the sealing member 59 which function as a valve unit have large diameters, the fluid passage 78 will have a large diameter, and a large volume of fluid can be transported trough the fluid passage 78. Still further, since the wide fluid passage 78 can be secured, the pressure loss can be reduced.

However, in the coupling of this structure, as the diameter of the valve unit increases, the area of the valve unit subjected to the fluid pressure increases, and the force applied to the valve body increases, accordingly. Therefore, it is necessary to increase the strength of the coil spring 91. Further, even if a strong material is used for the coil spring 91, as the inner diameter (winding diameter) of the coil spring 91 increases, the spring force decreases, accordingly. Therefore, it is impossible to make the coil spring 91 sufficiently strong without increasing the wire diameter of the material of the coil spring 91. Consequently, the coil spring 91 becomes large, and the coupling becomes heavy and voluminous.

Further, since the coupling 50 is equipped with a pressure valve driving mechanism, the structure of the coupling 50 becomes complicated, and the manufacturing cost increases, accordingly.

Certainly, as compared to that of the T-shaped coupling shown in FIG. 25, the structure of the linear coupling 50 is simpler and more compact. However, this coupling 50 is still not light, simple or compact enough to substitute for a conventional coupling, and the manufacturing cost of this coupling 50 is still high.

In the case of using a large-diameter coupling for the above-described large-capacity foam-water discharge system or the like, when the pressure of fluid to be transported unusually increases and the coupling or the like is broken and uncoupled from the other coupling, the heavy coupling will fly off at terrible speed. In case the coupling hits people, people will be seriously injured. Therefore, it is significantly important to prevent the coupling from being uncoupled during the operation even where an abnormality happens and the pressure of fluid to be transported exceeds an allowable limit or a test limit, that is, it is significantly important to reliably activate the safety valve function of the coupling, to leak the fluid and reduce the pressure of the fluid while maintaining the coupling condition, and to warn the operator or the like of the abnormality by ejecting the fluid from fluid ejection ports or the like.

Solution to Problem

Present inventions aim, when a coupling, a hose and the like are subjected to unusually high pressure for some reason or other during the operation, to maintain the coupling condition with the counterpart coupling, appropriately open a leak path in a sealing portion of the coupling and decrease the pressure, and enhance the safety of the coupling itself as well as the whole system. Present inventions described herein also provide a coupling which can warn the operator or the like of an abnormality by ejecting the fluid out from the leak path.

Further, present inventions also aim to provide a coupling reduced in weight and size as much as possible and having the simplest structure possible at much the same cost as that of a conventional coupling and to substitute the present coupling with the safety valve function for the conventional coupling.

In the present inventions, the safety is placed at the highest priority, and thus once the safety valve is operated under abnormally high pressure, the safety valve are not necessarily reset to the original state.

Note that the fluid flowing through the coupling according to each claims of the present invention is mainly assumed to be fluid such as water or sea water, and that the coupling according to present invention is assumed to be applied to all the couplings or the main couplings used in one pumping system composed of hoses or the like. Further, in a case where a coupling is used in a large-capacity foam-water discharge system, at least ten pairs of the present couplings (ten pairs of the couplings in a case where two lines of four hoses are arranged in parallel) may be used.

Advantageous Effects of Invention

According to embodiments, even if the coupling, the hose and the like are subjected to abnormally high pressure for some reason during the operation, as the coupling condition of the coupling is maintained, the leak path is opened in the sealing portion of the coupling and the pressure is reduced, and in this way, the safety of the coupling is enhanced.

Further, according to the present invention the coupling including the fluid ejection ports provided on the coupling body which eject the fluid discharged from the leak path formed between the sealing members which are separated from each other when the pressure of the fluid unusually increases, it is possible to warn the operator of the abnormality which is revealed by ejecting the fluid, which is discharged from the leak path, from the fluid ejection ports.

BRIEF DESCRIPTION OF THE SEVERAL VIEWS OF THE DRAWING

FIG. 2 is a drawing showing a structure of a coupling portion of the coupling of the first embodiment.

FIG. 4 is a side view partly in section of the coupling of the first embodiment.

FIG. 5 is a drawing showing a region near the coupling portions and sealing portions in a state where a safety function of the pair of the couplings of the first embodiment is activated.

FIG. 6C is a cross-section drawing showing a region near the sealing members during an abnormally-high-pressure fluid discharge operation in a state where the pair of couplings of the first embodiment is coupled together.

FIG. 6D is a cross-section drawing showing the sealing members and the sealing portions in a state where the pair of couplings of the first embodiment is coupled together after the abnormally-high-pressure fluid has been discharged.

FIG. 7 is a schematic drawing partly in section showing a pair of couplings of a second embodiment provided in a nearest manifold to a water cannon of a large-capacity foam-water discharge system.

FIG. 15 is an enlarged cross-sectional view of a region near a sealing member built-in groove shown in FIG. 14.

FIG. 16 is a design drawing showing a shape and dimensions of an element of a testing jig as a tensile rod attached to the test specimen corresponding to an example of the fifth embodiment.

FIG. 18 is a cross-sectional design drawing showing a shape and dimensions of a sealing member of the test specimen of the example.

FIG. 21A is an explanatory drawing showing a deformation state of the coupling portion of the test specimen under a tensile load of 2 [kN].

FIG. 22 is an explanatory drawing showing a modification of the engagement hook of the fifth embodiment.

FIG. 23 is a side view partly in section of a pair of couplings of a sixth embodiment in a coupled state.

DETAILED DESCRIPTION OF THE INVENTION

First Embodiment

Figure 1:
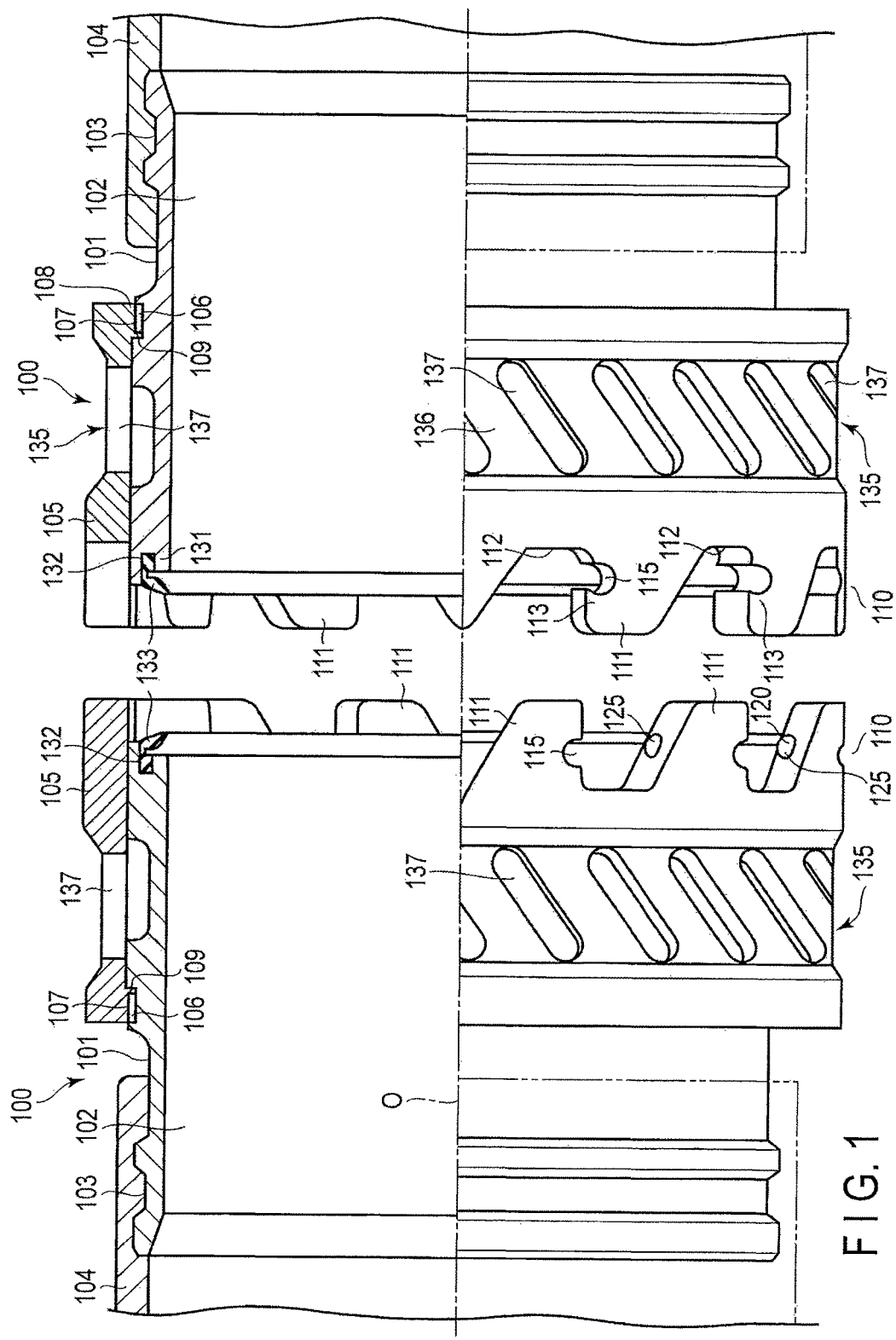
FIG. 1 is a side view partly in section of a pair of couplings of a first embodiment.
Figure 3:
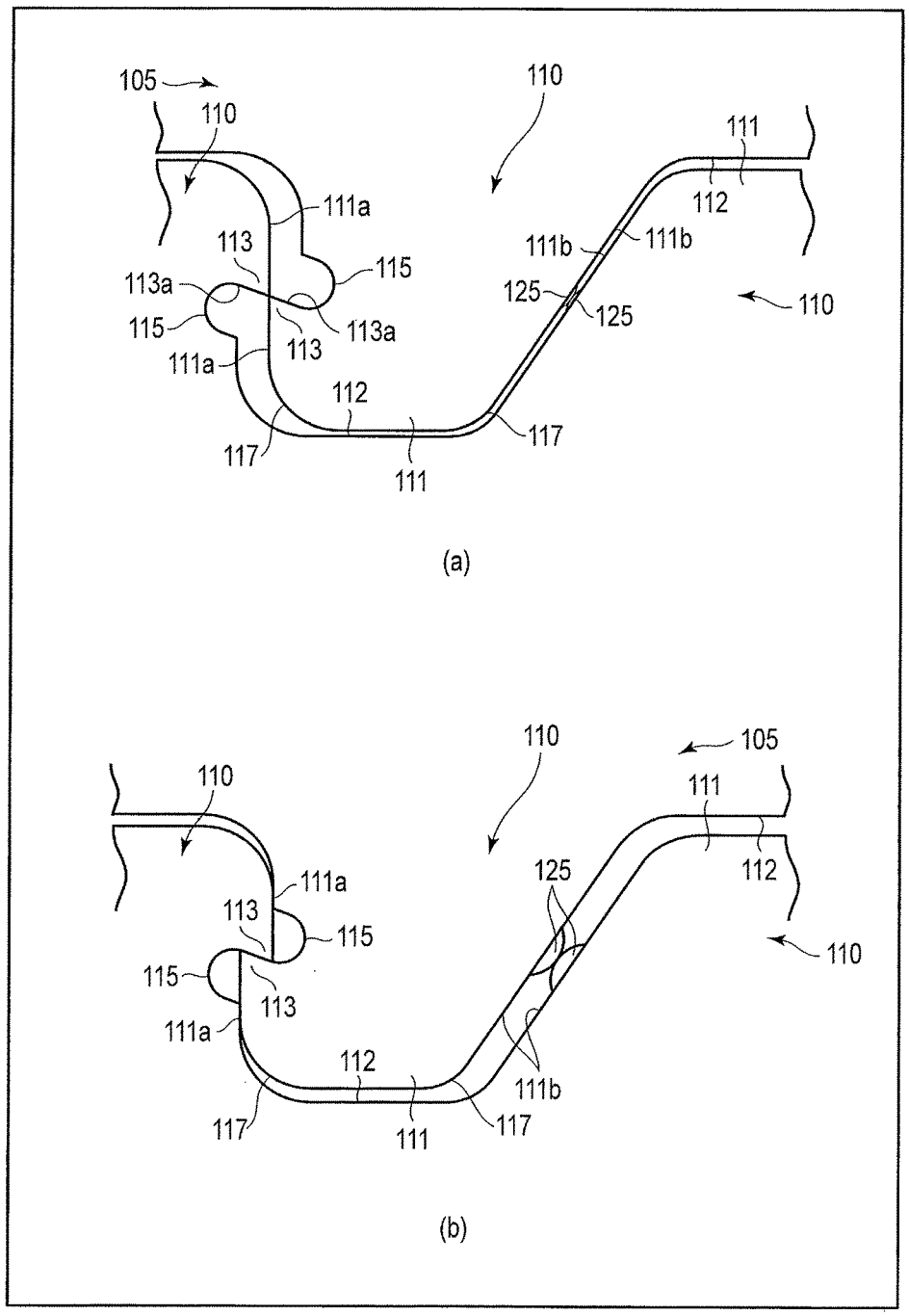
FIG. 3 is a drawing showing a state of the coupling portion when the pair of the couplings of the first embodiment is coupled together.

FIGS. 1 to 6 illustrate the first embodiment. FIG. 1 is a side view of a pair of couplings used as connection joints for a hose, a pipe or the like in the above-described large-capacity foam-water discharge system, and FIG. 2 is an explanatory drawing showing coupling condition where the pair of couplings is coupled together.

Further, in the present embodiment, a pair of couplings 100 has an axially-inverted identical structure, and coupling portions 110, which will be described later, have an identical unisex structure. Still further, each coupling 100 comprises a coupling body 101 formed of a substantially cylindrical tubular member. First, a metal material such as an aluminum alloy or a titanium alloy is forged, drawn, or extruded into a general shape, and the metal material is then subjected to a cutting process or the like, and finally the coupling body 101 is integrally formed. Generally, an ordinary casting product such as a casting has low elongation and poor toughness and is unsuitable for the material of the coupling body 101, and thus in the present embodiment, an ordinary casting product such as a casting is not used for the coupling body 101.

As shown in FIG. 1, the coupling body 101 has a fluid passage 102 which extends along a center axis O of the coupling body 101 in the inner space of the tubular portion of the coupling body 101. The outer periphery of one axial end of the coupling body 101 (an end located on the rear side when the coupling portion 110 side is assumed to be the front side) has recesses and projections, and this portion functions as a attaching portion 103 to which a hose or the like is fitted. To fit a hose or the like to the attaching portion 103, a hose or the like overlaps on the attaching portion 103 and is firmly secured by means of a binder (not shown) or the like.

Further, a substantially-cylindrical coupling part 105 is attached to the other end of the coupling body 101, that is, the outer periphery of the forward end of the coupling body 101 which is opposed to the coupling portion of the counterpart coupling. As in the case of the coupling body 101, the coupling part 105 is formed of a metal material such as an aluminum alloy and is integrally formed. Further, the coupling part 105 including the coupling portion 110, which will be described later, is integrally formed of a metal material such as an aluminum alloy or a titanium alloy is forged, drawn, or extruded into a general shape and is then subjected to a cutting process or the like.

Note that, since an ordinary casting product such as a casting has low elongation and poor toughness and is often unsuitable for the material, as in the case of the coupling body 101, an ordinary casting product such as a casting is not used for the coupling part 105. Further, in light of functions of a deformation portion, a coupling portion and the like, which will be described later, the materials of the coupling body 101 and the coupling part 105, in particular, the material of the coupling part 105 should preferably have an elongation rate of 10% or more. Therefore, the coupling body 101 and the coupling portion 105 are formed of A5056TE of the JIS H 4140-1988: "aluminum or aluminum alloy forgings" and have a tensile strength of 321 N/mm$^2$ and an elongation rate of 22% as measurement values.

Further, a rear end portion located on the back side of the coupling part 105 (on an opposite side to a side where the counterpart coupling is located) functions as an attachment portion to be attached to the coupling body 101. In the inner periphery of the rear end portion, a female screw portion 106 is formed. According to the female screw portion 106, a male screw portion 107 is formed in the middle of the outer periphery of the coupling body 101. As the female screw portion 106 is fitted to the male screw portion 107, the coupling part 105 is secured to the coupling body 101.

Here, the female screw portion 106 is formed on the inner surface of a projected edge portion 108 which slightly projects inward with respect to the other portion of the coupling part 105. Further, as the projected edge portion 108 projects inward, a part of the outer periphery of the coupling body 101 in the position corresponding to the projected edge portion 108 has a smaller diameter, and a step portion 109 is created in the outer periphery of the coupling body 101. Still further, the male screw portion 107 is formed on the bottom surface of the step portion 109. Therefore, as shown in FIG. 1, the projected edge portion 108 of the coupling part 105 abuts into the standing wall of the step portion 109 of the coupling body 101 in an attachment position where the female screw portion 106 of the coupling part 105 is outwardly engaged with the male screw portion 107 of the coupling body 101, and in this way, the axial position of the coupling part 105 with respect to the coupling body 101 is determined, and the forward movement of the coupling part 105 is limited at the same time.

As along as the axial position of the coupling part 105 can be specified with respect to the coupling body 101, the coupling part 105 may also be attached to the coupling body 101 in such a manner where the coupling part 105 rotates around the axis of the coupling body 101. Note that, in the description according to the present inventions, the terms such as "the coupling body", which includes characters meaning "metal parts" in Japanese do not necessarily means that the corresponding members are formed of metal materials. In the description of the embodiments, the term: "coupling" is used in the sense of function, and the coupling also includes a material other than a metal material, for example, a compound material such as a fiber-reinforced resin and the like as long as the material is considered to be suitable in light of the material characteristics such as strength.

The coupling portions 110 are formed at the front ends of the pair of the coupling parts 105. The coupling portions 110 have the same unisex structure and are thus complementary to each other. Further, the coupling portions 110 are integrally formed with the coupling parts 105, respectively. In the present embodiment, the coupling part 105 and the coupling portion 110 are integrally formed with each other, but the coupling part 105 and the coupling portion 110 may be formed as separate members and may be connected to each other.

As shown in FIG. 1, at the front end of the coupling part 105, the coupling portion 110 circumferentially projects a plurality of integrally-formed engagement projections, for example, twelve engagement projections 111 at regular intervals, and engagement recesses 112 are formed between the engagement projections 111. That is, a pair of the engagement projection 111 and the engagement recess 112 is provided within a range of 30° of the circumference, and twelve pairs of these are circumferentially provided.

Further, when a pair of the couplings 100 is axially coupled together, the engagement projections 111 of the one coupling part 105 are fitted into the engagement recesses 112 of the coupling part 105 of the counterpart, and the engagement projections 111 of the coupling part 105 of the counterpart are fitted into the engagement recesses 112 of the coupling part 105 and thus one coupling 100 is complementary to the other coupling 100. Note that the width of the engagement recess 112 in the circumferential direction is slightly greater than the width of the corresponding engagement projection 111 in the circumferential direction. Therefore, the engagement projection 111 is circumferentially rotatable by a predetermined amount (G2) as shown in FIG. 2 within the engagement recess 112.

As shown in FIG. 2, a side surface 111a located on one of the circumferentially-arranged sides of the engagement projection 111 is substantially parallel to the axial direction of the coupling part 105, while a side surface 111b located on the other of the circumferentially-arranged side of the engagement projection 111 is inclined with respect to the axial direction of the coupling part 105 such that the engagement projection 111 is tapered down toward the leading end. In each engagement projection 111, one side surface is inclined such that the width of the engagement projection 111 in the circumferential direction tapers down toward the leading end of the engagement projection 111. Further, to conform to the shape of the engagement projection 111, the width of the engagement recess 112 in the circumferential direction tapers down toward the innermost portion of the engagement recess 112, accordingly.

Still further, as shown in FIG. 2, in a state where the engagement projection 111 and the engagement recess 112 of the counterpart are engaged with each other, a gap G1 is formed between the leading end surface of the engagement projection 111 and the innermost wall surface of the engagement recess 112. Therefore, as will be described later, even if engagement hooks 113 are inclined such that the engagement hooks 113 overhangs each other, the engagement hooks 113 can be easily engaged and disengaged from each other.

Further, as described above, the gap G2 is formed between the back surface of the engagement projection 111 and the back surface of the engagement recess 112. Therefore, it is possible to secure a sufficient distance between an engagement position where the engagement hooks 113, which will be described later, are engaged with each other and a retreat position where the engagement hooks 113 are disengaged from each other. Further, the engagement projection 111 and the engagement recess 112 are axially moved further from a position where the engagement hooks 113 are engaged with each other, and also the engagement projection 111 and the engagement recess 112 are axially rotatable. In this way, the engagement hooks 113 can be engaged with or disengaged from each other.

As shown in FIG. 2, the engagement hooks 113 are formed as a step-like hook in the one side surfaces 111a, which are substantially parallel to the axial direction of the coupling part 105, of the respective engagement projections 111. These engagement hooks 113 will be coupled or uncoupled the pair of couplings by fitting the engagement projections 111 fitted into the innermost of the engagement recesses 112 of the counterpart and then circumferentially rotating the coupling parts 105 each other. That is, as a pair of engagement hooks 113 is getting closer with each other, the engagement hooks 113 are circumferentially engaged with each other and are hooked over each other as shown in FIG. 2. Then, the coupling portions 110 are coupled with each other such that the coupling portions 110 will not be axially separated or detached from each other.

Further, as shown in FIG. 2, an engagement surface 113a of the engagement hook 113 is inclined at a predetermined angle in an overhanging manner with respect to the circumferential direction of the coupling part 105, and since the engagement surface 113a is inclined in this manner, engagement strength of a pair of the engagement hooks 113 in an engaged state is enhanced.

Then, in the fluid transport operation, an axial load of water pressure or the like to be transported is applied to the coupling bodies 101 of the pair of the couplings 100 in separating direction of the couplings 100 each other. The axial tensile load is transferred from the coupling bodies 101 to the coupling parts 105 and further to the engagement hooks 113 which are engaged with each other. Since the engagement surfaces 113a are inclined at a predetermined angle in an overhanging manner, a circumferential rotation force which makes the engagement hooks 113 deeply engage, is generated. With this rotation force, the engagement hooks 113 are further firmly engaged with each other, and the pair of the coupling parts 105 is prevented from being uncoupled or detached from each other.

Further, as shown in FIG. 2, a round notch (curved portion) 115 is formed in the proximal portion of each engagement hook 113 to prevent the proximal portion from concentrating a stress, and an opening of the notch 115 serves as a fluid ejection port 116 having a fluid ejection function, which will be described later.

Note that the leading edge of the engagement projection 111 has arc-like corners, and the arc-like portions serve as guide portions 117 which guide the engagement project 111 into the engagement recess 112. Similarly, the bottom portion of the engagement recess 112 has arc-like round portions 118. When the engagement projection 111 and the engagement recess 112 are engaged with each other, more specifically, when the engagement projection 111 and the engagement recess 112 are brought in contact with each other and abut to be engaged with each other, the guide portion 117 and round portion 118 facilitate the engagement of the engagement projection 111 and the engagement recess 112. Further, the guide portion 117 and the round portion 118 prevent stress concentration in the base portion of the engagement hook 113 and increase the strength of the coupling portion 110 comprising the engagement projection 111 including the engagement hook 113 and the engagement recesses 112.

Still further, a pushing mechanism 120, which will be described later, is assembled in a position corresponding to the other inclined side surface 111b of the engagement projection 111. The pushing mechanism 120 comprises, as shown in FIG. 2, a pushing member, for example, a steel ball 125, accommodated in a cylindrical case member 124a in a freely projectable and retractable manner and a spring 126 which applies a pressing force to the steel ball 125 in the projecting direction, and the pushing mechanism 120 constitutes the so-called ball plunger. Further, the steel ball 125 is partly projected from the side surface 111b. Therefore, as shown in FIG. 3a, when the engagement projections 111 are fitted into the engagement recesses 112, the steel ball 125 hits and pushes against the steel ball 125 of the other side. Consequently, the engagement projections 111 are pushed in directions where the engagement projections 111 are separated from each other.

As a result, the engagement projections 111 are pushed in directions where the side surfaces 111a of the engagement projections 111 are brought closer to each other, and this pressing force maintains the engagement hooks 113 to be engaged with each other as shown in FIG. 3b. Further, since the pushing mechanism 120 pushes one engagement projection 111 away from the other engagement projection 111, in the engagement of the pair of the couplings 100, the pushing mechanism 120 leads one engagement hook 113 to be engaged with the other engagement hook 113. Then, the pressing force of the pushing mechanism 120 maintains the engagement hooks 113 to be engaged with each other, after the engagement hooks 113 are engaged with each other.

In the meantime, as shown in FIG. 1, a seal ring portion 131 is integrally formed with a member of the coupling body 101 at the front end of the coupling body 101. The seal ring portion 131 has a sealing member fitting groove 132. The sealing member fitting groove 132 opens axially forward and is arranged concentrically with respect to the axis of the coupling body 101.

In the present embodiment, although the coupling body 101 and the seal ring portion 131 are integrally formed with each other, it is also possible to attach attachment member for a sealing member to the coupling body 101 and then form a sealing member fitting groove 132 in this attachment member.

Figure 6A:
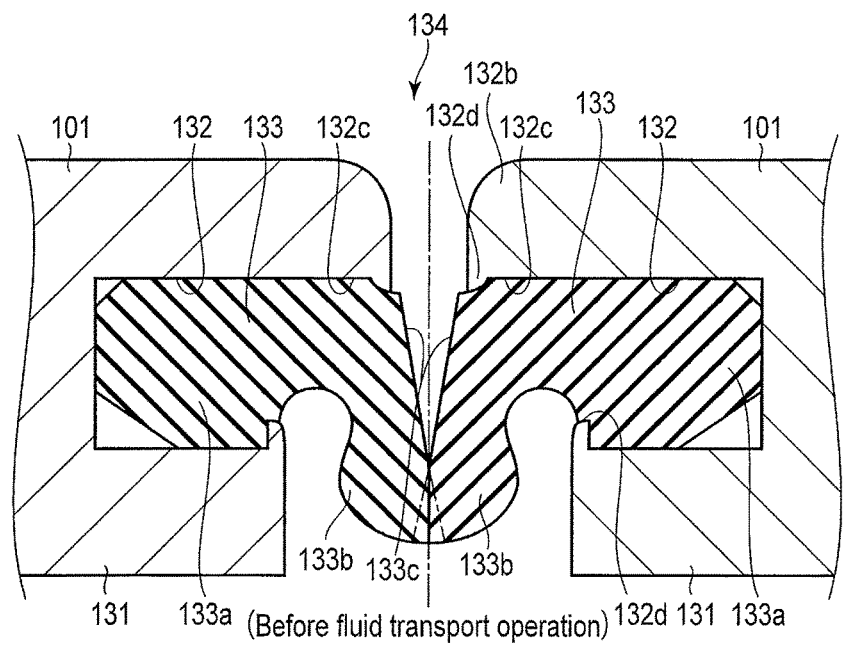
FIG. 6A is a cross-section drawing showing a region near sealing members in a state where the pair of couplings of the first embodiment is coupled together.

The sealing member fitting groove 132 is attached an annular sealing member 133 formed of an elastic member. The sealing member 133 is a lip seal type sealing member. The sealing member 133 is attached to the fitting groove by inserting a base portion 133a of the sealing member 133 in the fitting groove 132. Further, as shown in FIG. 6A, the sealing member 133 has a lip-like tip portion 133b which is continuous from the base portion 133a, extends forward, and is bent inward. The sealing member 133 has a contact face (abutting face) 133c which is provided on a front surface of the lip-like tip portion 133b and is opposed to the lip-like tip portion 133b of the counterpart coupling.

The contact face 133c of the lip-like tip portion 133b is inclined such that the inner part of the contact face 133c in the radial direction projects forward with respect to the outer part of the contact face 133c (FIG. 6D shows a free state). Since the contact face 133c is inclined such that the contact face 133c gradually projects forward toward the innermost part of the contact face 133c in a free state where the pair of the couplings 100 has not coupled together yet, when the pair of the couplings 100 shown in FIG. 6A is coupled together, only the ends of the coupling faces 133c contact each other and the leading edges (the innermost parts in the radial direction) are most strongly pressed against each other. When the lip-like tip portions 133b are in a state shown in FIG. 6A, the pair of the couplings 100 is coupled together, before the fluid transports.

Figure 6B:
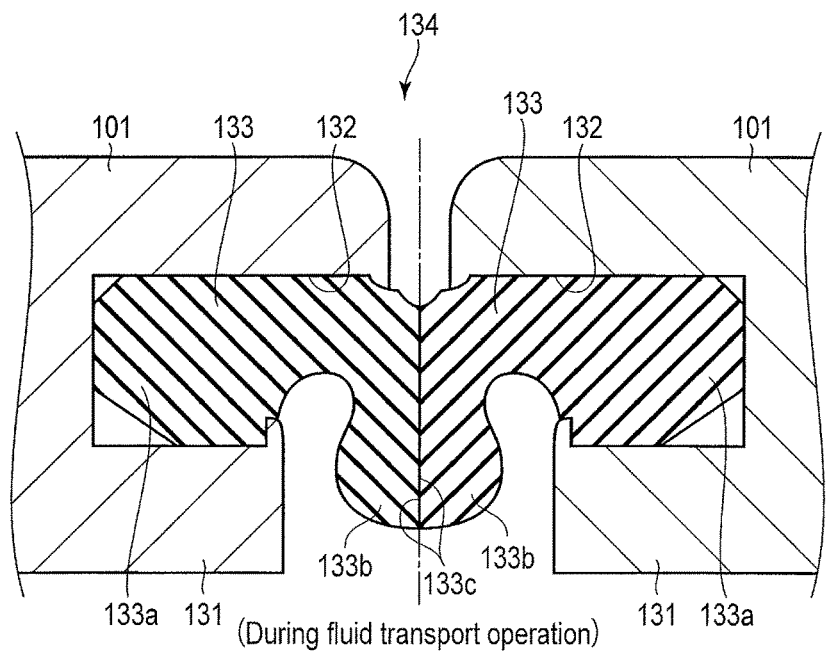
FIG. 6B is a cross-section drawing showing a region near the sealing members during a fluid transport operation in a state where the pair of couplings of the first embodiment is coupled together.

Further, during the fluid transport operation, as the lip-like tip portions 133b are pressed by the internal fluid pressure (for example, 1.3 MPa), the lip-like tip portions 133b are pushed to the outside and are elastically deformed as shown in FIG. 6B, and as the entire contact faces 133c are tightly in contact with each other, the sealing effect is enhanced. When the lip-like tip portions 113b are a closed state, the contact faces 133c near the leading edges (the innermost parts in the radial direction) of the lip-like edge portions 133b are in contact with each other under the strongest contact pressure, and thus the fluid will not leak from between the lip-like tip portions 133b to the outside.

Further, as shown in FIG. 6A, at the opening edge of the fitting groove 132, an inner region, which corresponds to a portion where the lip-like tip portion 133b is bent inward, retreats as compared to an outer peripheral region of the coupling body. With this structure, it is possible to secure a sufficient room for the lip-like tip portion 133b to bend inward, and to form a receiving portion 132c which receives the bending portion of the lip-like tip portion 133b in the outer peripheral region of the opening edge of the fitting groove 132.

Still further, the fitting groove 132 has a projection 132d which projects toward the center of the opening of the fitting groove 132 and is formed in the circumference of the opening edge of the fitting groove 132. The projection portion 132d prevents the base portion 133a of the sealing member 133 from coming off the fitting groove 132. The projection portion 132d may be formed at a part of the circumference of the opening edge of the fitting groove. 132 or may be formed at the entire circumference of the opening edge of the fitting groove 132.

In the meantime, the sealing members 133 of the pair of the couplings 100 are in such a relationship where the sealing member 133 of one coupling 100 will be a valve seat when the sealing member 133 of the counterpart coupling 100 is assumed to be a valve body and will be a valve body when the sealing member 133 of the counterpart coupling 100 is assumed to be a valve seat. That is, when serving as the valve body and the valve seat of the safety valve, the sealing members 133 of the pair of the couplings 100 are complementary to each other. The sealing members 133 have the same shape as each other, and a safety valve 134 has a valve structure such as the sealing members 133 abut each other. Also, the seal ring portion 131 and the sealing member 133 may be unified and may be in such a relationship where each of the seal ring portion 131 and the sealing member 133 serves as a valve body or a valve seat. The sealing members 133 are also the sealing portion when the pair of the couplings 100 is coupled together.

Further, in light of the relationship of the pair of the sealing members 133 to the coupling portions 110, the contact faces (sealing faces) 133c of the sealing members 133 are in contact with each other in the middle of the engagement projection 111 and the engagement recess 112, that is, in the middle of the engagement position as shown in FIG. 2. Still further, this position is the center of the engagement region of the engagement faces 133a of the engagement hooks 113. That is, as shown in FIG. 2, the center of the pair of the engagement hooks 113 which are engaged with each other coincides with the contact plane of the contact faces 133c of the sealing members 133 which are in contact with each other. Further, the engagement position of the pair of the engagement hooks 113 is located in the middle of the pair of the fluid ejection ports 116 formed by the notches (curved portions) 115 of the pair of the engagement hooks 113. Still further, the contact plane of the contact surfaces 133c of the sealing members 133 is located in such a position as to cross the gap G2 formed between the back surface of the engagement projection 111 and the back surface of the engagement recess 112.

Note that, although the steel balls 125 of the pushing mechanisms 120 are located in the gap G2, when the pressure of the fluid to be transported unusually increases and the fluid is then discharged from the leakage path 138 to the outside, the steel balls 125 are pushed into the respective case members 124 against the ejecting forces of the respective springs 126 by the force (mainly the kinetic pressure) of the fluid to be discharged, and thus an active region can be sufficiently secured in the gap G2 for the fluid ejection ports. In this way, relatively-large fluid ejection ports can be created also in the gap G2 (see FIG. 5).

Further, as shown in FIG. 1, coupling part 105 has a deformation portion 135 which is formed in the middle portion and is axially stretched by a predetermined amount when an unusually-large axial tensile force is applied. The deformation portion 135 is integrally formed with the coupling part 105 in a region between the coupling portion 110 provided with the engagement hook 113 and the female screw portion 106 of the coupling part 105. That is, the deformation portion 135 has a strength to the axial tensile force which is weak than the other portion of the coupling part 105, and thus the deformation portion 135 is stretched first before any other portion of the coupling part 105 when the deformation portion 135 is applied the axial tensile force. As the deformation portion 135 is axially stretched, the entire length of the coupling part 105 is axially extended.

If the deformation portion 135 is formed of the material which has the same characteristic of elongation, the same configuration in the dimension such as the thickness, the length of the deformation portion 135 in the axial direction (the thrust direction) is longer, the dimension of elongation (of the deformation portion 135) is longer when the deformation portion 135 is applied the axial tensile force in the axial direction. In consideration of the above point, the shape, the dimension in the axial direction, and the like of the deformation portion 135 are appropriately determined.

The deformation portion 135 is not necessarily formed in a part of the coupling part 105 but may be entirely formed on the whole length of the coupling part 105.

Next, the deformation portion 135 of the first embodiment will be described in details. The deformation portion 135 is located between a rear end portion of the coupling part 105 provided with the female screw portion 106 serving as the attachment portion to the coupling body 101 and a front end portion of the coupling part 105 provided with the coupling portion 110 the deformation portion 135 is formed by using a wall part at a midsection of the coupling part 105. That is, as shown in FIG. 1, the deformation portion 135 circumferentially forms an annular groove 136 on the outer peripheral wall of the coupling part 105, and the portion corresponding to the annular groove 136 is formed as a relatively thin wall portion as compared to the other portion of the coupling part 105. The deformation portion 135 is consisted of a thin portion in which a plurality of long holes 137 is cut out. These long holes 137 are inclined in parallel with respect to the center axis of the coupling body 101 and are circumferentially arranged at regular intervals. Each of the long holes 137 is arranged in a direction as a left-hand multiple-start thread.

Further, when an unusually strong axial tensile force is applied to the deformation portion 135, the deformation portion 135 is elongated in the axial direction of the coupling. More specifically, when an unusually strong tensile force is applied to the deformation portion 135, the band plate portions remaining between the oblique long holes 137 are bend first, before the coupling body 101 or the other portion of the coupling part 105 is deformed, and then the entire deformation portion 135 is axially stretched. Since the rear end of the coupling part 105 is fastened to the coupling body 101, the coupling part 105 extends forward to the coupling portion 110, the front end of the coupling part 105 axially moves forward with respect to the coupling body 101.

The long holes 137 of the deformation portion 135 are formed in the left-hand thread direction, and thus an urging force is generated to rotate the coupling part 105 in a right-hand (clockwise) direction when the deformation portion 135 is axially stretched. This rotation force acts in a direction to deeply engage the engagement hook 113 of one coupling part 105 with the engagement hook 113 of the counterpart coupling part 105. Therefore, as the deformation portion 135 is elongated, the deformation portion 135 produces an effect of maintaining an engagement between the engagement hooks 113. Consequently, the deformation portion 135 is provide a function of axially extending the coupling part 105 and is produce a force to keep the engagement of the engagement hooks 113 with each other.

Next, the technical effect will be described when the coupling 100 of the first embodiment is used. First, to engage the pair of the couplings 100 together, as shown in FIG. 1, the coupling portions 110 of the couplings 100 are opposed to each other on the same axis, and then the engagement projections 111 are inserted into the engagement recesses 112. Then, as shown in FIG. 3a, the engagement projections 111 and the engagement recesses 112 are engaged with each other, and the steel balls 125 of the pushing mechanisms 120 are pushed away each other and the engagement projections 111 are circumferentially urged in the opposite directions at the same time. Therefore, it is possible to guide the couplings 100 to a state shown in FIG. 3b where the engagement hooks 113 are engaged with each other without actively rotating the couplings 100 in the circumferential directions. In a case where the coupling 100 has a significantly-large size, the operator should preferably assist engagement movements of the engagement hooks 113 by circumferentially rotating the couplings 100.

In the present embodiment, the coupling part 105 is secured to the coupling body 101, and thus the coupling part 105 is not independently rotatable. However, in such a structure where the coupling part 105 is rotatably attached to the coupling body 101, it is possible to couple the pair of the couplings 100 together simply by rotating the coupling part 105.

In the meantime, in a state where the pair of the couplings 100 is coupled together as shown in FIG. 2, the sealing members 133 of the pair of the couplings 100 are in contact with each other. More specifically, as shown in FIG. 6A, the leading edges of the lip-like tip portions 133b of the sealing members 133 are pressed against each other. Then, under the inner pressure (fluid pressure) in the normal fluid transport operation, as shown in FIG. 6B, the lip-like tip portions 133b are pushed from inside to the outside by the pressure, and thus the sealing contact faces 133c are entirely in contact with each other and the sealing members 133 are tightly sealed with each other.

As described above, there is a case where a water hammer or the like occurs on the water supply line for various reasons such as an inappropriate operation of a valve or a lack of cooperation between pumps installed on the water supply line, and in the event of an abnormal pressure surge on the water supply line, the abnormally-high pressure activates the safety valve function of the coupling 100.

Note that the relationship between the working pressure (this is the normal maximum working pressure and is usually indicated on the label, and this explanation will be omitted hereafter) of the coupling and the abnormally-high pressure in the present embodiment varies depending on a system which adopts the coupling. If the coupling is used as a connection joint which connects a hose or pipe in a large-capacity foam-water discharge system, generally, the working pressure (fluid pressure) in the fluid passage 102 during the fluid transport operation is about 1.0 to 1.6 MPa (megapascal), and the test pressure is about 1.5 to 2.4 MPa. Note that the test pressure is generally about 1.5 to 2 times the working pressure, and the abnormally-high pressure in the present embodiment is assumed to be about 3 to 4 times the working pressure (about 2 times the test pressure).

In an implementation of the coupling of the present embodiment, which will be described later, the coupling is used as the connection joint which connects a hose or a pipe in a large-capacity foam-water discharge system, and a working pressure for a coupling called a 300 mm coupling is 1.3 MPa and a test pressure for it is 1.5 times the working pressure or more (2.0 MPa). Note that the bursting pressure of the hose body is a slightly less than 2.5 times (3.0 MPa) the working pressure and that the abnormally-high pressure which activates the safety valve function of the coupling is set about 3 times the working pressure (3.9 MPa). Here, the reason for providing a large margin of 0.9 MPa between the bursting pressure of the hose and the abnormally-high pressure is to prevent the safety valve function from being activated or the deformation portion 135 or 140 of the present coupling from being plastically deformed although there is no immediate danger of the coupling being broken and flying off.

Next, the activation of the safety valve function of the coupling 100 will be described. When the pair of the couplings 100 is coupled together, the sealing members 133 are in the state shown in FIG. 6A. Further, during the fluid transport operation, the sealing members 133 are in the state shown in FIG. 6B, that is, in a state where the contact faces 133c are, although most strongly pushed against each other at the innermost edges, and pushed against each other substantially entirely. Still further, according to the pressure of the fluid to be transported, the butting force between the sealing members 133 increases.

When the pressure (fluid pressure) in the fluid passage 102 extremely increases for some reason or other and exceeds predetermined level, the tensile force, which separates the pair of the couplings 100 from each other, increases according to the pressure. This axial tensile force is transferred all over from the coupling body 101 to the deformation portion 135 of the coupling part 105 and further to the coupling portion 110.

As a result, the deformation portion 135, which is the most easily deformable portion, is axially elongated. More specifically, the deformation portion 135 is deformed in such a manner where the band plate portions formed between the long holes 137 are untwisted and the inclination of the band plate portions approaches the axial direction of the coupling part 105 (see FIG. 4). Here, the coupling part 105 is designed such that the deformation portion 135 is preferentially elongated in the axial direction, and the portions other than the deformation portion 135 will hardly be stretched even under a tensile load. Note that, since the long holes 137 are oblique, the band plate portions are easily deformable by bidirectional flexural and tensile stresses. Then, the whole deformation portion 135 is axially elongated, and according to this extension, the overall length of the coupling part 105 is axially extended.

In this way, when the pressure of the fluid within the fluid passage 102 unusually increases and exceeds a predetermined level, the deformation portion 135 is axially elongated. On the other hand, the coupling body 101 equipped with the sealing member 133 will not be stretched. Therefore, the sealing member 133 located at the front end of the coupling body 101 retreats with respect to the coupling portion 110 and changes from a sealed state shown in FIG. 2 to an open state shown in FIG. 5. That is, the sealing members 133 retreat with respect to the coupling portions 110 respectively. (Note that, in other words, the engagement portions of the pair of the coupling portions 110 proceed with respect to the sealing members 133 respectively.)

At this time, a retreat amount R of the sealing member 133 corresponds to an axial extension amount of the deformation portion 135 (see FIG. 5). Then, as the sealing members 133 of the pair of the coupling bodies 101 are separated from each other, the leak path 138 is formed therebetween. Since the pair of the couplings 100 is formed in the same structure, each coupling 100 retreats by the same retreat amount R, and the sealing members 133 of the pair of the couplings 100 are separated from each other at a distance L corresponding to the sum of these retreat amounts R.

Then, when an unusual fluid pressure surge occurs, the leak path 138 which has a width (L) of 2R appears between the sealing members 133, and the leak path 138 communicates with the fluid passages 102 of the coupling bodies 101. Subsequently, the unusually-high-pressure fluid in the fluid passages 102 is discharged from the couplings 100 through the leak path 138.

At this time, the lip-like tip portions 133b of the respective sealing members 133 are turned inside out by the flow of the fluid to be discharged through the leak path 138 and will be in a state shown in FIG. 6C in most cases. In this case also, the leak path 138 is still formed between the lip-like tip portions 133b, and as long as the unusually-high-pressure fluid remains, the high-pressure fluid is continuously discharged from the couplings 100. When the high-pressure fluid is completely discharged from the couplings 100 through the leak path 138, the pressure of the fluid within the fluid passage 102 rapidly decreases. Then, as the pressure drops down to the working level or lower immediately, the unusually high pressure state is dissolved, and the fluid pressure will not be higher than that level.

As described above, when the pressure of the fluid within the fluid passage 102 is unusually high, the safety value function portion 134 opens to discharge the high-pressure fluid of the fluid passage 102 to the outside through the leak path 138 and to reduce the fluid pressure within the fluid passage 102.

Therefore, the coupling portions 110 and the like will not be broken or damaged. Further, at this time, the pair of the couplings 100 is maintained in the coupling condition.

Still further, when the fluid within the fluid passages 102 has unusually high pressure, the deformation portions 135 are preferentially elongated and the leak path 138 is opened between the sealing members 133 at a stage where the pair of the couplings is still coupled together by the coupling portions 110, and thus the safety valve function portion 134 performs a safety valve (pressure valve) function. Consequently, it is possible to prevent a danger associated with detachment of couplings caused by disruption of the coupled state of the coupling portions 110 or the like.

In the present embodiment, as shown in FIG. 5, when the high-pressure fluid within the fluid passage 102 is discharged through the leak path 138, the distance between the distal ends (valve body/valve seat faces) of the two sealing members 133 opposed each other is 2 times the lift amount of the one sealing member 133.

Therefore, in the present embodiment, an elongation characteristics of the deformation portion 135 of the coupling part 105 is set such that the deformation portion 135 is axially elongated without causing disruption of the coupled state of the coupling portion 110 until the valve body/valve seat (seal surface) of one sealing member 133 is separated from the valve body/valve seat (seal surface) of the counterpart sealing member 133 by a total lift amount of greater than or equal to 1/100 the minimum inner diameter of the fluid passage 102 of the coupling 100. This means that the fluid passage area (curtain area) of the leak path 138 formed of the valve body/valve seat faces is greater than or equal to 4% of the fluid passage area of the hose, the pipe or the like which is connected to the couplings 100.

Figure 19:
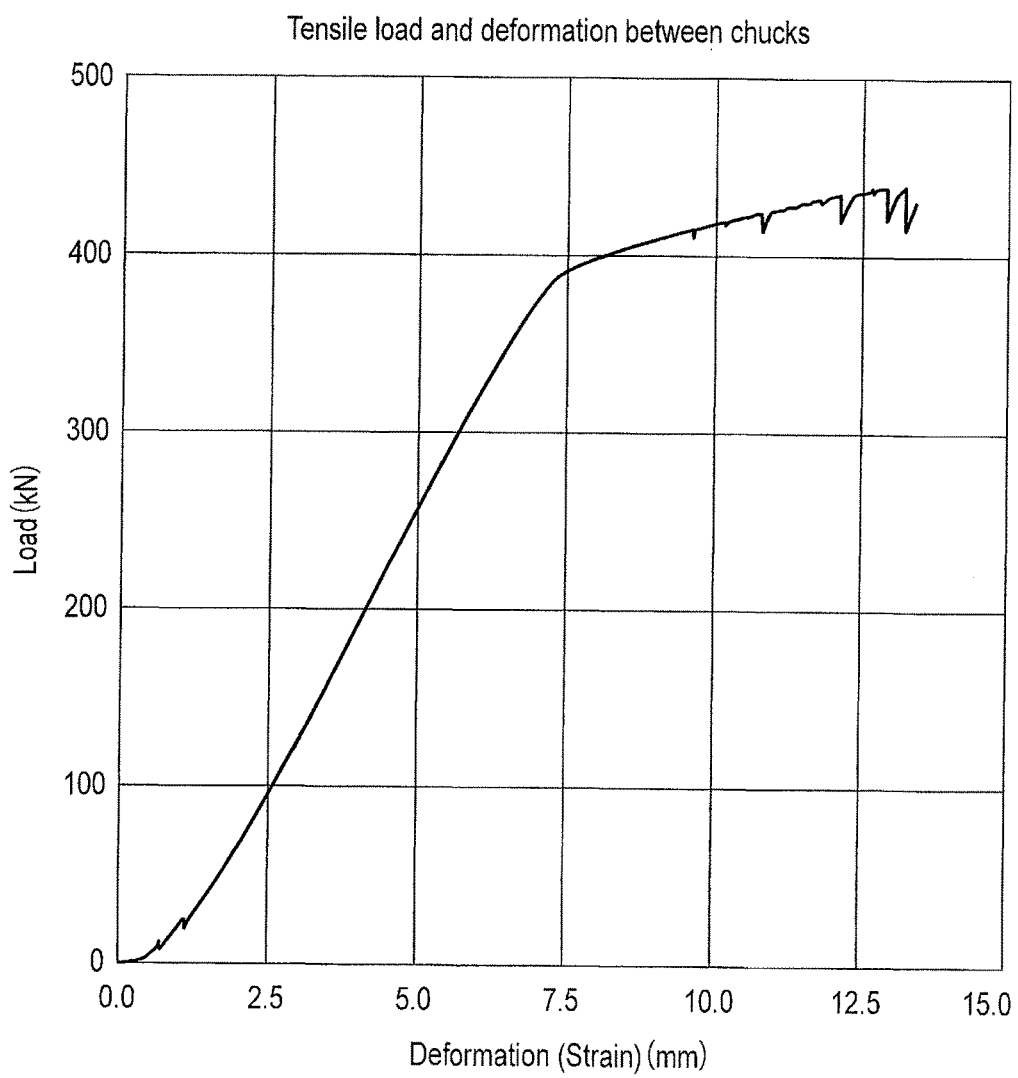
FIG. 19 is a chart automatically drawn by a testing machine and showing a test result of the test specimen in terms of a tensile load and a deformation (deformation between chucks).

Note that, in the example of a test for the coupling of the present embodiment, which will be described later, as shown in a graph of FIG. 19, "under a load of 440 kN (about 4.6 times the working pressure) within a pressure range where the coupling will not be broken, each of the seal rings was lifted about 5.9 mm, and the lift amount was 2.1/100 (5.9/275=0.0214) the minimum inner diameter, that is 275 mm (see FIG. 12), of the fluid passage 102".

On the other hand, in the case of the "lift-type safety valve" defined in the JIS B 8210-2009, the lift amount is specified as being greater than or equal to 1/40, which means that the value seat fluid passage area (curtain area) is greater than or equal to 10% of the fluid passage area (valve seat portion area) of the hose, the pipe or the like which is connected to the couplings 100. Therefore, the discharge area of the alarm safety valve alone is 2/5 the discharge area of the above-described JIS lift safety valve. If only the fluid passage area (curtain area) of the leak path 138 is taken into consideration, it is possible to secure a discharge area greater that of the JIS lift safety valve by using three set of the alarm safety valves of the present embodiment.

In the present embodiment, since both sealing members 133 (valve members) move, the lift amount of the valve member of one sealing member 133 is 0.5/100 the minimum inner diameter of the fluid passage, and the total lift amount of 1/100 the minimum inner diameter of the fluid passage is secured by the two sealing members 133.

In the example of the test for the coupling of the present embodiment, which will be described below, such a sealing structure where lip-seal-type sealing members (packing rings) are abutted with each other is adopted. However, when the fluid pressure is very low, it is difficult to expect the pushing force of internal pressure to sufficiently press the sealing members (packing rings) against each other. In that case, the lip-seal-type sealing members may be arranged in such packing positions where "the sealing members are pushed against each other by a total lift amount of a range 0.7/100 to 1/100 the diameter of the valve body/valve seat opening (in the case of a type 150 to 400 mm coupling)" when the pair of the couplings is coupled together.

Therefore, when the safety valve 134 has a lift amount of greater than or equal to 1/100 the minimum inner diameter, the sealing members 133 are not pushed against each other, and thus if the inner pressure is applied by the unusually-high-pressure fluid in this state, the seaming members 133 in these positions will form an effective gap of greater than or equal to 0.5/100 the minimum inner diameter of the fluid passage 102 as shown in FIG. 6C (that is, the curtain area where the fluid is actually discharged from the sealing portions will be greater than or equal to 2% of the minimum area of the fluid passage 102).

The inverting phenomenon of the sealing members 133 by the inner pressure is occurred even though a gap is not created between the sealing members 133 when the sealing member 133 have lost the pushing force between them. Under such high pressure greater than the test pressure, the sealing members 133 will be inverted by the inner pressure when the sealing members 133 are lifted halfway (by half a lift amount of 0.7 to 1/100 the diameter of the valve seat opening) from the pushing position of the sealing members 133 where the sealing members 133 are originally pushed against each other at a time when the pair of the couplings is coupled together. Here, the pushing position of the sealing members 133 are arranged in the position where the sealing members 133 are brought further closer to each other than a point where the sealing members 133 are, although abutting with each other, not deformed yet.

In the present embodiment, when the fluid pressure unusually increases, the deformation portion 135 is axially elongated, the sealing member 133 is axially lifted, and the fluid is discharged from the sealing portion of the sealing member 133 to the outside of the coupling, and here the area of the leak path 138 where the fluid is discharged from the present coupling is set to greater than or equal to 1% of the minimum area of the fluid passage 102 of the present coupling.

In the case of using an ordinary safety valve, an unusually-high-pressure fluid is generally discharged by a single safety valve. However, in a large system such as the above-described large-capacity foam-water discharge system, at least ten pairs of the couplings will be used, and thus each of the couplings should be a coupling with a safety valve function and should perform a safety valve function of discharging an unusually-high pressure fluid. This structure satisfies the above-described requirement for the JIS B 8210 lift-type safety valve: "regarding the fluid passage area at a time when the valve body opens, the valve seat fluid passage area (curtain area) is the smallest fluid passage area, and the safety valve has a lift amount of greater than or equal to 1/40", that is, "the actual fluid discharge area is greater than or equal to 10% of the valve seat area". Here, each pair of the coupling with the alarm safety valve function needs to satisfy 1/10 the above-described requirement (such that the total requirement for the ten pairs of the present couplings will be the same as the above-described requirement for the JIS lift-type safety valve). Note that the JIS does not specify a water discharge amount of an alarm safety valve.

In the case of the deformation portion 135 of the present invention, the deformation portion 135 slightly exhibits elastic deformation under normal pressure and thus is hardly stretched until pressure significantly increases and exceeds a predetermined abnormally high level. Until the pressure exceeds the predetermined abnormally high level, the sealing members are pushed against each other, and the leakage of the pressure fluid is prevented. When the pressure exceeds the predetermined abnormally high level, the deformation portion 135 is plastically deformed and elongated (once the deformation portion 135 is significantly elongated, the deformation portion 135 may not be restored to the original shape). Further, when the fluid pressure in the fluid passage 102 is abnormally high, as shown in FIG. 5, the sealing members 133 are separated from each other, and the leak path 138 is created therebetween. In the region of the leak path 138, the fluid ejection ports 116 formed by the notches 115 of the engagement hooks 113 are located. That is, a part of the region of the leak path 138 overlaps a part of the region of the fluid ejection ports 116. Therefore, the high-pressure fluid discharged from the leak path 138 is swiftly discharged from the leak path 138 to the outside via the fluid ejection ports 116 linearly. Consequently, the fluid linearly discharged to the outside through the fluid ejection ports 116 is ejected to the outside of the couplings without being subjected to unnecessary resistance on the way. Since it is possible to discharge the leaking fluid in such a manner as to squirt the leaking fluid high or far away, it becomes possible to clearly notify of the abnormality by the squirting fluid. Therefore, the abnormality is more easily identifiable, and thus the observer, the operator and the like can easily recognize the abnormality by simply looking at the spouting fluid.

Further, the fluid is discharged from another engagement gap of the coupling portion which is formed in a position other than a position where the engagement hook 113 is disposed. Particularly, in a position where the steel ball 125 of the pushing mechanism 120 is arranged on the side surface of the engagement projection 111, the gap G2 opens relatively widely, and since the leak path 138 is located in the opening region of the gap G2, it is possible to spout the fluid also from the region (fluid ejection port). Further, the steel ball 125 is sunk into a state shown in FIG. 5 by the flow of the high-pressure fluid when the fluid is discharged, and thus the steel ball 125 will not disturb the discharge of the high-pressure fluid but will allow large ejection ports to be created in that region.

Still further, the coupling portion 110 has the engagement projections 111 and the engagement recesses 112 at the front end of the coupling part 105, and the coupling portion 110 covers the coupling body 101 such that the inner surface of the coupling portion 110 is in close contact with the outer surface of the coupling body 101. Between the inner surface of the coupling portion 110 and the outer surface of the coupling body 101, there is only a gap sufficient for a smooth coupling operation. Therefore, a large volume of a fluid will not be discharged from between the inner surface of the coupling portion 110 and the outer surface of the coupling body 101.

Still further, the coupling of the present embodiment is a 300 mm coupling comprising the notches 115 in twelve radial directions, in addition to the gaps formed where the steel balls 125 are provided, and thus the fluid squirts in twenty-four radial directions in total, that is, the fluid squirts substantially in all directions. Therefore, a part of the leaking splash will be always observable regardless of the installation orientation of the coupling, and thus the abnormality can be easily recognized. If three fluid ejection ports 116 are circumferentially arranged at regular intervals, one port is always located at an angle of elevation greater than or equal to 30° on the upper half of the circumference, and thus an abnormality will be sufficiently noticeable. More preferably, six or more fluid ejection ports 116 should be circumferentially arranged at regular intervals, and in that case, one port is always located at an angle of elevation greater than or equal to 60° on the upper half of the circumference.

As described above, according to the present embodiment, since the fluid ejection port 116 functions as an ejection nozzle which squirts a fluid, the squirt fluid is easy to recognize, and the abnormality can be easily monitored. Therefore, the function of monitoring and warning of abnormality can be effectively and noticeably performed. Further, since the present invention has such an additional discharge function of ejecting the fluid from the fluid ejection portion 116 in an immediately noticeable fashion even from a distance, the present invention is suitable for a significantly-large system such as a large-capacity foam-water discharge system.

Further, as the fluid ejection ports 116 of the present embodiment, the notches 115, which prevent stress concentrations on the portions corresponding to the engagement hooks 113, are used. Therefore, as compared to the case of separately providing the fluid ejection ports 116, the structure can be simplified. It is also possible to provide the fluid ejection ports 116 in other positions of the region of the leak path 138, but in that case, it is necessary to take into consideration a decrease in the coupling strength associated with the processing of opening holes.

Still further, the deformation portion 135 of the present embodiment is hardly elongated until the pressure exceeds a predetermined unusually-high level, and normally, the sealing members 133 are pushed against each other, and the leakage of the fluid is prevented. However, when the pressure exceeds the predetermined level, the deformation portion 135 is preferentially elongated to such an extent that the leak path 138 is formed. When the deformation portion 135 is elongated to such an extent that the leak path 138 is formed, the deformation portion 135 may be restored or may not be restored to the original shape, but if the deformation portion 135 is not restored to the original shape, the coupling part or the coupling itself needs to be replaced. Here, costs such as replacement or disposal of the coupling part 105 or the coupling 100 are considered to be inevitable because such an abnormality rarely occurs or the function is rarely activated, and also because when the function is activated, disruption or damage of the coupled state can be reliably prevented and a serious accident such as a fatal injury can be reliably avoided.

Figure 27:
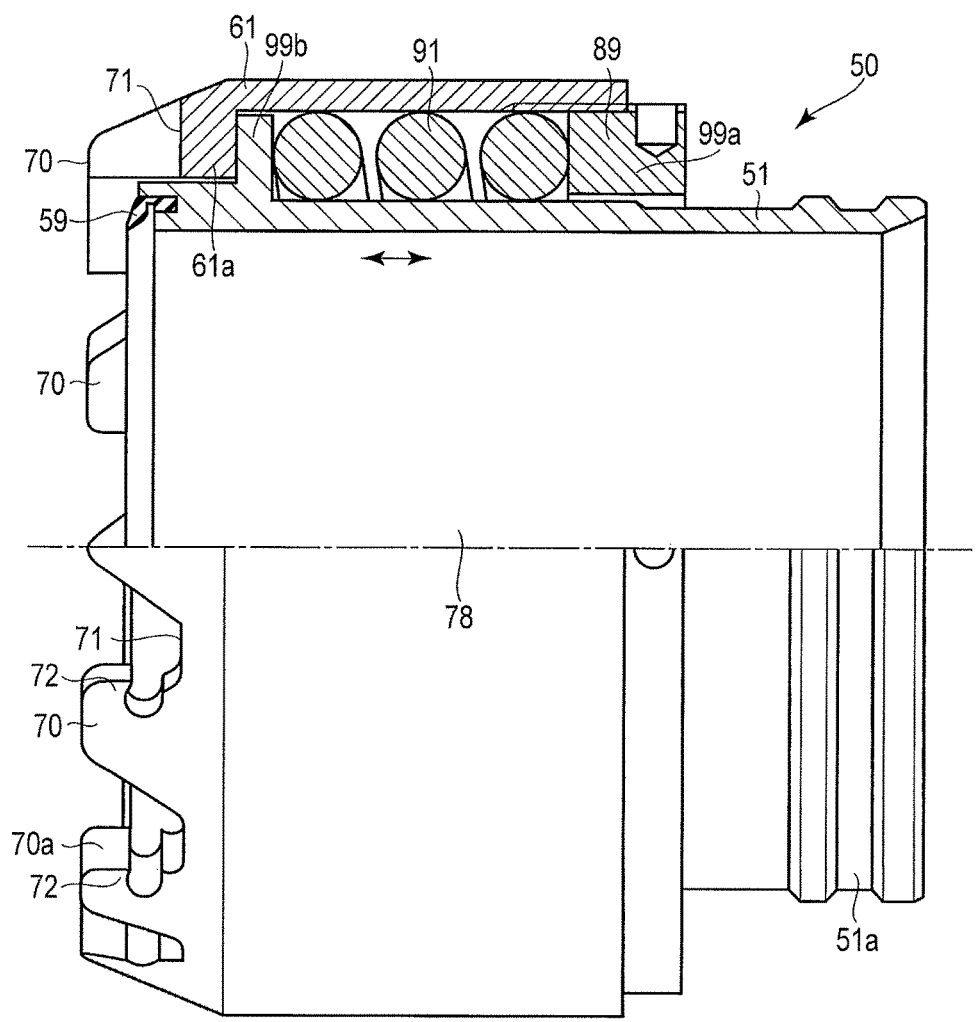
FIG. 27 is a side view partly in section of a further improved coupling with a safety valve mechanism.

In the present embodiment, it is not necessary to incorporate the valve body 86, the valve seat 84 and the like of the safety valve 80 into the coupling as separate structural elements, comparing with the coupling shown in FIG. 27 conceived by the inventor. Further, it is not necessary to incorporate, as an urging element for the valve body 86, a large coil spring into the coupling, either.

Further, in the present embodiment, it is possible to realize the coupling comprising the safety valve function by simply forming the deformation portion in a part of the coupling part itself which constitutes the coupling portion without changing the basic structures of the coupling portion and the seal portion of the coupling 100. Still further, since various members concurrently serve as a plurality of functional units, it is possible, without increasing the size of the coupling, to relatively simplify the structure of the coupling and to reduce the manufacturing cost of the coupling.

In the present embodiment, the sealing members of the valve bodies are pushed against each other and are sealed from the fluid in the normal operation, and when the pressure of the fluid to be transported is abnormally increased to high pressure, the coupling bodies are partly axially elongated without the coupling bodies will not be broken, the sealing member as the valve body (valve seat face) is separated from the sealing member or the seal portion as the counterpart valve seat face (valve body), and a leak path through which the high-pressure fluid is discharged is formed, and in this way, the safety valve function is realized. Therefore, it is unnecessary to separately incorporate into a coupling, an additional complicated valve body biasing device which discharges abnormally-high-pressure fluid of the fluid passage. Further, since it is only necessary to provide the deformation portion such that a part of the coupling part within a predetermined range can be substantially uniformly deformed by a necessary amount, it is possible to use one of the structural elements of the coupling, namely, the coupling part as the valve body biasing device and to simplify the structure of the coupling.

Still further, in the present embodiment, the deformation portion is configured to be formed by forming a thin wall portion in the member of the coupling part and by cutting out a plurality of long holes in the thin wall portion. However, the deformation portion may be configured to be formed by directly cutting out a plurality of long holes in the member of the coupling part without forming a thin wall portion. Still further, the deformation portion may be configured to be formed by forming a plurality of long holes which are not through-holes penetrating through the wall of the coupling part but has a bottom such as grooves, respectively. Still further, the deformation portion may be configured to be formed by forming a plurality of holes (or hollows) instead of a plurality of long holes. Still further, as the axially-deformable structure, a wall structure where walls can be formed in deformable diameter such that the deformation portion can be bulged or shrunk, or various other structures may be adopted as the deformation portion of the present embodiment.

Second Embodiment

Figure 24:
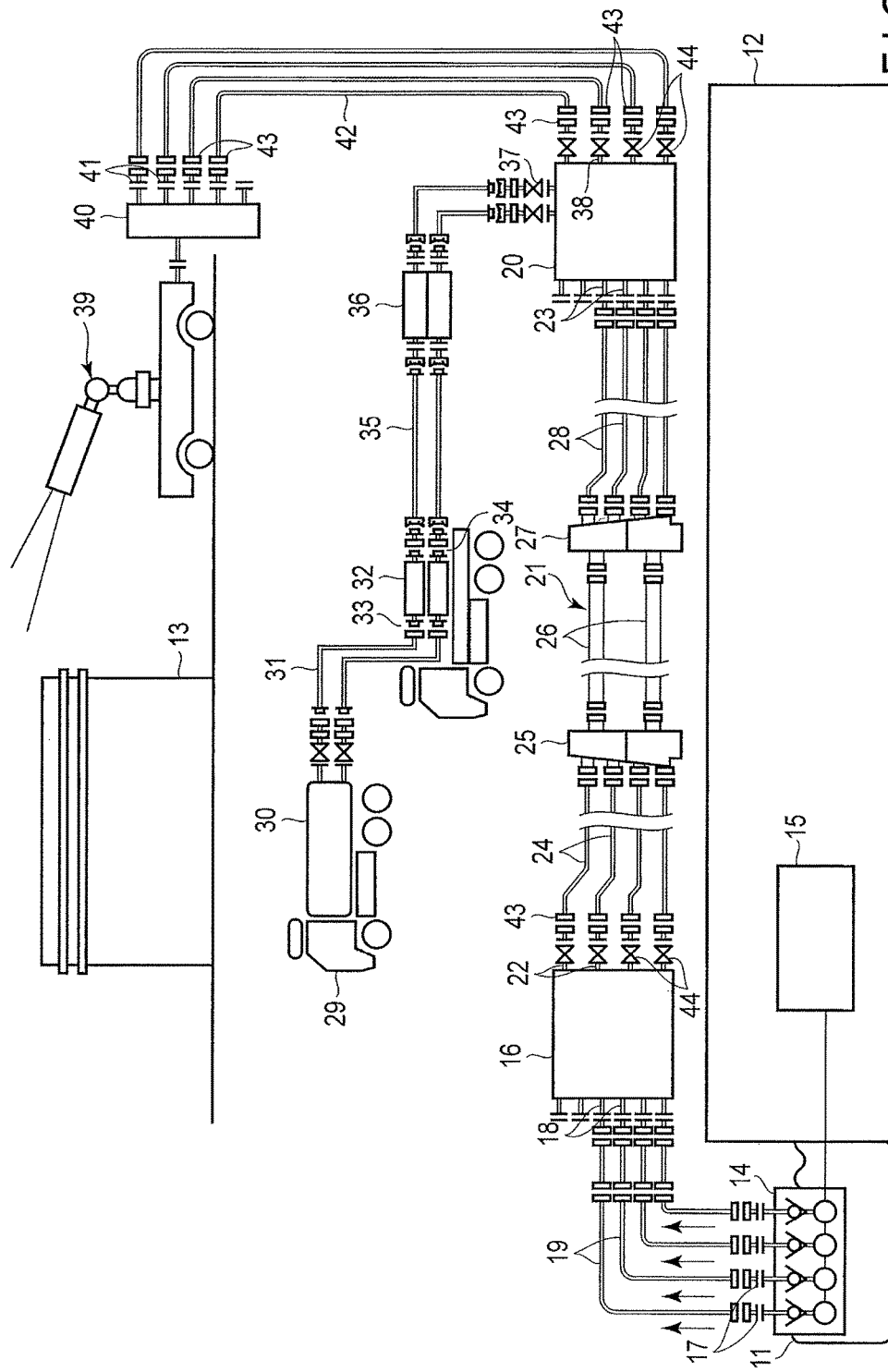
FIG. 24 is an explanatory drawing schematically showing the structure of a large-capacity foam-water discharge system.
Figure 25:
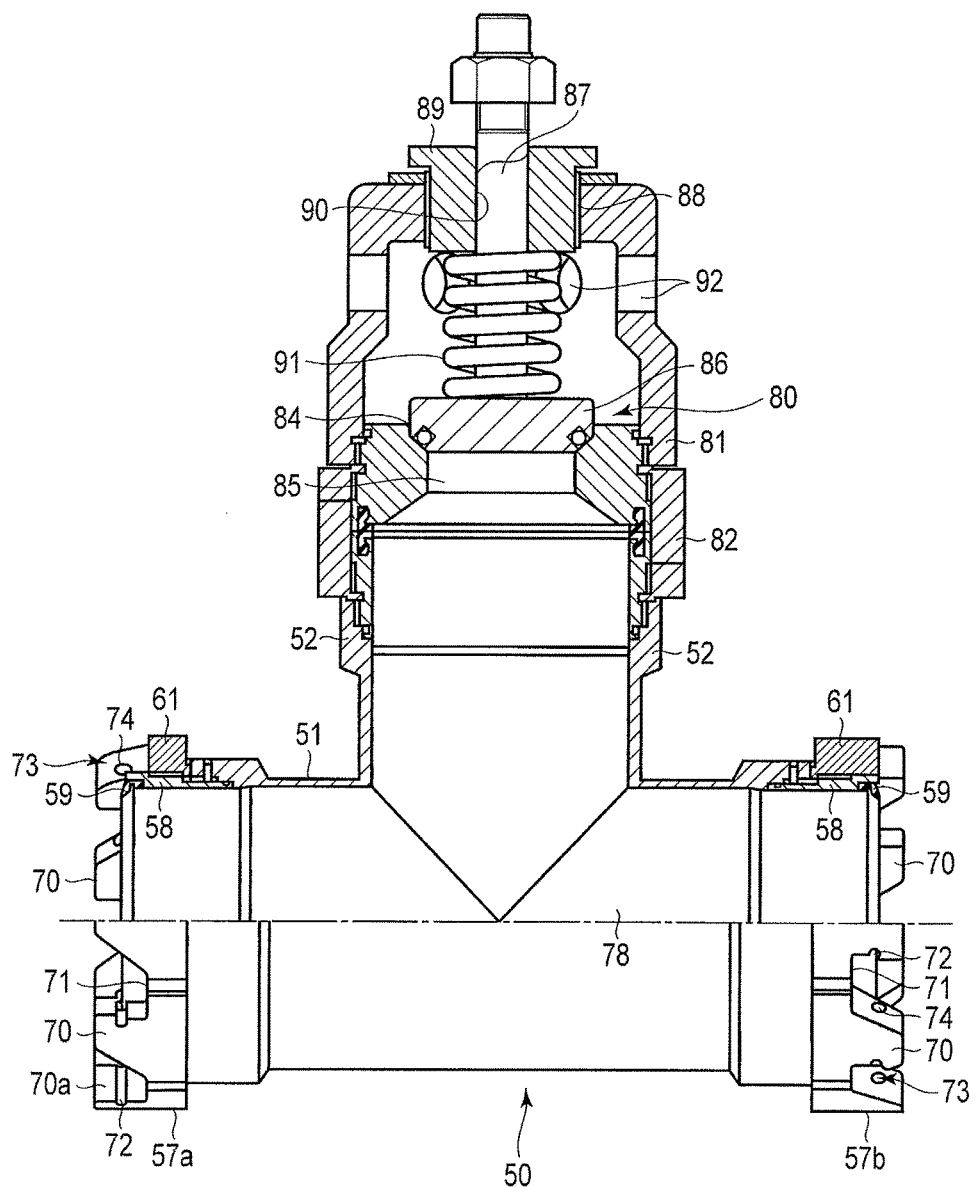
FIG. 25 is a side view partly in section of a coupling with a safety valve mechanism.
Figure 26:
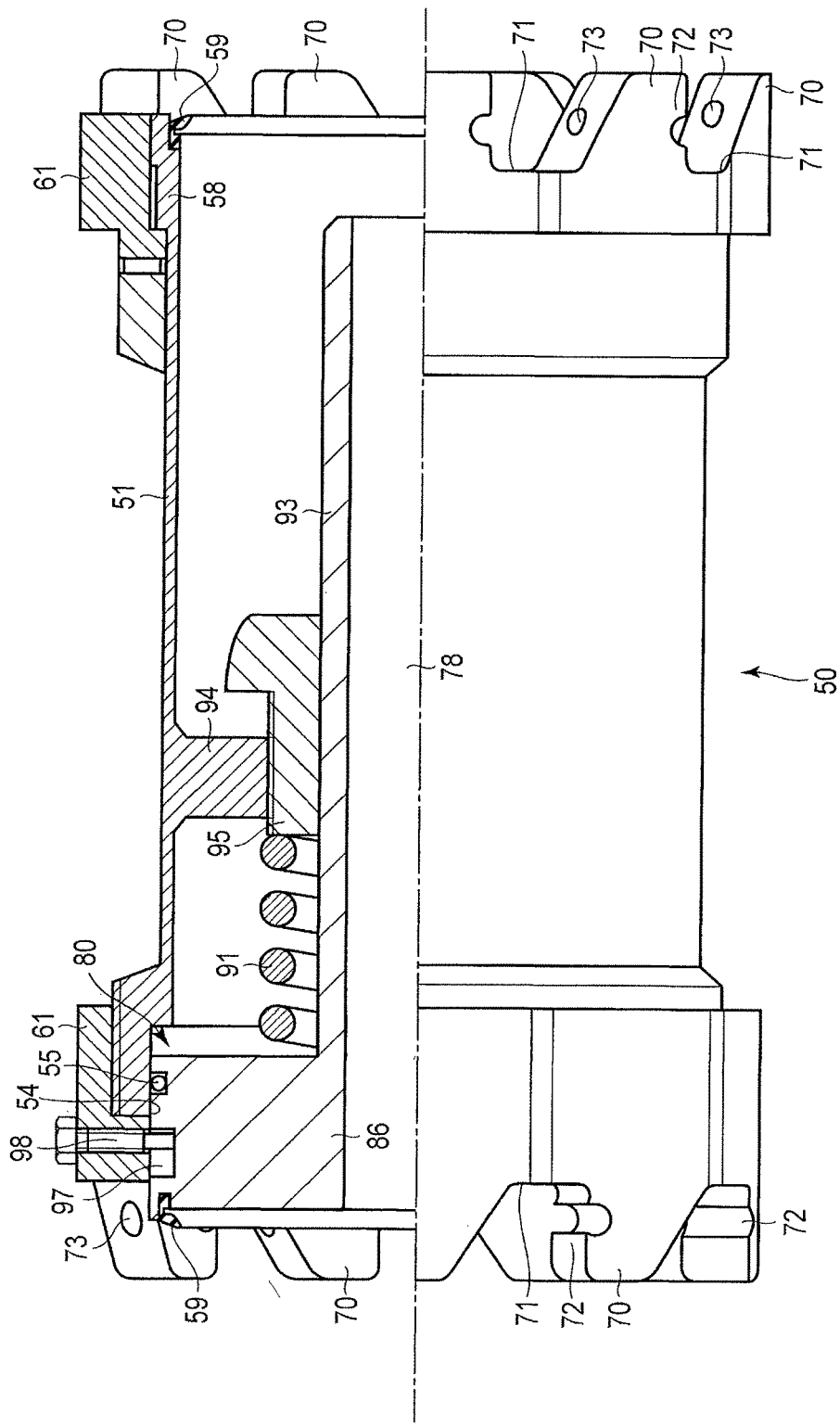
FIG. 26 is a side view partly in section of an improved coupling with a safety valve mechanism.

Next, the second embodiment will be described with reference to FIG. 7. In the second embodiment, one of the pair of the couplings is assumed to be a coupling 100a provided in the manifold 40 which is the closest to the water cannon 39 in the large-capacity foam-water discharge system shown in FIG. 24, and the coupling 100 with the safety mechanism is realized by the pair of the couplings. In the other points, the second embodiment is the same as the first embodiment.

Note that the coupling 100a provided in the manifold 40 does not comprise any deformation portion 135 but only the other coupling 100 comprises a deformation portion 135 and may perform a leakage function and an alarm function in manners similar to those of the first embodiment. In this case, when the pressure of a fluid within a fluid passage 102 abnormally increases and exceeds a predetermined level, a sealing member 133 of the coupling 100a provided in the manifold 40 of the large-capacity foam-water discharge system will not make any axial movement, but since the deformation portion 135 of the other coupling 100 is deformed, only the sealing member 133 of the outer coupling 100 axially moves and forms the leak path 138. In this case, since only one sealing member 133 retreats, the total separation amount of the pair of the sealing members 133 corresponds to the retreat amount R of the one sealing member 133, and thus the leak path 138 corresponding to the retreat amount R of the one sealing member 133 is formed. Therefore, the width of the leak path 138 is substantially a half of the width of the leak path 138 of the first embodiment.

Third Embodiment

Figure 8:
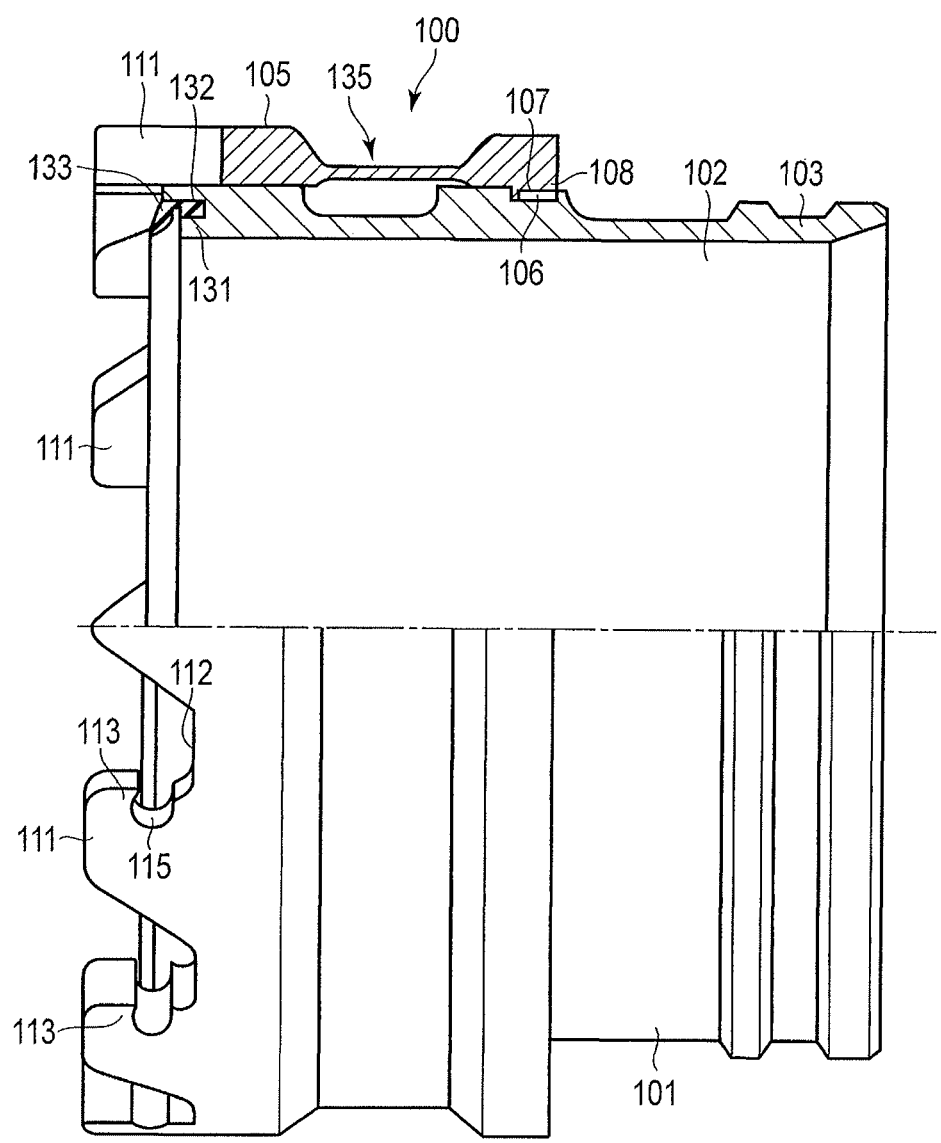
FIG. 8 is a side view partly in section of a coupling of a third embodiment.

Next, the third embodiment will be described with reference FIG. 8. FIG. 8 is a sectional side view of one of a pair of couplings 100. In the third embodiment, a deformation portion 135 only includes a thin portion (the axial sectional area of this portion is less than the axial section area of the other portion of the coupling part 105, and under the same axial load, the tensile stress on this portion is greater than the tensile stress on the other portion of the coupling part 105, and this portion is first elongated). Note that, unlike the thin portion of the above-described embodiment provided with the long holes, the thin portion of the present embodiment will not be subjected to both a flexural stress and a tensile stress, and thus the thin portion will be less stretched. Therefore, it is necessary to extend the longitudinal dimension of the deformation portion itself or use a particularly extensible material for the deformation portion. However, since the deformation portion 135 is not composed of holes, grooves or the like but is only composed of a thin portion, unlike the above-described embodiment, it is not necessary to perform any special additional machining for long holes by using an end milling cutter in the manufacturing processing of the deformation portion 135, and it is possible to manufacture the coupling part 105 by simply machining a thin portion by using a general purpose lathe, for example. Further, in the present embodiment, a part of the coupling part 105 in proximity to the deformation portion can be simplified. Still further, the manufacturing cost of the coupling part 105 can be reduced. In the third embodiment, the other structural elements and the like are basically the same as those of the first embodiment.

Fourth Embodiment

Figure 9:
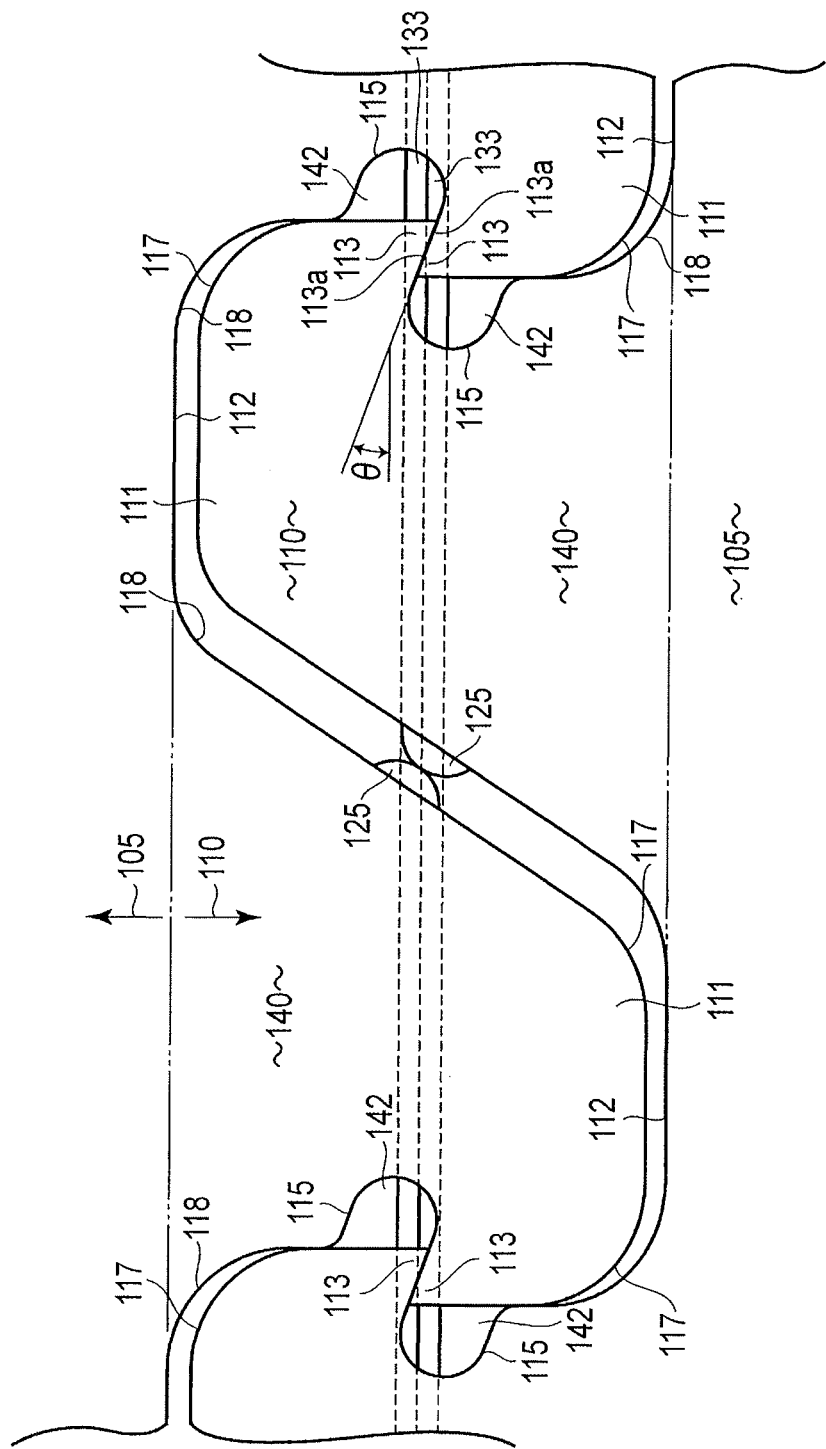
FIG. 9 is a drawing showing a region near coupling portions and sealing portions in a state where coupling portions of a pair of couplings of a fourth embodiment are coupled together.
Figure 10:
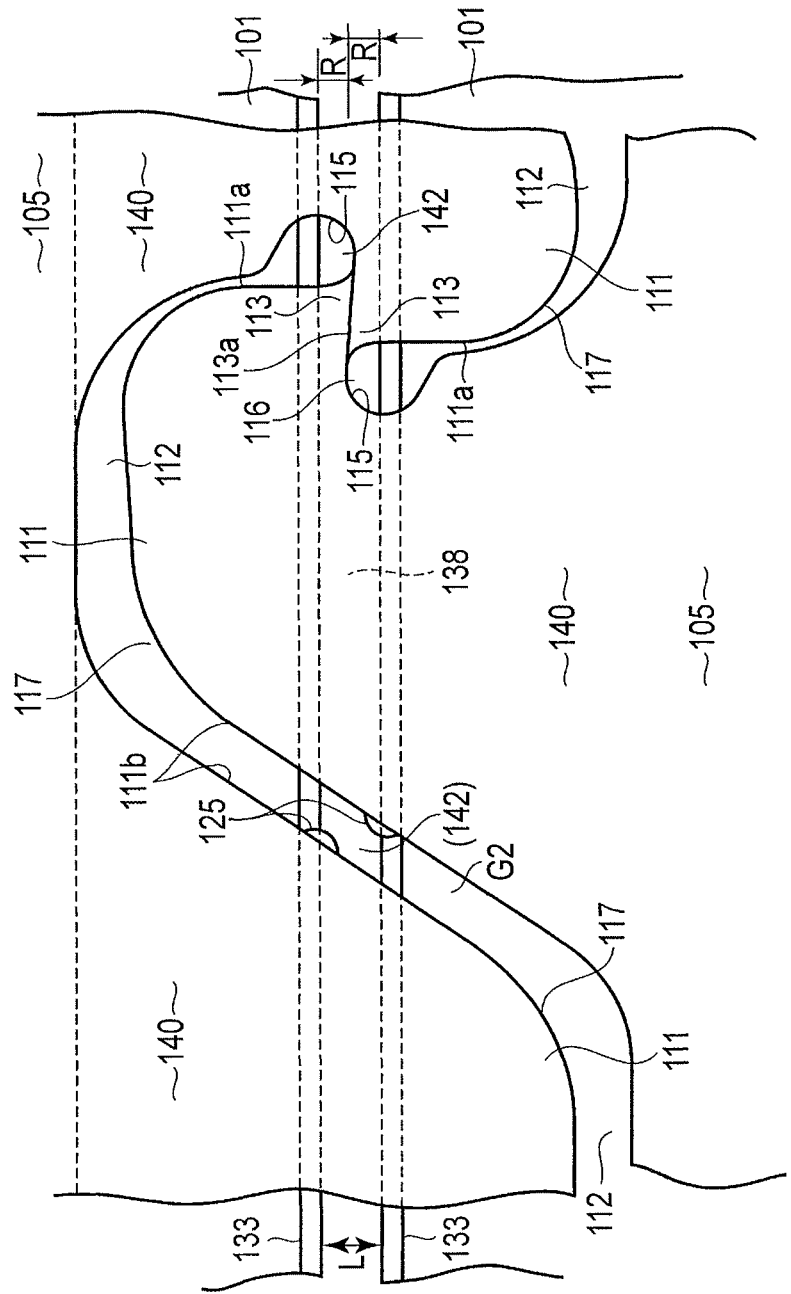
FIG. 10 is a drawing showing a region near the coupling portions and the sealing portion in a state where a safety function of the pair of the couplings of the fourth embodiment is activated.
Figure 11:
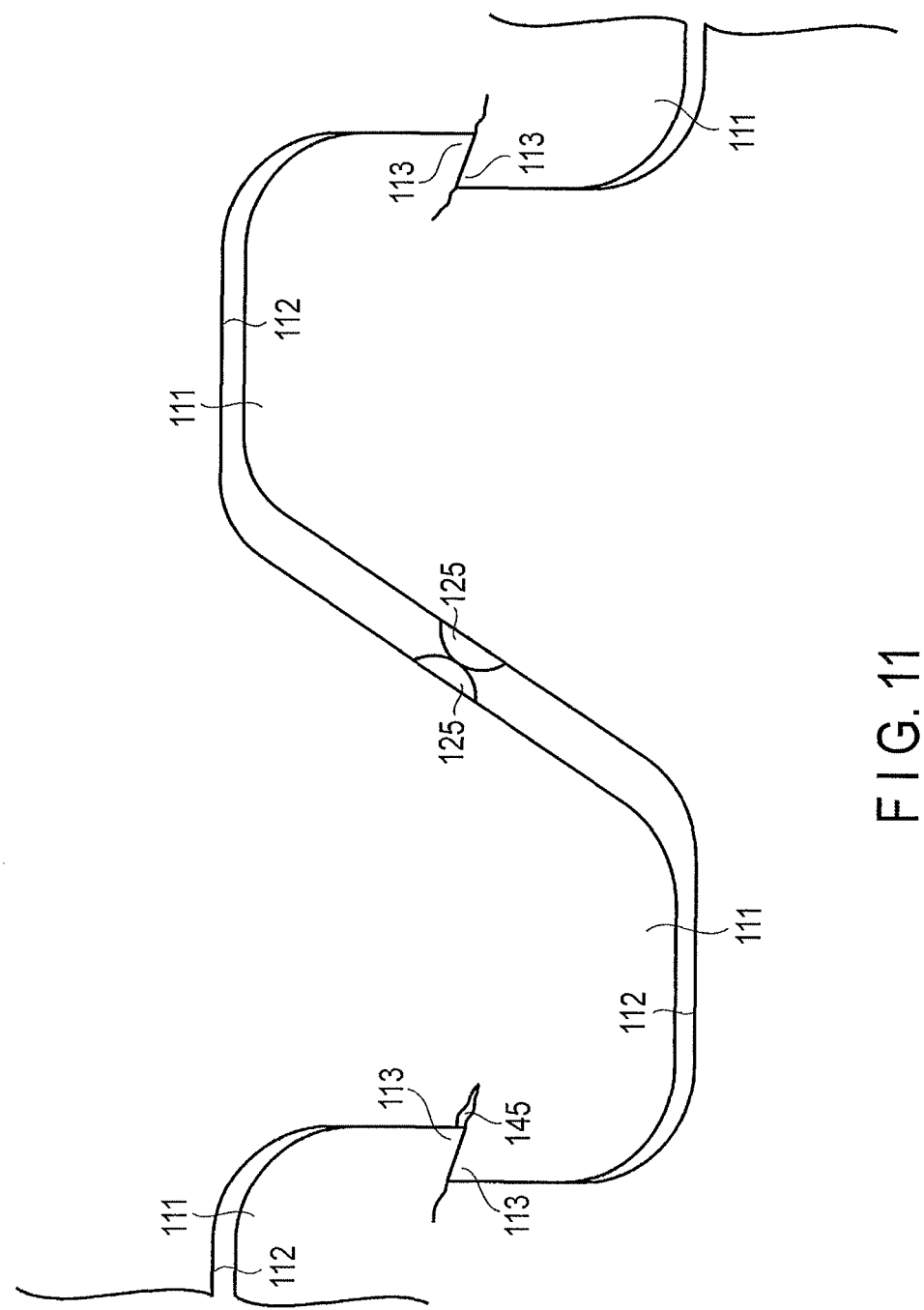
FIG. 11 is a drawing showing a state where a crack or the like is made in a proximal portion of an engagement hook provided with no relief hole.

Next, the fourth embodiment will be described with reference to FIGS. 9 to 11. FIG. 9 is an illustration showing a state of coupling portions when a pair of couplings is coupled together, and FIG. 10 is an illustration showing a state of the coupling portions when a safety function is activated. Further, FIG. 11 is an illustration showing a state where a base portion of an engagement hook cracks.

In the above-described embodiments, the deformation portion 135 is formed in the middle portion of the coupling part 105 other than the coupling portion 110, but in the fourth embodiment, to achieve further simplification of a structure and further reduction in weight and size, a deformation portion 140 is formed in the region of the coupling portion 110. In the present embodiment, the basic structure of the coupling is substantially the same as that of the above-described embodiments.

In the present embodiment, the deformation portion 140 is formed of a portion of the coupling portion 110 which constitutes the engagement projection 111, and as the deformation portion 140 plastically is deformed, the whole coupling portion 110 is axially stretched. As the pressure of fluid within a fluid passage 102 of the coupling 100 unusually increases and the axial tensile stress is applied to the coupling part 105, the deformation portion 140 axially extends the coupling portion 110.

Further, the engagement hook 113 is unevenly formed on one side of the engagement projection 111 and is engaged with the other engagement hook 113, and thus as shown in FIG. 10, while the engagement hook 113 is engaged with the other engagement hook 113, the whole engagement projections 111 are gradually bent and axially elongated. Then, at a stage where the engagement hooks 113 are maintained engaging condition, the whole engagement projections 111 deform to extend and axially elongate the coupling portions 110 without causing these engagement hooks 113 to be uncoupled from each other by disruption of the coupled state.

In the present embodiment, the coupling portion 110 constitutes the deformation portion 140. Further, when the pressure of the fluid within the fluid passage 102 of the coupling 100 is abnormally high, the sealing members 133, which have been pushed against each other, retreat in such a manner as to be separated from each other as shown in FIG. 10, and the leak path (fluid discharge passage) 138 for releasing the high-pressure fluid to the outside is created between the sealing members 133.

In the meantime, a stress tends to locally concentrate on a region near the engagement hook 113 of the engagement projection 111 of the coupling portion 110, and thus if the engagement hook 113 is cut out in such a manner as to have a sharp corner in the base portion of the engagement hook 113, as shown in FIG. 11, a stress tends to concentrate on the corner, a crack 145 such as that shown in FIG. 11 will be created in a portion near the base portion of the engagement hook 113 before the whole engagement projection 111, that is, the whole coupling portion 110 is deformed and elongated, and the engagement hook 113 may break off from this portion. Therefore, in the present embodiment, to prevent concentration of a stress on the base portion of the engagement hook 113, a round notch (curved portion) 115 is formed in the base portion of the engagement hook 113 as shown in FIG. 9, and in this way, a stress will not be concentrated on the base portion of the engagement hook 113 or the engagement hook 113 will not crack. Further, since the notch 115 also serves as a fluid ejection port 142, the notch 115 is formed in large size.

Further, as shown in FIG. 10, as the deformation portions 140 are axially elongated, the sealing members 133 as the valve bodies retreat to be separated from each other, and the leak path 138 is created between the sealing members 133. Still further, at least a part of the fluid ejection portion 142 overlaps the region of the leak path 138. Further, the position of a part of the region of the leak path 138 also corresponds to the position (here, the region of the gap G2 around where the steel balls 125 of the pushing mechanisms 120 are installed) between the side surfaces of the engagement projections 111 opposite to the side of the engagement projections 111 provided with the engagement hooks 113. Therefore, the region of the gap G2 is also regarded as the fluid ejection port 142.

In the meantime, the engagement face of one engagement hook 113 are axially abutted and engaged with the engagement face of the engagement hook 113 of the counterpart coupling. A coupling force produced by the engagement is transferred from the coupling portions 110 to the coupling parts 105 and further to the coupling bodies 101.

Further, since the engagement projection 111 is tapered off and has a broader width toward the base end, that is, toward the coupling part 105 side, it is possible to prevent concentration of a stress on the base end portion of the coupling portion 110. Still further, as the length of the engagement projection 111 extends, the leading end area of the engagement projection 111 for supporting the engagement hook 113 increases, and the strength of the engagement hook 113 with respect to the tensile load increases, accordingly. Still further, even in the case of using a material of the same elongation, it is possible to increase the lift amount of the sealing member 133 by increasing the area from the base portion of the engagement projection 111 to the engagement portion of the engagement hook 113. Hence, the leak path as the safety valve function can be secured for releasing a sufficient amount of discharge.

Still further, when the engagement projection 111 is applied an unusually high tensile load, the engagement projection 111 is, while slightly being bent, axially elongated. Therefore, it is necessary to take measures to prevent from disengaging of the engagement hooks in consideration of this bending deformation. Therefore, the engagement face 113a of the engagement hook 113 is inclined in an overhanging manner with respect to the circumferential direction of the coupling part, and a counter-angle "θ" is set to greater than that of the conventional coupling. For example, in the outer periphery development diagram, the counter-angle θ should preferably be greater than that of the conventional coupling, that is, greater than 15 degrees. The counter-angle θ should preferably be, for example, within a range of 20 to 30 degrees, more desirably, 25 degrees.

Here, if the counter-angle θ is less than 20 degrees, when the leak path 138 of the safety vale 134 is created as shown in FIG. 10, the inclination of the engagement faces 113a of the pair of the engagement hooks 113 tends to shift from where the engagement faces 113a are perpendicular to the axial direction of the couplings toward where the engagement hooks 113 will be disengaged from each other. On the other hand, if the counter-angle θ is greater than 30 degrees, it is necessary to increase the gap G1 between the leading end face of the engagement projection 111 and the innermost wall face of the engagement recess 112, and in that case, the coupling cannot be designed in compact and may have problems to maneuver the coupling. Therefore, usually, it is considered that the engagement state is easy to secure in an angle of about 20 to 30 degrees as the counter-angle θ appropriately, the coupling portion is most smoothly guiding toward the engagement state, and the disengagement operation is facilitated.

In the conventional coupling, when the engagement projection 111 is applied to pressure, the engagement projection 111 just slightly bends in a range of the elastic deformation, because the coupling "is used under pressure equal to or smaller than working pressure (normal maximum working pressure) after the coupling is applied a test pressure (about 1.5 to 2 times the working pressure) temporarily in a shipping inspection or the like)," and thus the engagement projection 111 springs back to the original shape (the original angle) when released from the pressure. Therefore, the counter-angle of the conventional coupling 100 has been about 15 degrees.

On the other hand, the coupling 100 with the integrated safety valve function of the present embodiment is assumed to be applied pressure unusually greater than the test pressure (3 to 4 times the working pressure). In the present embodiment, when such abnormally-high pressure is applied, the engagement projection 111 is plastically deformed with axial elongation and bending, and at this time, the engagement hook 113 is also deformed. As the bending deformation proceeds, the counter-angle θ decreases. Therefore, in the present embodiment, the counter-angle θ is designed slightly large to allow for the decrement of the counter-angle θ associated with the bending deformation. Further, the counter-angle θ may vary depending on the material, the size, the shape or the like of the coupling, but the counter-angle θ of 20° to 30° is also applicable to the coupling (called 150 to 400 mm coupling) for the large-capacity foam-water discharge system.

As described above, if the counter-angle θ is shallow, when fluid to be transported has abnormally high pressure, the counter-angle θ will be deformed in the opposite direction (for example, if the engagement projection 111 is bent at an angle of −20°, the counter-angle changes from 15° to −5°), and the axial load, which has been applied to the coupling, will generate a rotation force in a direction for uncoupling the coupling from the other coupling. In contrast, if the counter-angle θ is too steep, unless a greater gap is secured between the front end of one seal ring portion and the front end of the other seal ring portion in a state where the pair of the couplings is coupled together, the couplings cannot be engaged with or disengaged from each other. Therefore, the sealing member 133 needs to be increased in size, and thus the coupling cannot be designed in compact size.

Consequently, it is reasonable to design the counter-angle θ within a range of 20° to 30°.

In the fourth embodiment, when the fluid pressure within the fluid passage 102 exceeds the set pressure level for the safety vale 134, as shown in FIG. 10, the deformation portion 140 (the coupling portion 110) is plastically elongated axially on the whole while being slightly bent. Then, as the seal ring portions 131 of the pair of the couplings 100 are lifted and separated from each other, the contact faces of the sealing members 133 are separated from each other, and the leak path 138 is created between the sealing members 133. The high-pressure fluid within the fluid passage 102 is discharged to the outside through the leak path 138. The fluid to be discharged is forcefully ejected from the fluid ejection ports 142 in the radial directions of the coupling 100 (in twelve or twenty-four circumferential points in the case of a nominal 300 mm coupling), and a technical effect similar to that of the above-described embodiment is produced.

Note that, when the fluid is discharged, although the sealing member 133 is located in the fluid ejection port 142, the sealing member 133 is usually made of rubber, and thus the sealing member 133 will be pushed by the flow of the fluid and will not have a great impact on the fluid discharging rate. Further, although the steel ball 125 of the pushing mechanism 120 is located in the leak path 138, the steel ball 125 is pushed inside the case member 124 by the strong flow momentum of the fluid to be ejected, and thus the steel ball 125 will retreat from the region of the fluid ejection port as much as possible and will not substantially decrease the fluid discharge amount.

Fifth Embodiment

Figure 12:
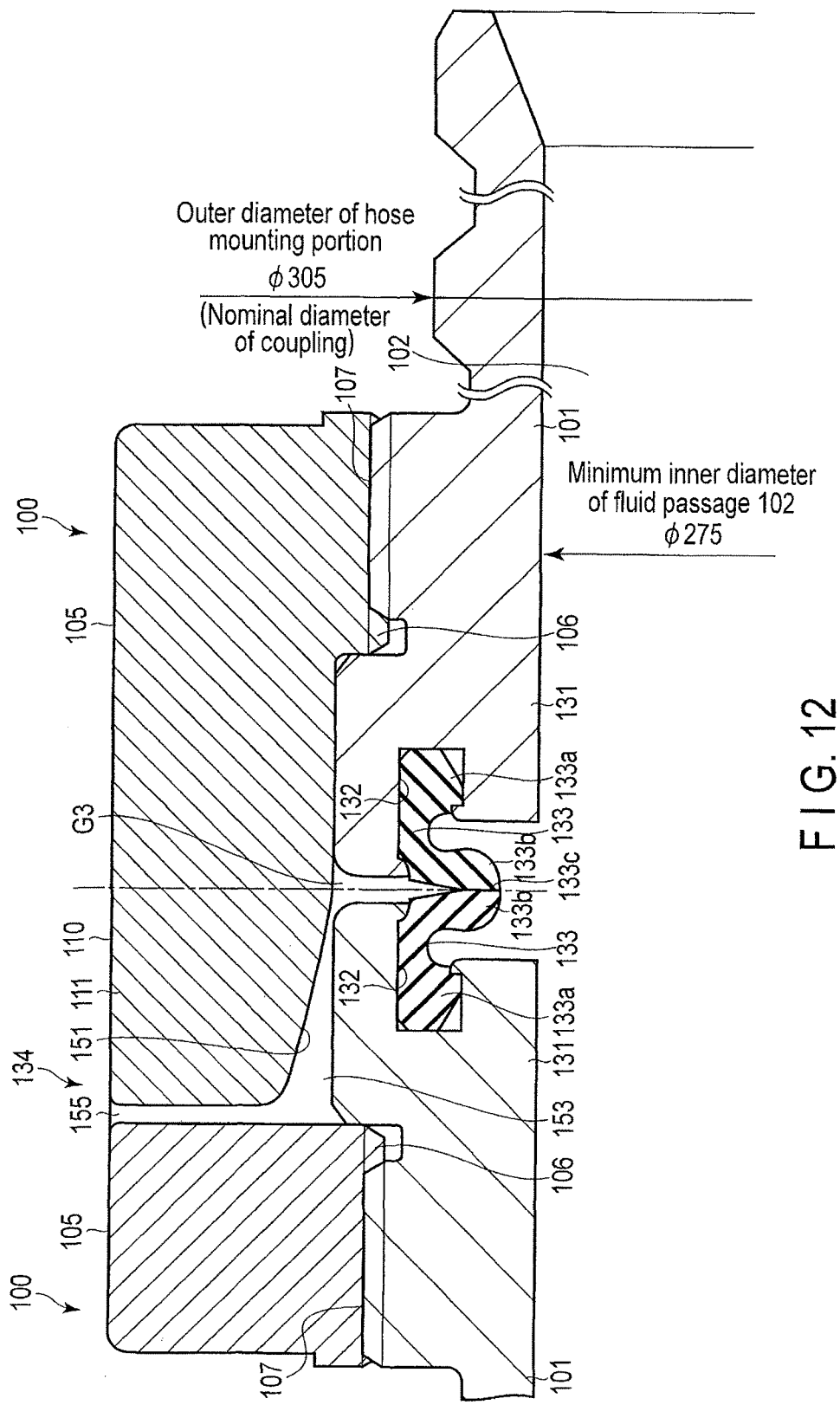
FIG. 12 is a drawing showing a region near coupling portions in a state where a pair of couplings of a fifth embodiment is coupled together.

Next, the fifth embodiment will be described with reference to FIGS. 12 and 13. In the present embodiment, the basic structure of a coupling 100 is the same as that of the fourth embodiment, and thus the same structural elements as those of the fourth embodiment will be denoted by the same reference numbers.

In the coupling 100 of the fifth embodiment, an inner surface 151 of an engagement projection 111 of one coupling portion 110 of a coupling part 105 is engaged with an outer periphery of a seal ring portion 131 of the counterpart coupling 100. When the fluid pressure significantly increases and the seal ring portions 131 and the like are lifted, as the distance corresponding to the lift amount increases, the gap between the inner surface 151 of the engagement projection 111 and the outer periphery of the seal ring portion 131 increases, accordingly. Further, to facilitate the operation of engaging or disengaging of the couplings, the center axis of couplings needs to be aligned with each other, and thus when the pair of couplings is coupled together, the inner surface 151 of the engagement projection 111 is engaged with the outer periphery of the seal ring portion 131 of the counterpart. However, if the gap therebetween is too small, there is a problem with fitting the projecting seal ring portion 131 into the recessed inner surface 151 of the coupling portion 110. To solve this issue, the inner surface 151 of the engagement projection 111 is curved and inclined gradually separated from the outer periphery of the seal ring portion 131 of the counterpart coupling 100 toward the leading edge of the engagement projection 111. According to this structure, since the inner surface 151 of the engagement projection 111 is curved and inclined in this manner, as the distance from the counterpart coupling increases, the gap therebetween increases, accordingly. In the present embodiment, the gap between the inner surface 151 of the engagement projection 111 and the outer periphery of the seal ring portion 131 of the counterpart coupling 100 is used as a fluid discharge passage 153.

Further, the fluid discharge passage 153 communicates with a gap G3 formed between the seal ring portions 131 of the pair of the coupled couplings 100 and also with the gap G1 formed between the leading edge surface of the engagement projection 111 and the innermost wall surface of the engagement recess 112. Still further, the fluid discharge passage 153 also communicates with a gap G2 formed between the back surface of the engagement projection 111 and the back surface of the engagement recess 112. Still further, the fluid discharge passage 153 communicates with the gap formed between the side surfaces provided with the engagement hooks 113 and also communicates with the fluid ejection ports 116. Still further, the fluid discharge passage 153 also communicates with the leak path 138 which is created when the pressure of a fluid to be transported significantly increases. Then, the abnormally-high-pressure fluid is swiftly discharged through the fluid discharge passage 153.

In the meantime, each gap is formed of upstanding walls which are perpendicular to the axis of the coupling and is open to the outside, and thus each gap communicates with the fluid discharge passage 153 and forms a fluid ejection port 155 which is open in a direction perpendicular to the axis of the coupling. Therefore, the high-pressure fluid is ejected from the fluid discharge port 155 in a direction perpendicular to the axis of the coupling and in the radial direction of the coupling. Similarly, the fluid ejection port 116 is open in a direction perpendicular to the axis of the coupling.

Figure 13:
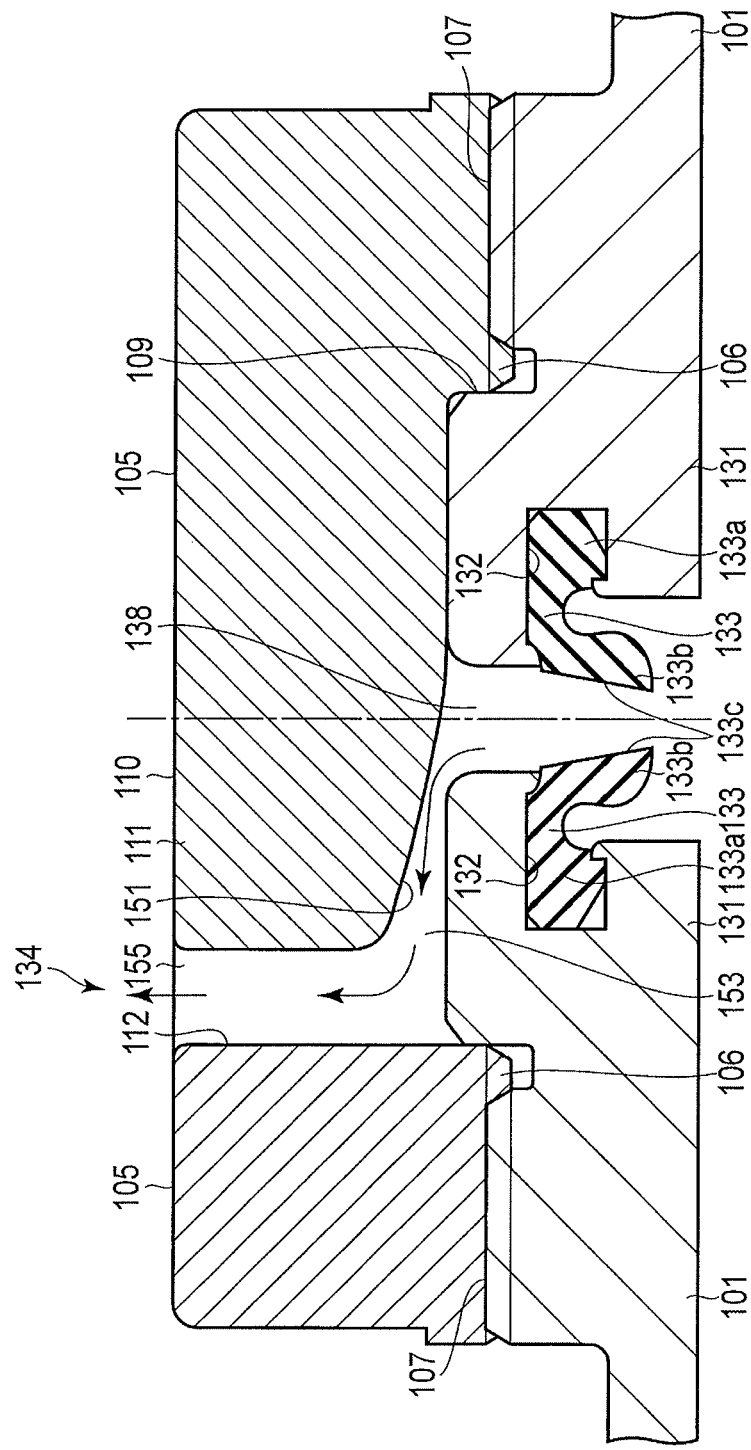
FIG. 13 is a drawing showing a region near coupling portions and sealing portions in a state where the pair of couplings of the fifth embodiment is coupled together and a safety function is activated.

As described above, in the fifth embodiment, when the pair of the couplings 100 is coupled together and if the pressure of the fluid to be transported abnormally exceeds the predetermined level, as shown in FIG. 13, the seal ring portions 131 of the pair of the couplings 100 are lifted, and the leak path 138 is created between the seal ring portions 131. Then, as indicated by arrows in FIG. 13, the high-pressure fluid flows from the leak path 138 into the fluid ejection port 116 or the fluid ejection port 155 through the fluid discharge passage 153 and is then discharged from the coupling 100. Therefore, it is possible to immediately discharge the high-pressure fluid and to prevent breakage of the pair of the couplings, and it is also possible to notify of an abnormality by ejecting the high-pressure fluid from the circumferential portions in the radial directions of the coupling. Note that, a shape of sealing member 133 in FIG. 13, as well as the case shown in FIGS. 6C and 6D in the first embodiment, will become the same shape as FIG. 6C when a high pressure fluid is discharged, and will become the same shape as FIG. 6D after a high pressure fluid comes off.

EXAMPLE

Next, a tested example of the coupling will be described below.

Here, a test specimen corresponds to the coupling used for a large-capacity foam-water discharge system (of a model which has working pressure of 1.3 MPa and is called a nominal 300 mm coupling).

The material and the property of the test specimen are as follows. First, the material is assumed to be A5083FH which is defined in the JIS H 4140-1988: "aluminum and aluminum alloy forgings". As compared to generally-used forged products, this material is more expensive and more intractable but is excellent in toughness (strong and not easily breakable).

Further, regarding the tensile strength and the elongation of the material of the test specimen, the JIS standard values and the average measurement values (measured in Yamagata Research Institute of Technology) are as follows.

| JIS standard values | Average measurement values |
| --- | --- |
| Tensile strength (N/mm$^2$) 275 or more | 296 (296, 296, 296) |
| Elongation (%) 16 or more | 28.7 (31, 29, 26) |

In the meantime, the material generally used for a large-diameter coupling for a large-capacity foam-water discharge system is an aluminum alloy sand mold casting and is greatly different from the forged aluminum alloy of the test specimen in elongation (toughness). A metal mold casting and the like are, although used by some manufacturing companies, basically castings and are thus not sufficiently toughness. In general, castings have limited elongation, and thus castings are plastically deformed immediately and end up being permanently deformed. Further, due to poor elongation, a coupling will not be significantly deformed but will be suddenly broken away.

The material generally used for this large-diameter coupling is AC7A which is defined in the JIS H 5202-1999: "aluminum alloy castings" and has the following standard values.

| AC7A sand mold casting | JIS standard values |
| --- | --- |
| Tensile strength (N/mm$^2$) | 140 or more |
| Elongation (%) | 6 or more |
| AC7A die casting | JIS standard values |
| Tensile strength (N/mm$^2$) | 210 or more |
| Elongation (%) | 12 or more |

Then, to examine a state of the coupling of the embodiment at a time when an abnormal fluid pressure surge occurs, a test for the coupling has been considered.

Here, in the case of a pressure test machine which can conduct a test under high pressure (5.2 MPa) which is 4 times the working pressure, the flow rate of its plunger pump is not that large. Therefore, when the inner pressure of the coupling increases up to an unusually high level (3 to 4 times the working pressure) and the deformation portion of the test specimen is elongated, the sealing member is axially lifted and the fluid is discharged from the sealing portion, but as the fluid is discharged, the pump pressure significantly decreases. Once the fluid is discharged from the seal portion, the pressure will not increase up to such an extent that the pressure becomes 4 times the working pressure or more. Therefore, in the present pressure test machine (plunger pump), it is impossible to actually observe behavior of the deformation portion at a time when the deformation portion is applied pressure higher than that level.

On the other hand, in the case of a volute pump actually used in a large-capacity foam-discharge system, although there are some pumps having sufficiently large flow rates, volute pumps can only increase the pressure up to such an extent that the pressure slightly exceeds the working pressure level. Further, as a method of creating in a laboratory, a water hammer or an energy accumulation state where a hose expands in a radial direction or in a longitudinal direction and energy is accumulated (note that, in the case of a steel pipe, unlike a hose, a steel pipe hardly expands or energy is hardly accumulated), there are a testing method of accumulating energy by using a giant pump whose pumping capacity is significantly greater than those of the pumps of these two kinds or a testing method of accumulating energy by using an accumulator or the like, but these methods are too dangerous. Therefore, these pressure test methods are not adopted.

Instead, a tensile test is conducted for a test specimen. In general, it is possible to calculate an axial load to be applied to the test specimen at a time when inner pressure of the coupling is increased up to an abnormally high level by Pascal's law. In a case where inner pressure of the working pressure level is applied to the test specimen, since the working pressure is 1.3 MPa (1,300,000 Pa) and the diameter of the coupling, that is, the external diameter of the hose attachment portion (see FIG. 12) is 305 mm (0.305 m), the axial load will be 94.9 kN (kilo-Newton). As the deformation portion of the test specimen is applied to a tensile force 3 to 4 times the tensile load, the deformation portion is elongated, and the seal ring portion (sealing member) is axially lifted.

Here, the axial load [N] is found from the following equation.

$$\text{The axial load [N]} = P\pi r^2 = 1,300,000 \times 3.14(0.305/2)^2 = 94,932$$

Figure 14:
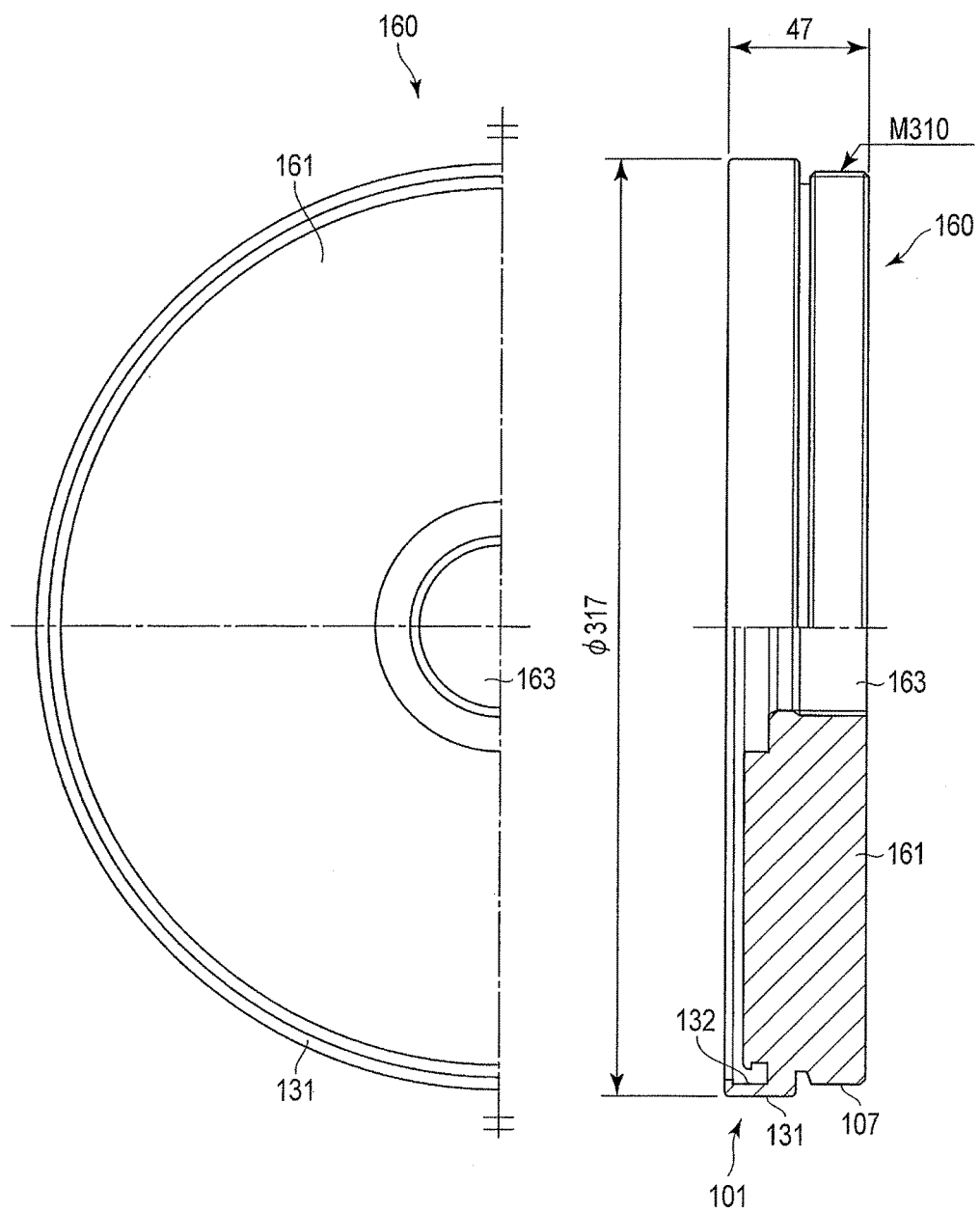
FIG. 14 is a design drawing partly in section, showing a shape and dimensions of a test specimen corresponding to a coupling body of an example of the fifth embodiment.
Figure 17:
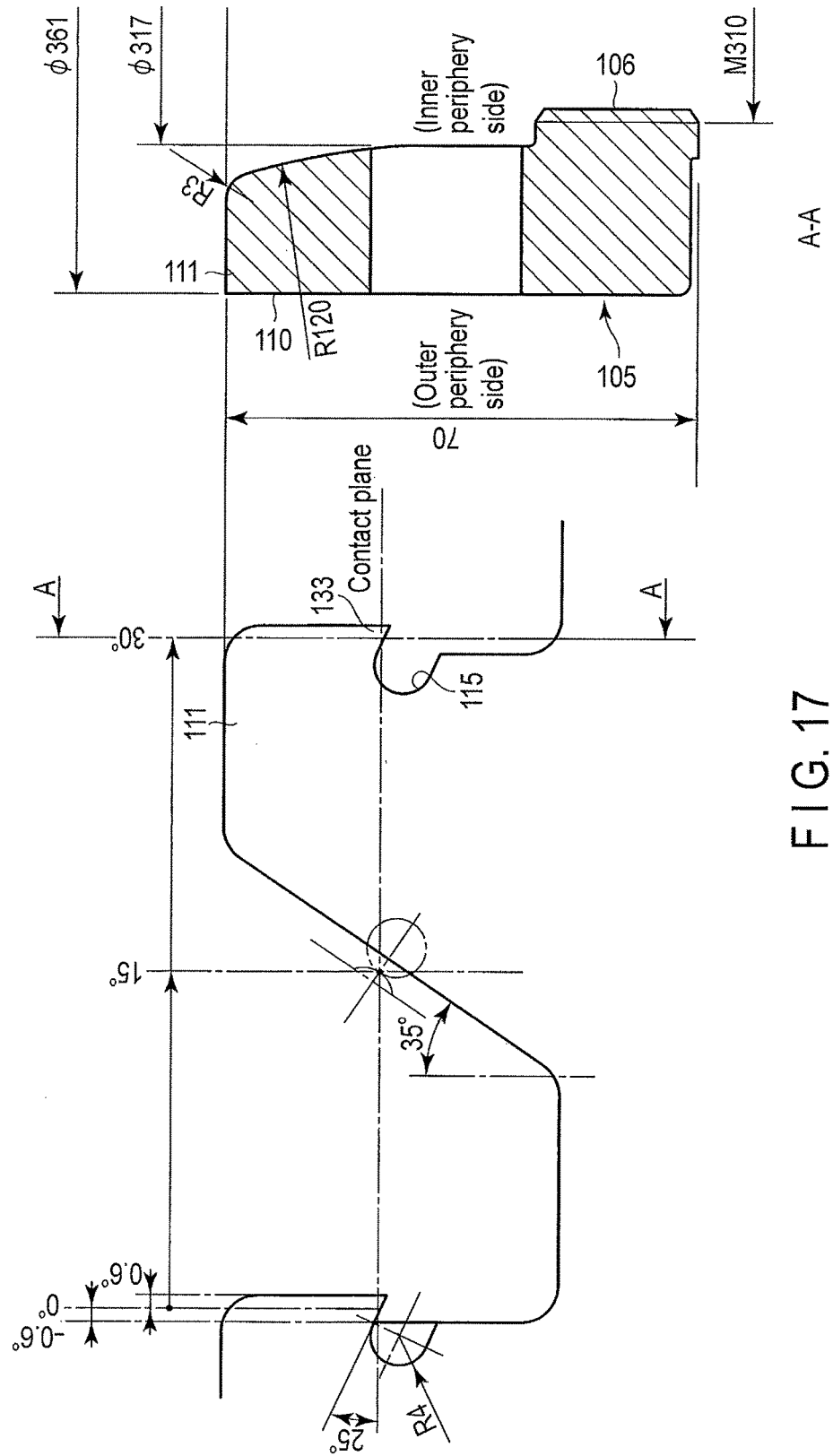
FIG. 17 is a development design drawing partly in section, showing a shape and dimensions of the coupling portion within a range of 30° of the circumference of the coupling portion of the test specimen corresponding to the coupling part of the example.

Here, the shape and the dimensions of a test specimen 160 are shown in FIGS. 14 to 18. FIGS. 14 and 15 illustrate a test specimen corresponding to the coupling body 101, FIG. 16 illustrates a tensile rod 162, FIG. 17 illustrates a test specimen corresponding to the coupling part 105, and FIG. 18 illustrates a test specimen corresponding to the sealing member 133. A representation method of the shape and the dimensions is based on the JIS drafting standard and common drafting methods in Japan. Note that the dimensions are represented in the unit [mm].

Here, the test specimen corresponds to the fifth embodiment including the structural elements of the fourth embodiment shown in FIGS. 9 and 10, and represents a coupling of such an embodiment where a coupling portion 110 is preferentially deformed.

Further, as shown in FIG. 14, a test specimen corresponding to the coupling body 101 comprises a seal ring portion 131 around a sufficiently-strong supporting plate 161. Still further, an attachment hole 163 is formed in the center of the supporting plate 161, and the tensile rod 162 shown in FIG. 16 is inserted into the attachment hole 163. Then, as the tensile rod 162 is inserted into the attachment hole 163 of the supporting plate 161, the supporting plate 161 is supported by the tensile rod 162, and the tensile rod 162 is then held by the chucks of the tensile testing machine. Subsequently, the pair of the test specimens is pulled away from each other, and in this way, the coupling portions 110 of the pair of the test specimens are subjected to tensile loads.

As the testing machine, a universal material testing machine RU500H-TK21 (500 kN) made by Tokyo Koki Manufacturing Co., LTD. settled at Industrial Technology Center of Tochigi Prefecture is used. Further, a load addition rate is 0.5 mm/min, a load range is 500 kN, and a displacement range is 100 mm.

As a result of the tensile test, the following data was obtained. FIG. 19 shows a test result represented as a graph of an axial tensile load and an axial displacement amount (displacement amount between chucks).

According to the result of the tensile test, there is a great difference between a slop obtained under a load of up to 390 kN and a slop obtained under a load of beyond that level. As is evident from the graph, elastic deformation has occurred under a load of up to 390 kN, and plastic deformation has occurred under a load of beyond that level. Further, the graph shows a jagged line at the point of a load of about 430 kN, and thus local breakage of the test specimen seems to have begun at that point. This shows that the coupling can be used without being broken under a load of up to about 440 kN. This load corresponds to about 4.6 times the working pressure. Note that an actual measurement value of the breaking pressure of the hose body is about 2.5 times the working pressure or less (3.0 MPa).

In the graph of the tensile testing result, the displacement amount indicates a displacement amount between the chucks of the tensile testing machine. Therefore, the displacement amount is the total displacement amount of the whole of the test specimens and also includes such a displacement amount which does not contributes to the axial lift effect of the seal ring portions 131 (sealing members 133) such as an amount of displacement of the supporting plate (solid plate) 161 associated with bowl-like deformation. In this way, it is possible to macroscopically understand the load/displacement characteristics of the whole test specimen.

Figure 20:
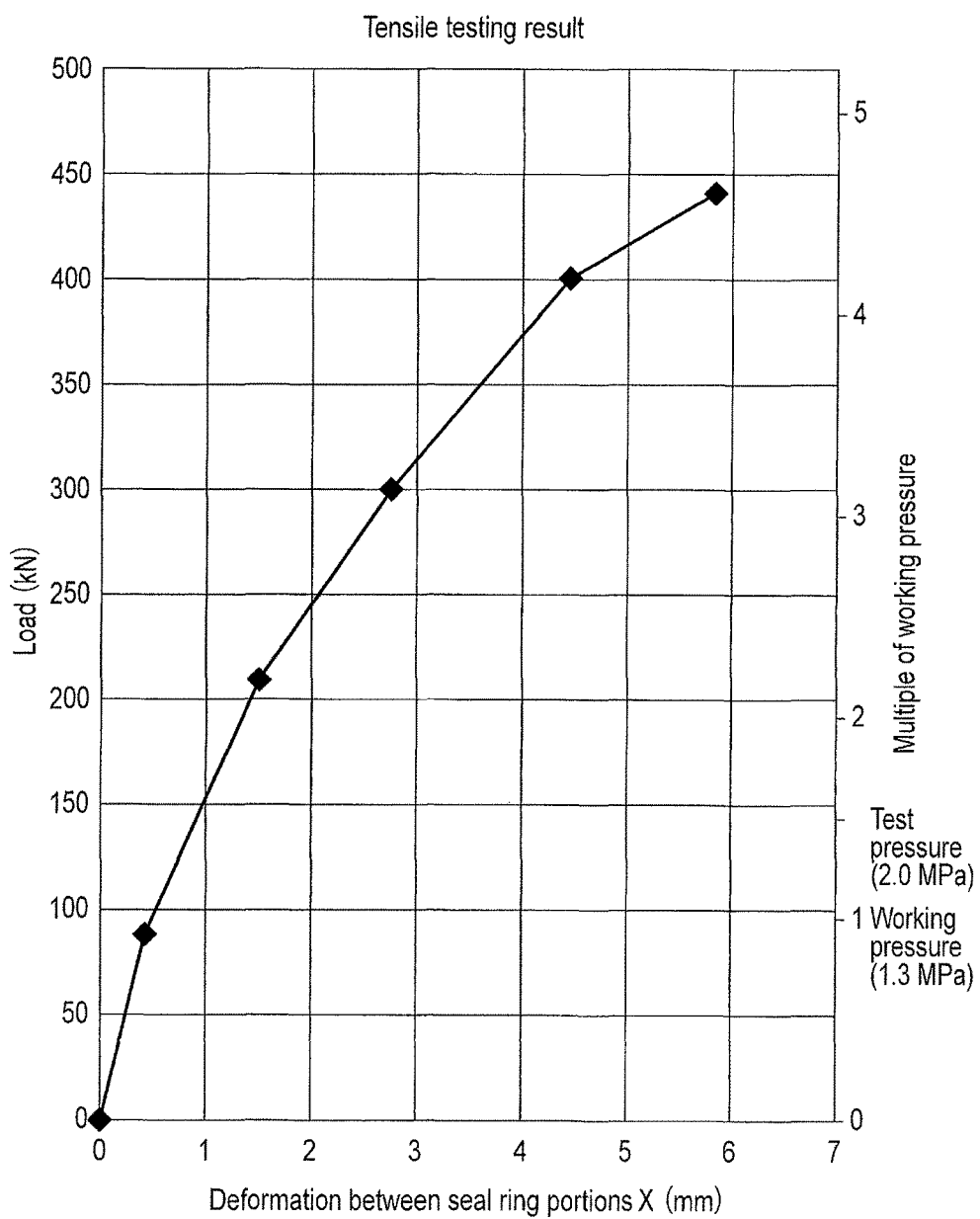
FIG. 20 is a graph showing a tensile load and a displacement between seal rings as a test result of the test specimen.

Next, FIG. 20 shows a test result obtained at a time when the deformation portion of the test specimen, namely, the coupling portion 110 is axially elongated, the seal ring portion 131 (the sealing member 133) is axially lifted, and the fluid is then discharged from the seal ring portion. FIG. 20 is a graph showing data indicating a tensile load and a displacement amount between the pair of seal rings.

Figure 21B:
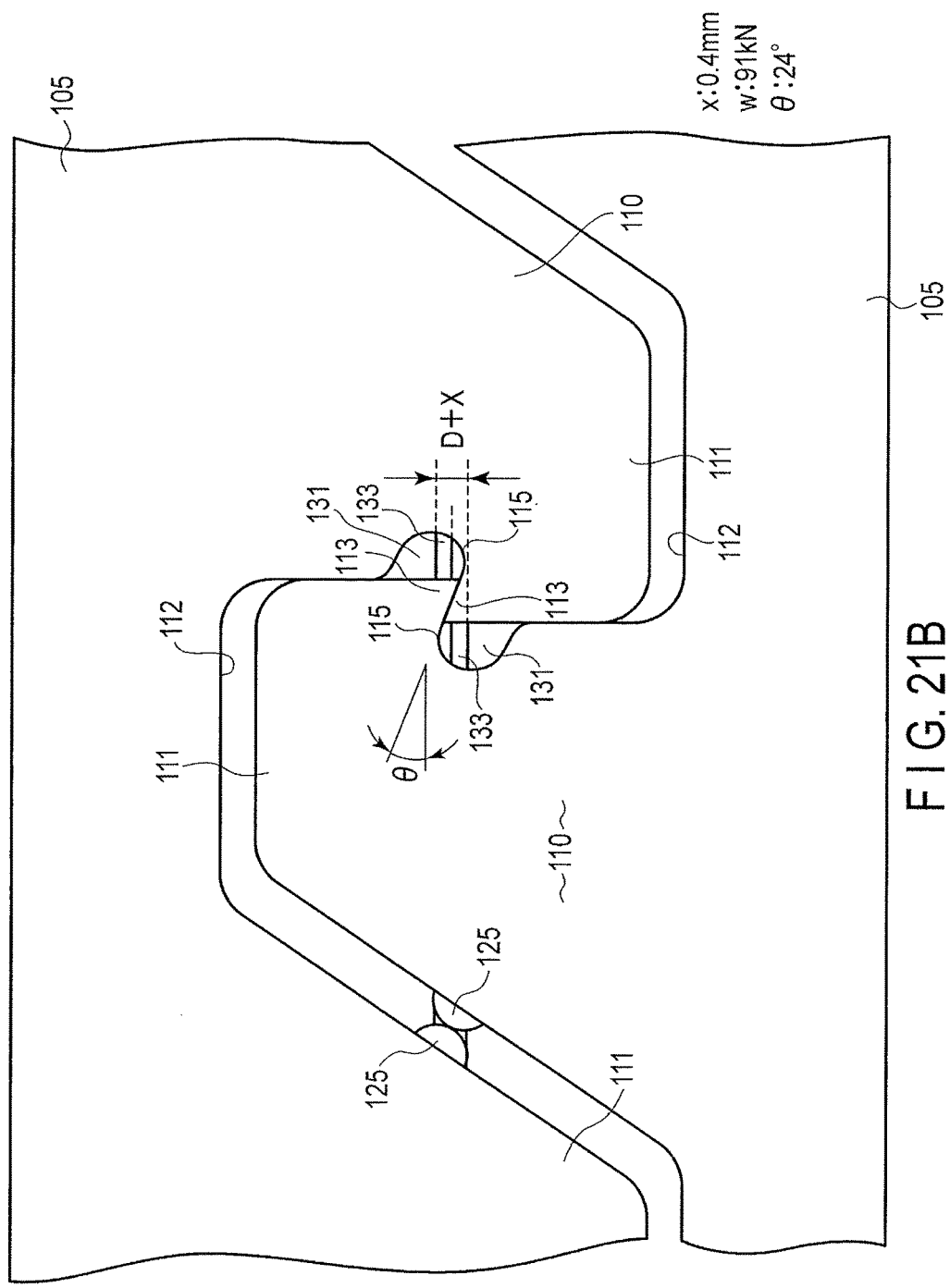
FIG. 21B is an explanatory drawing showing a deformation state of the coupling portion of the test specimen under a tensile load of 91 [kN].
Figure 21C:
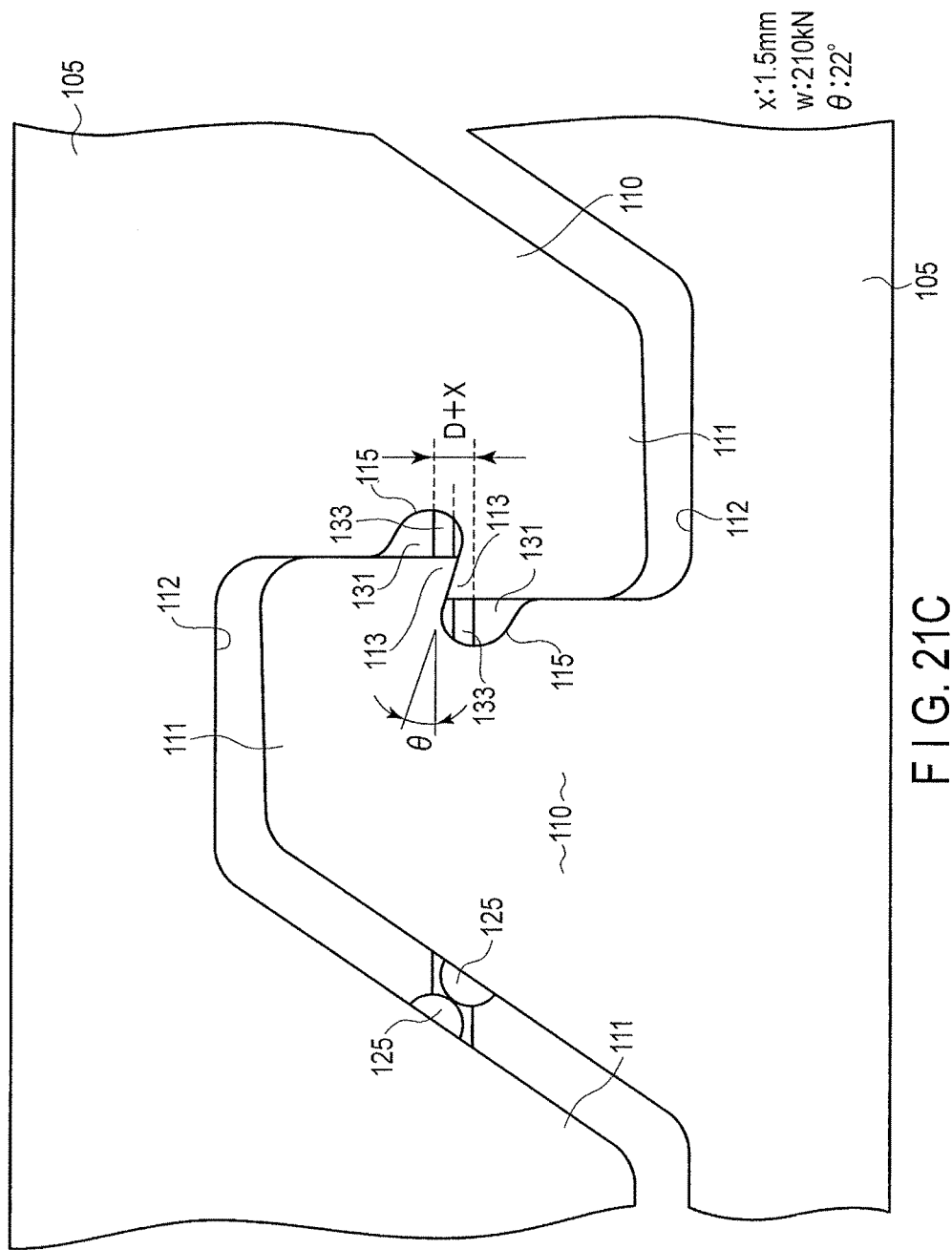
FIG. 21C is an explanatory drawing showing a deformation state of the coupling portion of the test specimen under a tensile load of 210 [kN].
Figure 21D:
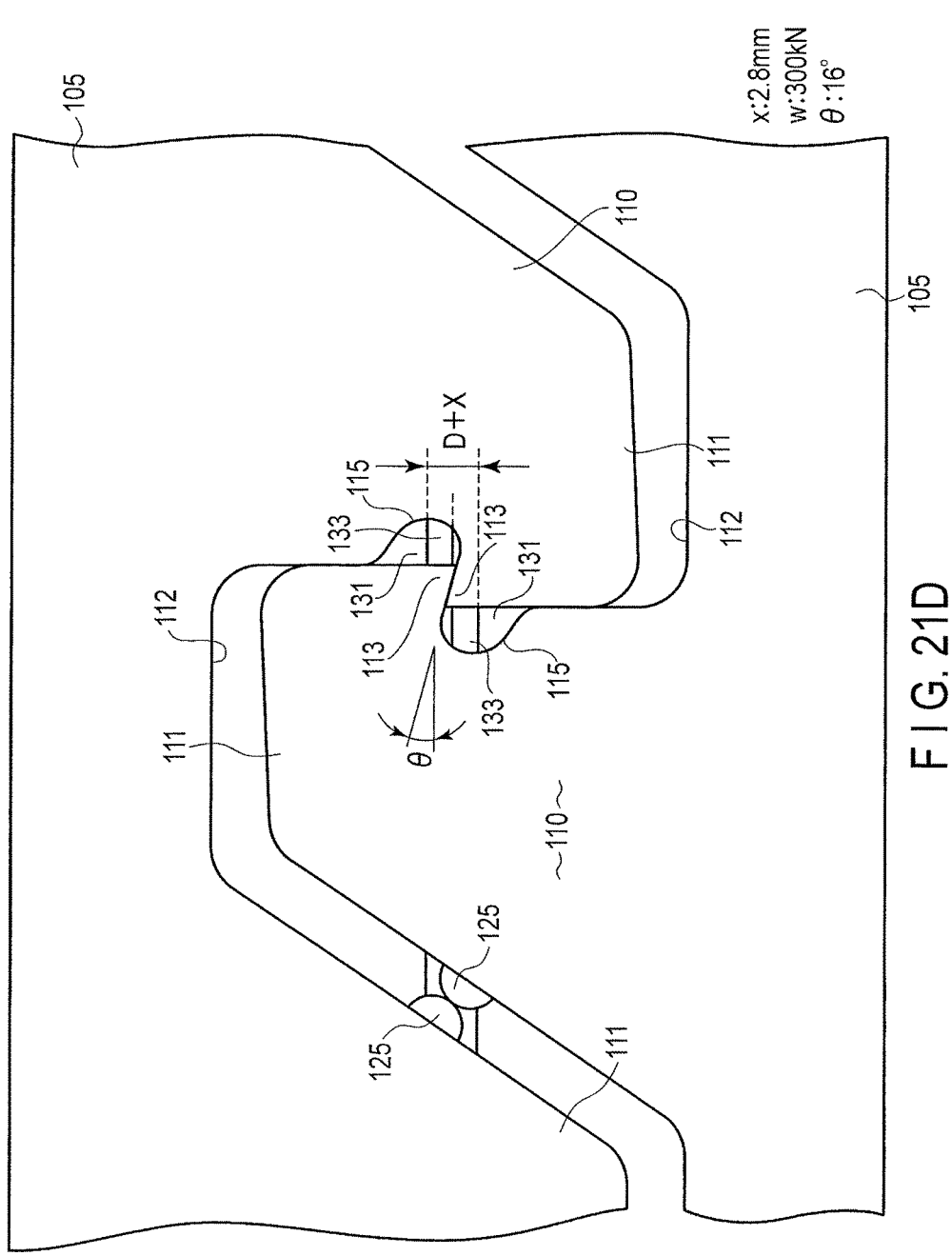
FIG. 21D is an explanatory drawing showing a deformation state of the coupling portion of the test specimen under a tensile load of 300 [kN].
Figure 21E:
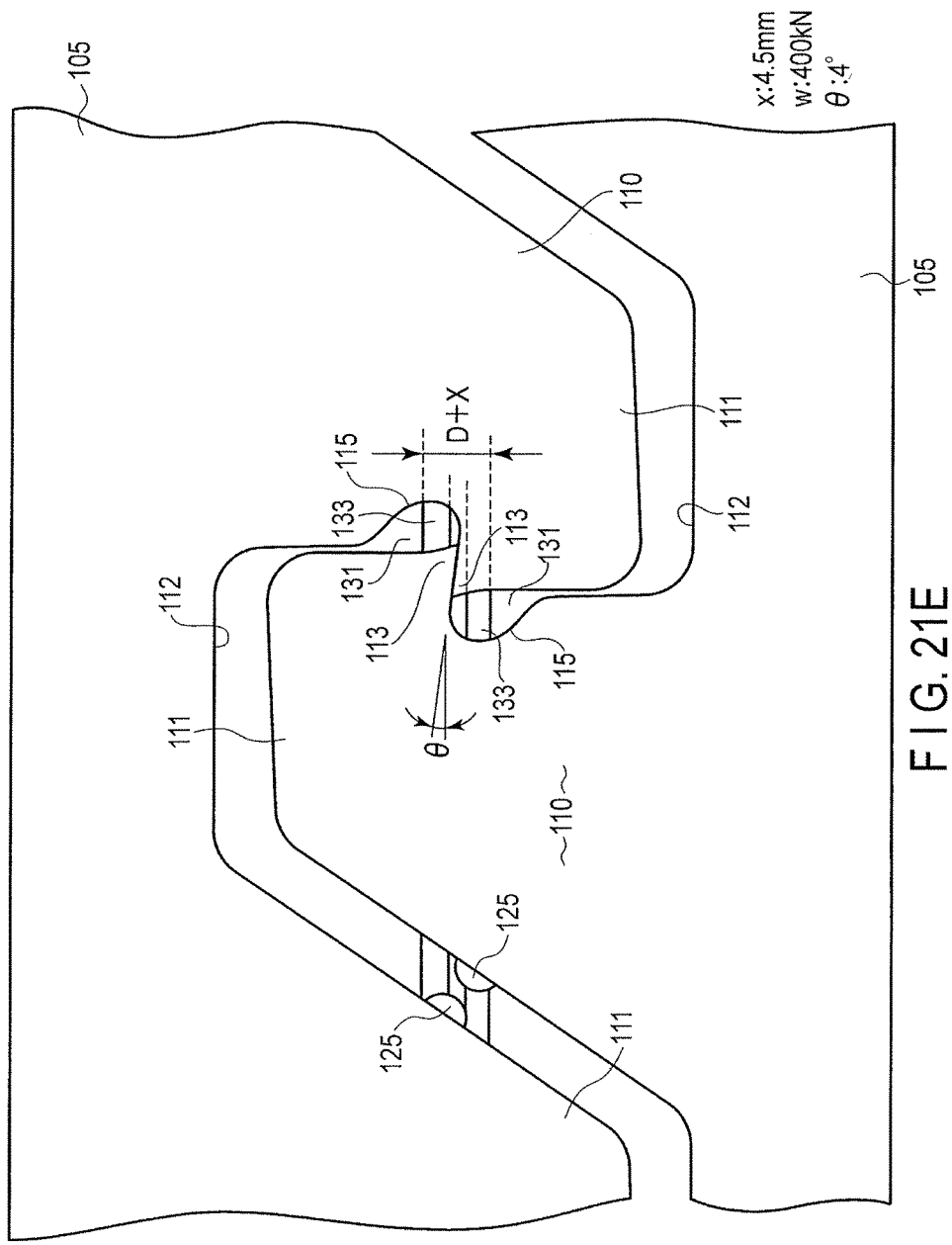
FIG. 21E is an explanatory drawing showing a deformation state of the coupling portion of the test specimen under a tensile load of 400 [kN].
Figure 21F:
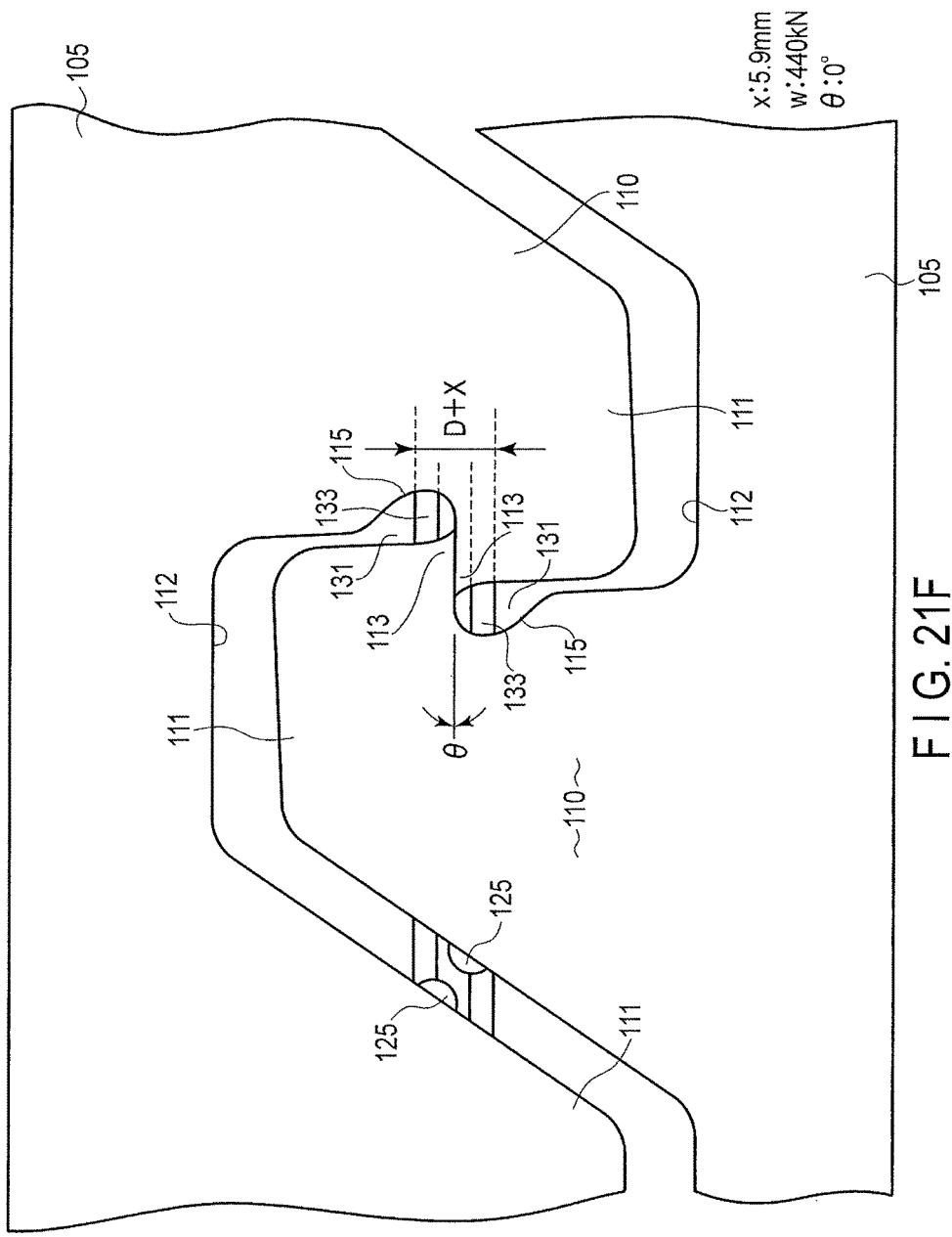
FIG. 21F is an explanatory drawing showing a deformation state of the coupling portion of the test specimen under a tensile load of 440 [kN].

Each of FIGS. 21A to 21F shows a tensile load and a deformation state of the coupling portion 110 under the tensile load. More specifically, FIG. 21A shows a case where the tensile load W is 2 kN and the displacement amount between the seal rings is 0.0 mm, FIG. 21B shows a case where the tensile load W is 91 kN and the displacement amount between the seal rings is 0.4 mm, FIG. 21C shows a case where the tensile load W is 210 kN and the displacement amount between the seal rings is 1.5 mm, FIG. 21D shows a case where the tensile load W is 300 kN and the displacement amount between the seal rings is 2.8 mm, FIG. 21E shows a case where the tensile load W is 400 kN and the displacement amount between the seal rings is 4.5 mm, and FIG. 21F is a case where the tensile load W is 440 kN and the displacement amount between the seal rings is 5.9 mm.

In this case, as shown in the graph of FIG. 20, when the maximum tolerable load of the coupling 100 which will not cause disruption of the coupled state of the coupling 100, that is, 400 kN (about 4.6 times the working pressure) is applied, the seal rings were lifted about 5.9 mm. This lift amount corresponds to 2.15/100 the inner diameter (275 mm) of the fluid passage 102 of the coupling 100, which is substantially equal to the diameter of the valve seat. Note that, since the pair of the couplings comprises two seal ring portions 131 (sealing members 133), this lift amount is the sum of the lift amounts of these two seal ring portions 131. Further, it has been found from the results of FIGS. 19 and 20 that about half the displacement amount of the whole test specimen contributes to the axial lift effect of the seal ring portions 131 (sealing members 133).

Further, engagement hook 113 is provided on one side of the engagement projection 111 (the coupling portion 110), and the engagement face 113a of the engagement hook 113 is axially engaged with that of the counterpart coupling. Now, the angle (counter-angle) θ of this engagement face will be considered.

When applied to a load greater than the test pressure of the coupling, the whole engagement projection 111 (the whole coupling portion 110) is, while being bent in a direction opposite to the engagement hook 113 direction, axially stretched. Note that, since the bending deformation under the working pressure or the test pressure falls within the range of slight elastic deformation, the bending deformation springs back to the original shape when the load is released. In the test, a load was increased up to such a level about 4.6 times the working pressure, and a counter-angle θ was measured under each load, and in this way, a change in the counter-angle θ was examined.

The counter-angle θ of the test specimen was 25° in the outer periphery development diagram, and in the tensile test, the counter-angle θ changed in the following manner under a large load.

| Load (kN) | Pressure (multiple of working pressure) | Counter-angle θ (degree) |
|---|---|---|
| 2 | 0.0 | 25 |
| 91 | 1.2 | 24 |
| 210 | 2.7 | 22 |
| 300 | 3.9 | 16 |
| 400 | 5.2 | 4 |
| 440 | 5.7 | 0 |

In the conventional coupling, after the test pressure (1.5 to 2.0 times the working pressure) is temporarily applied in the shipping inspection or the like, the coupling is used under pressure less than or equal to the working pressure (normal maximum working pressure), and thus it has been considered that the bending deformation of the engagement projection 111 still falls within the spring back range. Therefore, although the counter-angle varies depending on the material, the size, the detailed shape or the like of the coupling, the counter-angle of about 15° would be sufficient for the conventional coupling.

However, the coupling comprising an integrated safety valve function is assumed to be applied pressure abnormally higher the test pressure (3 to 4 times the working pressure), and thus it should be considered that the engagement projection 111 (coupling portion 110) is deformed and plasticity elongated when the coupling is applied the unusually pressure. Further, when the engagement projection 111 is deformed toward the side opposite to the engagement hook 113 side, the counter-angle θ decreases and the technical effect of the counter-angle θ diminishes, accordingly. Therefore, it is necessary to design the counter-angle θ steeply in expectation of the decrease of the counter-angle θ. Therefore, the counter-angle θ of the coupling for the large-capacity foam-discharge system (150 to 400 mm nominal coupling) is set to 25°, although the counter-angle θ varies depending on the material, the size, the shape or the like of the coupling.

According to the test results, tolerable pressure where the coupling can be used without being-broken was about 440 kN (about 4.6 times the working pressure), and under this pressure, the remaining counter-angle θ was substantially zero degree, and thus the counter-angle of the basic design, namely, the counter-angle of about 25° was the minimum angle and the optimal value. Further, if the counter-angle θ is shallow than that angle, the counter-angle θ will be deformed in the opposite direction under abnormally high pressure, and the axial load, which has been applied to the coupling, will generate a rotation force in a direction of uncoupling the couplings.

In contrast, if the counter-angle θ is too steep, unless a greater gap is secured between the end of the seal ring portion 131 of one coupling and the end of the seal ring portion 131 of the counterpart coupling in a state where the pair of the couplings is coupled together, the couplings cannot be engaged with or disengaged from each other. Therefore, the other members need to be enlarged in size, and thus the coupling cannot be formed in compact design.

Therefore, for the same reason, the counter-angle θ should be at least within a range of 20° to 30°, and more desirable, the counter-angle θ should be 25°.

Next, a result of a pressure resistance test will be described. As a test specimen, the coupling where the seal ring portions 131 were lifted about 5.9 mm under the load of 440 kN (about 4.6 times the working pressure) in the previous tensile test was also used in the pressure test, and the pressure and flow test of the test specimen was carried out.

Note that, when released from the load in the tensile test, the coupling slightly reset to the original shape by the springback effect of elastic deformation, but since the deformation of the coupling was mostly plastic deformation, the original lift amount could not be secured even after the coupling was released from the load.

Since the flow rate is essential to the pressure and flow test, although being somewhat powerless as compared to a large-capacity pump (pressure of 1.3 MPa and a flow rate of 20,000 L/min) actually used for a large-capacity foam-water discharge system, outdoor fire hydrant equipment (pressure of 0.9 MPa and a flow rate of 350 L/min) was used for the pressure and flow test.

First, the fluid pressure and the ejection operation of the test specimen were examined in the test. That is, the test specimen is sealed, and the inner pressure is gradually increased. When the inner pressure reached 0.4 MPa, the ejection of the fluid started, and the pressure is reduced. Then, when the valve of the outdoor fire hydrant is fully opened, the fluid squirts to a distance of 2 to 3 meters in the radial directions. At this time, since the fluid was ejected in large volume, the pressure could only be increased up to 0.3 MPa. As a result of the pressure and flow test, it was confirmed that it is possible to warn the operator or the like of the occurrence of the abnormality by the ejection of the fluid from the leak path.

In the above-described embodiment, the engagement hook 113 is provided in the engagement projection 111 of the coupling portion, and the engagement face 113a of one coupling portion is engaged with the engagement face 113a of the counterpart coupling portion, and thus the engagement faces 113a are inclined in an overhanging manner with respect to the circumferential direction of the couplings. However, the present invention is not necessarily limited to the above-described embodiment, and for example, as shown in FIG. 22, the end of the engagement hook 113 may be axially extended backward and formed in an overhanging manner, that is, a hook portion which is curved inward from the counterpart coupling side may be formed and may be hung over a hook portion of the counterpart coupling.

In this way, as an engagement means of axially hanging the engagement hook 113 over the other engagement hook 113, the engagement hook 113 shown in FIG. 22 comprises a hook portion 114 which axially projects backward, but the rest of the structural elements are the same as those of the above-described embodiments. Further, the reference numbers shown in FIG. 22 are the same as those of the structural elements of the above-described embodiments, and thus the structural elements are denoted by the same reference numbers and the detailed description thereof will be omitted.

Further, the fluid ejection port 116 of the present embodiment is formed in the region of the leak path 138 which crosses the gap G2 created between the back surface of the engagement projection 111 and the back surface of the engagement recess 112, and the fluid ejection port 116 is the main fluid passage port of the coupling. Then, when the fluid pressure significantly increases, the sealing members 133 move respectively to the positions indicated by the two-dot chain lines in the drawing, and the fluid ejection port is created in a region where the leak path 138, which is provided between these sealing members 133, overlaps the gap G2. Note that, although the steel ball 125 of the pushing mechanism 120 is located near the region of the fluid ejection port 116, as in the above-described case, when the fluid pressure unusually increases and the fluid is discharged through the leak path 138, the steel ball 125 is pushed back by the flow power of the high-pressure fluid against the pressure force of the spring 126 as indicated by the two-dot chain lines in FIG. 22, and thus a sufficient area can be secured for the fluid ejection port 116.

Note that, although a pair of twinstar (registered trademark) couplings comprising coupling portions of the same unisex structure has been used in each of the above-described embodiments, the coupling of each embodiment is not limited to a particular coupling portion type or a particular coupling type and is also applicable, for example, to a screw-type coupling designated as a firefighting coupling (by the Ordinance of the Ministry of Internal Affairs and Communications, No. 23 of 2014), a Storz-type coupling (DIN14300 A-Druckkupplung), or the like.

Sixth Embodiment

FIG. 23 illustrates the sixth embodiment. FIG. 23 is a side view partly in section of the pair of couplings coupled together.

In the sixth embodiment, a coupling comprises a screw-type coupling portion. This screw-type coupling comprises a male coupling body 171 and a female coupling body 172, and these coupling bodies 171 and 172 are formed of cylindrical bodies of substantially the same diameter. A male screw portion 173 is formed in the outer periphery of end of the male coupling body 171 which is opposed to the female coupling body 172. The end of the male coupling body 171 provided with the male screw portion 173 is extended, and this extension end serves as a seal projection end 176 which projects into a ring-like elastic sealing member 174 provided in the female coupling body 172. A circumference groove 175 is formed in the outer periphery of the front end of the female coupling body 172, and the inner periphery of the elastic sealing member 174 is fitted in the circumference groove 175. Then, the seal abutting end 176 of the male coupling body 171 abuts into the protruding part of the elastic sealing member 174 which protrudes from the circumference groove 175 (see FIG. 23).

Further, one end of the female coupling body 172 which is opposed to the male coupling body 171 is covered with a coupling part 180. The coupling part 180 has a substantially cylindrical shape, and one end of the coupling part 180 is rotatably attached to the end of the female coupling body 172. Further, a female screw portion 181 is formed in the inner periphery of the other end of the coupling part 180. Then, the female screw portion 181 is engaged with the male screw portion 173 of the female coupling body 171, and the male coupling body 171 is coupled with the female coupling body 172. Further, the coupling part 180 also functions as a coupling portion 183 which couples the male coupling body 171 with the female coupling body 172. The inner diameter of the coupling portion 183 is slightly greater than the inner diameters of the coupling bodies 171 and 172 such that the coupling portion 183 will not disturb the flow of the fluid through a fluid passage 186 of the male coupling body 171 and a fluid passage 187 of the male coupling body 172.

Still further, a stopper projection 188 is circumferentially formed in the outer periphery of the female coupling body 172. Still further, a projection edge 189 inwardly projected as a stopper is circumferentially formed in the inner periphery of the rear end of the coupling part 180. Then, the inner diameter of the coupling part 180 including the female screw portion 181 is greater than the outer diameter of the stopper projection 188 of the female coupling body 172. The inner diameter of the projection edge 189 for stopper is less than the outer diameter of the stopper projection 188. Therefore, the coupling part 180 can be fitted in from the back side of the female coupling body 172.

As the coupling part 180 is fitted in from the back side of the female coupling body 172 until the projection edge 189 for stopper abuts against the stopper projection 188, and the male coupling body 171 is coupled with the female coupling body 172 (see FIG. 23). This position defines the axial position of the coupling part 180, and the coupling part 180 is rotatable with respect to the female coupling body 172. Further, as shown in FIG. 23, the seal abutting end 176 of the male coupling body 171 abuts into the elastic sealing member 174, and in this way, a gap between the coupling bodies 171 and 172 is closed when the coupling bodies 171 and 172 are coupled with each other.

In the meantime, the female coupling body 171 has a handle 176a on the outer periphery where the male screw portion 173 is provided, and the coupling part 180 has a handle 176b on the outer periphery of the front end. Further, the male coupling body 171 has a jointing portion 178, on which a hose or the like is assembled, is provided on the other end, and similarly, the coupling body 172 has a jointing portion 179, on which a hose or the like is assembled, is provided on the other end. Then, each of the hose mounting portions 178 and 179 has a plurality of non-slip bumps.

Further, in the coupling part 180, a deformation portion 190 similar to that of the above-described embodiments is formed in the middle region other than the handle 176b and the rear end attached with the stopper projection 188. For example, long holes 191 are cut out in the deformation portion 190. These long holes 191 are all inclined in the same direction with respect to the center axis of the coupling part 180 and are arranged at regular intervals along the circumferential of the coupling part 180. Then, when an unusually large axial load is applied to the deformation portion 190, band plate portions formed between the inclined long holes 191 are twisted, and the whole coupling part 180 is axially elongated.

Each of the long holes 191 is arranged in a multi-start thread fashion, and the inclination direction, that is, the helical direction is the left-hand thread direction. Since the male screw portion 173 of the male coupling body 171 and the female screw portion 181 of the female coupling body 172 are formed in the right-hand thread fashion, according to the screw coupling relationship, each of the long holes 191 is inclined in the left-hand thread direction. That is, since the inclination direction of each of the long holes 191 is the left-hand screw thread direction, a rotation force is produced in right-hand (clockwise) direction to rotate the coupling part 180 when the deformation portion 190 is axially elongated. In this case, the urging force acts in such a direction of not diminishing but improving the coupling force. Therefore, it is possible to ensure the screw coupling of the coupling bodies 171 and 172.

Further, as shown in FIG. 23, the region where the long holes 191 are provided corresponds to a position where the sealing member 174 of the female coupling body 172 and the seal projection end 176 of the male coupling body 171 are abutting each other. Still further, when at least the seal abutting end 176 is separated from the sealing member 174, the leak path created in the gap between the sealing abutting end 176 and the sealing member 174 is located in the region of the long holes 191. Therefore, when the pressure of the fluid within the fluid passages 186 and 187 unusually increases, the deformation portion 190 of the coupling part 180 is plastically deformed and axial elongated, and the leak path is created. Here, since the region of the leak path overlaps the region of the fluid ejection ports formed of the long holes 191, the fluid can be discharged from the leak path directly through the overlapping region.

Usually, the sealing abutting end 176 is pressed into the sealing member 174, and the gap between them is closed. However, when the pressure of the fluid within the fluid passages 186 and 187 unusually increases, an abnormally strong tensile force is applied between the pair of the coupling bodies 171 and 172 in directions of axially separating the coupling bodies 171 and 172 from each other, and this strong tensile force is also applied to the coupling part 180 which couples the pair of the coupling bodies 171 and 172 together.

Then, this tensile force axially elongates the deformation portion 190 of the coupling part 180. As the deformation portion 190 is plastically deformed and axially elongated, the seal abutting end 176 retreats from the sealing member 174, and the leak path is created between the sealing abutting end 176 and the sealing member 174.

Further, the fluid is spouted from the leak path to the outside through the fluid ejection ports consisted of the long holes 191. In this way, as the high-pressure fluid is discharged to the outside, the fluid pressure within the fluid passage rapidly decreases, the tensile force acting in directions of axially separating the pair of the coupling bodies 171 and 172 decreases, accordingly, and breakage or damage of the coupling portion 183 and the like can be prevented beforehand. Further, as the fluid squirts through the fluid ejection ports consisted of the long holes 191, the supervisor and the like are warned of the abnormality.

According to the above-described embodiments, in addition to the inventions of the claims, at least the following inventions can be realized.

1. The coupling described in claim 1, wherein the deformation portion has a total lift amount in which the sealing member is separated from the sealing member of the counterpart the total lift amount is 1/100 the minimum inner diameter of the fluid passage of the coupling.

2. The coupling described in claim 1 or 2, an area of an opening of the sealing portion, which is opened when the deformation portion is elongated and the sealing member is axially lifted and thus the fluid is discharged to the outside, is 1% or more of the minimum area of the fluid passage of the coupling body.

3. The coupling described in claim 5, wherein the engagement hook includes a hook portion which is bent inward from the counterpart coupling side, and the hook portion is hitched on and engaged with a hook portion of the counterpart coupling.

REFERENCE SIGNS LIST

100: Coupling
101: Coupling body
102: Fluid passage
103: attaching portion
105: Coupling part
110: Coupling portion
116: Fluid ejection port
138: Leak path

What is claimed is:

1. A coupling with a safety valve function which connects at least one of tubes, hoses or pipes to each other or connects a tube, a hose or a pipe to another device, the coupling comprising:
a coupling body including a mounting portion which is formed at one axial end of the coupling body and on which the tube, the hose or the pipe or the other device is mounted, and a fluid passage which is formed inside the coupling body;
a coupling part including an attachment portion which is formed at one axial end of the coupling part and is attached to the coupling body, and a coupling portion which is formed at the other axial end of the coupling part and is coupled with a counterpart coupling;
a sealing member which is provided at the other axial end of the coupling body and closes a gap with a sealing member of a counterpart coupling between the coupling and the counterpart coupling; and
a deformation portion which is formed in the coupling part, which maintains a coupling condition with the counterpart coupling until a leak path is formed between the sealing member and the sealing member of the counterpart coupling when the deformation portion is axially stretched by an axial tensile force which acts on the coupling part when pressure of a fluid within the coupling body increases and the sealing member separates from the sealing member of the counterpart coupling to discharge the fluid to an outside of the coupling.

2. The coupling with the safety valve function according to claim 1, further comprising:
a warning means to warn a condition by ejecting the fluid from a fluid ejection port which is formed in the coupling part and ejects the fluid to the outside of the coupling through the leak path which is formed between the sealing member and the sealing member of the counterpart coupling when pressure of the fluid within the coupling body increases and the sealing member is separated from the sealing member of the counterpart coupling.

3. The coupling according to claim 1, wherein
the coupling part includes a cylindrical portion circumferentially arranged in the coupling body, the cylindrical portion including a hole which is cut out in the cylindrical portion and is oblique to the axis of the coupling part, and a region configured to work as the deformation portion where the hole is formed.

4. The coupling according to claim 2, wherein
the coupling part includes a cylindrical portion circumferentially arranged in the coupling body, the cylindrical portion including a hole which is cut out in the cylindrical portion and is oblique to the axis of the coupling part, and a region configured to work as the deformation portion where the hole is formed.

5. The coupling according to claim 1, wherein
the coupling part includes a cylindrical portion circumferentially arranged in the coupling body, and the deformation portion is configured to be formed in a thickness which is less than a thickness of the other portion of the coupling part.

6. The coupling according to claim 2, wherein
the coupling part includes a cylindrical portion circumferentially arranged in the coupling body, and the deformation portion is configured to be formed in a thickness which is less than a thickness of the other portion of the coupling part.

7. The coupling according to claim 1, wherein
the coupling portion includes:
a projection which axially projects toward the counterpart coupling; and
an engagement hook which is provided in the projection and is engaged with an engagement hook of a coupling portion of the counterpart coupling, and
the deformation portion is formed in the coupling portion.

8. The coupling according to claim 2, wherein
the coupling portion includes:
a projection which axially projects toward the counterpart coupling; and
an engagement hook which is provided in the projection and is engaged with an engagement hook of a coupling portion of the counterpart coupling, and
the deformation portion is formed in the coupling portion.

9. The coupling according to claim 2, wherein
an opening of the leak path, which is formed between the sealing member and the sealing member of the counterpart coupling when the deformation portion is stretched and the sealing member is axially separated from the sealing member of the counterpart coupling, at least partly overlaps the fluid ejection port, and the fluid discharging from the leak path ejects to the outside of the coupling through the fluid ejection port.

10. The coupling according to claim 9, wherein
the coupling part has a plurality of the fluid ejection ports which are arranged along a circumferential direction.

11. The coupling according to claim 9, wherein
the coupling part has three or more of the fluid ejection ports which are arranged at regular intervals along a circumferential direction.

12. The coupling according to claim 1, wherein
at least the deformation portion is formed of a material having an elongation rate of 10% or more.

13. The coupling according to claim 2, wherein
at least the deformation portion is formed of a material having an elongation rate of 10% or more.

14. The coupling according to claim 7, wherein
at least the deformation portion is formed of a material having an elongation rate of 10% or more.

15. The coupling according to claim 8, wherein
at least the deformation portion is formed of a material having an elongation rate of 10% or more.

16. The coupling according to claim 1, wherein
at least one of the coupling part, the coupling portion and the deformation portion is formed of a forged aluminum alloy having a tensile strength of 250 N/mm² or more and an elongation rate of 15% or more.

17. The coupling according to claim 2, wherein
at least one of the coupling part, the coupling portion and the deformation portion is formed of a forged aluminum alloy having a tensile strength of 250 N/mm² or more and an elongation rate of 15% or more.

18. The coupling according to claim 7, wherein
at least one of the coupling part, the coupling portion and the deformation portion is formed of a forged aluminum alloy having a tensile strength of 250 N/mm² or more and an elongation rate of 15% or more.

19. The coupling according to claim 8, wherein
at least one of the coupling part, the coupling portion and the deformation portion is formed of a forged aluminum alloy having a tensile strength of 250 N/mm² or more and an elongation rate of 15% or more.

20. The coupling according to claim 7, wherein
the engagement hook includes an engagement surface which is engaged with an engagement surface of the counterpart coupling, and the engagement surface is inclined in an overhanging manner at a counter-angle $\theta$ of 20° to 30° with respect to a circumferential direction of the coupling.

21. The coupling according to claim 8, wherein
the engagement hook includes an engagement surface which is engaged with an engagement surface of the counterpart coupling, and the engagement surface is inclined in an overhanging manner at a counter-angle $\theta$ of 20° to 30° with respect to a circumferential direction of the coupling.

\* \* \* \* \*